United States Patent [19]

Arimoto et al.

[11] Patent Number: 5,258,802
[45] Date of Patent: Nov. 2, 1993

[54] CAMERA SYSTEM WHICH COMPENSATES FOR DEFOCUSING DURING OPERATION

[75] Inventors: Tetsuya Arimoto; Minoru Kuwana; Kenji Ishibashi; Yasuaki Serita; Masayuki Ueyama; Hiroshi Ootsuka; Hisashi Tokumaru, all of Osaka, Japan

[73] Assignee: Minolta Camera Kabushiki Kaisha, Osaka, Japan

[21] Appl. No.: 957,637

[22] Filed: Oct. 7, 1992

Related U.S. Application Data

[63] Continuation of Ser. No. 516,962, Apr. 30, 1990, abandoned.

[30] Foreign Application Priority Data

Apr. 30, 1989 [JP] Japan ................... 1-109921

[51] Int. Cl.$^5$ ................... G03B 13/36; G03B 5/00
[52] U.S. Cl. ................... 354/402; 354/195.1
[58] Field of Search ............ 354/195.1, 195.12, 402, 354/486, 400; 358/225, 227; 359/696, 697, 698

[56] References Cited

U.S. PATENT DOCUMENTS

| 3,972,056 | 7/1976 | Tsujimoto et al. | 354/195.1 X |
|---|---|---|---|
| 4,472,740 | 9/1984 | Doi | 358/225 X |
| 4,482,235 | 11/1984 | Yasukawa et al. | 354/402 |
| 4,542,972 | 9/1985 | Nakajima | 354/402 |
| 4,697,891 | 10/1987 | Kawai | 354/402 X |
| 4,748,509 | 5/1988 | Otake et al. | 358/227 |
| 4,790,649 | 12/1988 | Harada et al. | 354/400 |
| 4,812,912 | 3/1989 | Iida et al. | 358/227 |
| 4,841,325 | 6/1989 | Hoshino et al. | 354/402 |
| 4,857,951 | 8/1989 | Nakajima et al. | 354/400 |
| 4,870,439 | 9/1989 | Tsuboi et al. | 354/195.12 |
| 4,881,799 | 11/1989 | Ohno et al. | 354/408 X |
| 4,885,600 | 12/1989 | Iwasa et al. | 354/400 |
| 4,914,464 | 4/1990 | Azuma et al. | 354/400 |
| 4,922,283 | 5/1990 | Fukui | 354/484 |
| 4,942,417 | 7/1990 | Miyazawa et al. | 354/400 |
| 4,975,724 | 12/1990 | Hirasawa et al. | 354/400 |
| 5,036,349 | 7/1991 | Suzuki et al. | 354/402 |

FOREIGN PATENT DOCUMENTS

56-162727 12/1981 Japan.

*Primary Examiner*—W. B. Perkey
*Attorney, Agent, or Firm*—Burns, Doane, Swecker & Mathis

[57] ABSTRACT

A camera system comprises an operation member provided in an interchangeable lens adapted to be manually operated; signal sending circuit for sending a signal in response to the manual operation of the operation member; and a controller provided in a camera body which is adapted to switch between an operative state where a predetermined operation is executed and a halt state where the controller is halted after completion of the predetermined operation. The controller switches from the halt state to the operative state in response to the signal from the signal sending circuit to execute the predetermined operation. According to the camera system, since the system controller in the camera body is actuated in response to the operation of the operation member on the lens side, a camera which can substantially instantaneously respond to a request on the lens side can be realized.

18 Claims, 56 Drawing Sheets

Fig. 56(a)
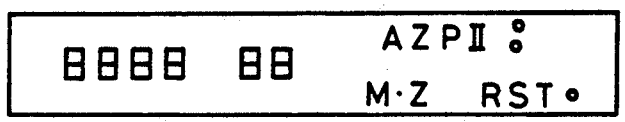
Fig. 56(b)    Fig. 56(c)
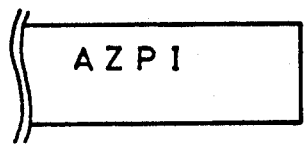    
Fig. 56(d)    Fig. 56(e)    Fig. 56(f)
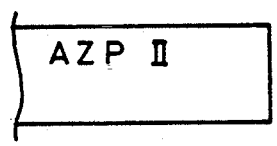        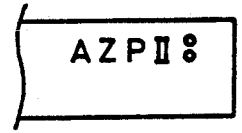
Fig. 56(g)
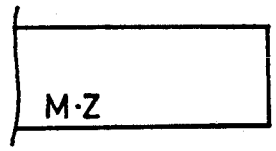
Fig. 56(h)    Fig. 56(i)
    

Fig. 67
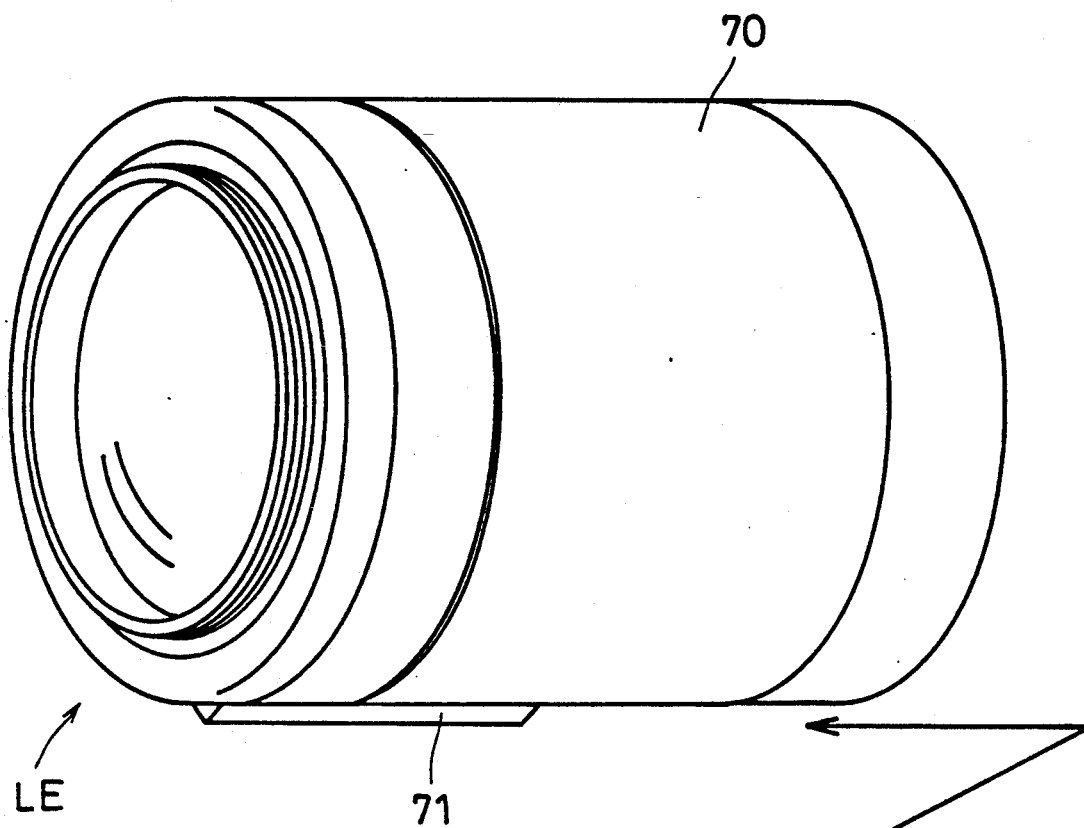
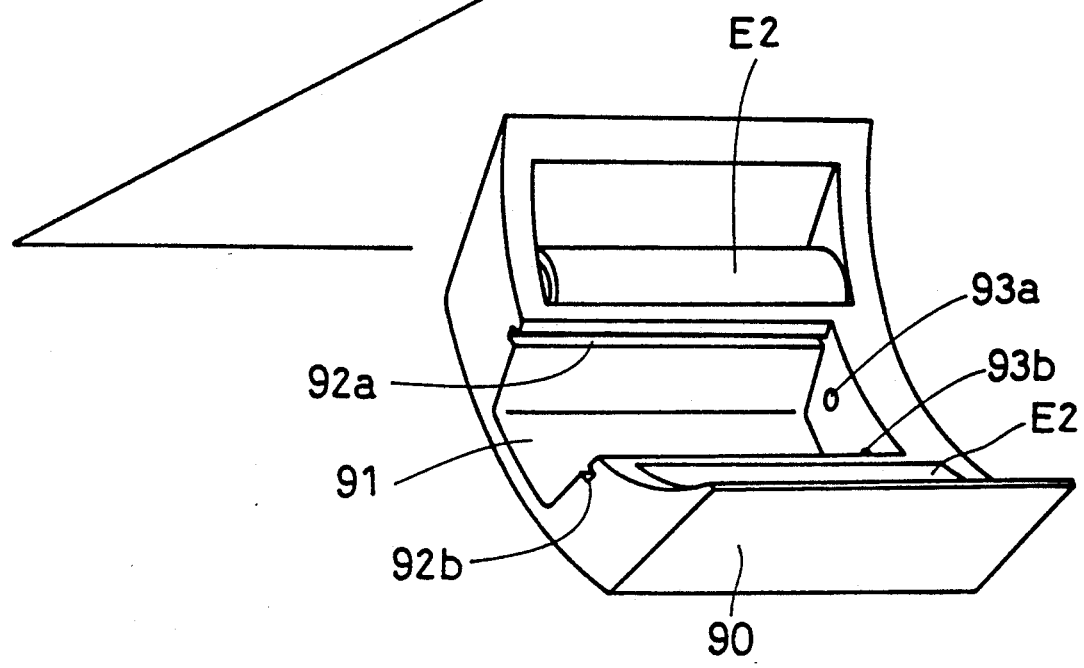

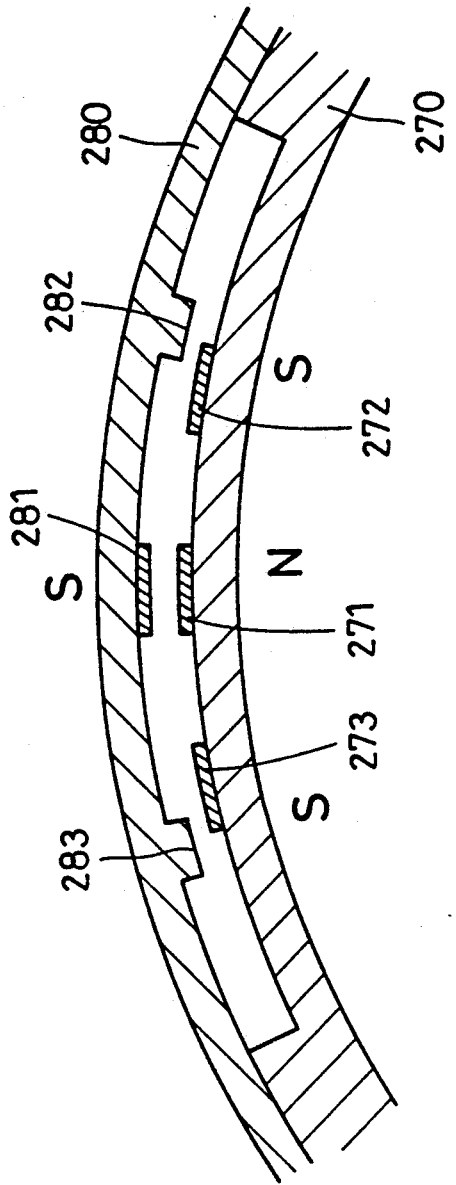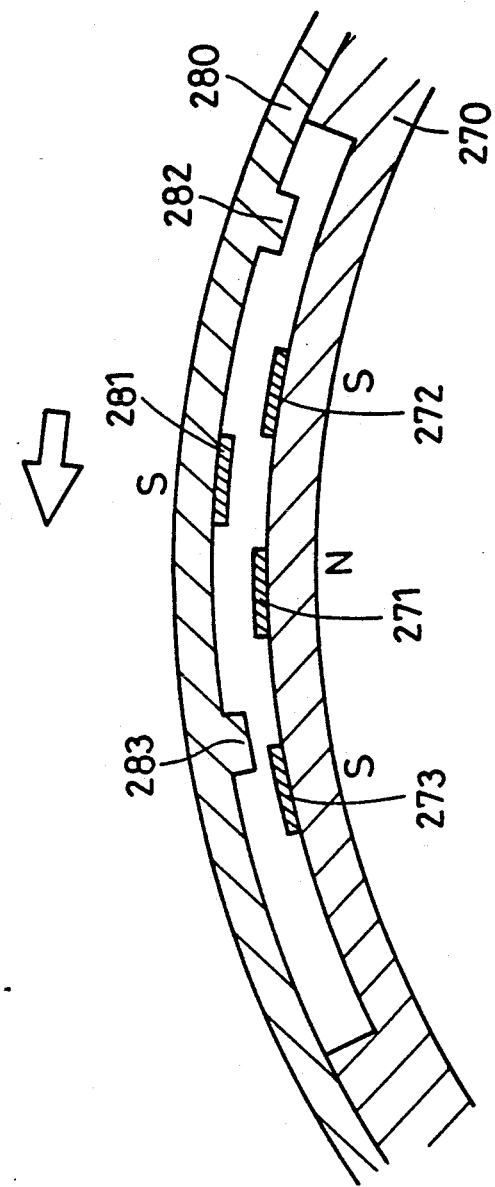

CAMERA SYSTEM WHICH COMPENSATES FOR DEFOCUSING DURING OPERATION

This application is a continuation of application Ser. No. 07/516,962, filed Apr. 30, 1990, now abandoned.

BACKGROUND OF THE INVENTION

1. Field of the Invention

The present invention relates to a camera system, and specifically relates to a camera system in which a varifocal lens is employed.

2. Description of the Background Art

A system controller of a camera has been conventionally designed to enter the halt state after completing a predetermined operation in order to save power. A start signal is thereafter sent to the controller, whereby the controller switches into the operative state to start the predetermined operation. In these types of conventional cameras, the start signal is generated due to an operation of an operation member provided in a camera body.

However, there may be situations where the controller in the camera body is required to perform a prompt operation in response to an operation on the lens side. For example, when a varifocal lens is adapted as a lens system in which a focal point position is shifted due to a zooming operation, it is indispensable to instantaneously correct the focal point position in response to the zooming operation to maintain the focused state at all times. If this correction is controlled by the system controller in the camera body, the controller must perform an instantaneous operation in response to the zooming operation on the lens side. Consequently, the conventional camera can not satisfy the above-described request because the start signal for the controller is designed to be generated only through the operation of the operation member in the camera body.

SUMMARY OF THE INVENTION

It is an object of the present invention to provide a camera system capable of a prompt operation in response to a change in the lens condition.

In accordance with one feature of the present invention, the camera system comprises an operation member provided in an interchangeable lens adapted to be manually operated; signal sending means for sending a signal in response to the manual operation of the operation member; and a controller provided in a camera body adapted to be switched between an operative state where a predetermined operation is executed and a half state where the controller is halted after completion of the predetermined operation, the controller switching from the half state to the operative state in response to the signal from the signal sending means to execute the predetermined operation.

In the camera system constituted as described above, since the system controller in the camera body is actuated in response to the operation of the operation member on the lens side, a camera which can substantially instantaneously respond to a request on the lens side can be realized.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIG. 56(a) is a view showing a display pattern of a view-finder display part, and FIGS. 56(b) to 56(i) are views showing display examples thereof;

FIG. 67 is a perspective view showing the interchangeable lens and a battery pack;

FIG. 72 is a sectional view showing a portion of a modified operation ring applicable to the camera body of the present invention; and FIG. 73 is a sectional view for explaining the operation of the modified operation ring of FIG. 72.

DETAILED DESCRIPTION OF THE PREFERRED EMBODIMENTS

Figure 1:
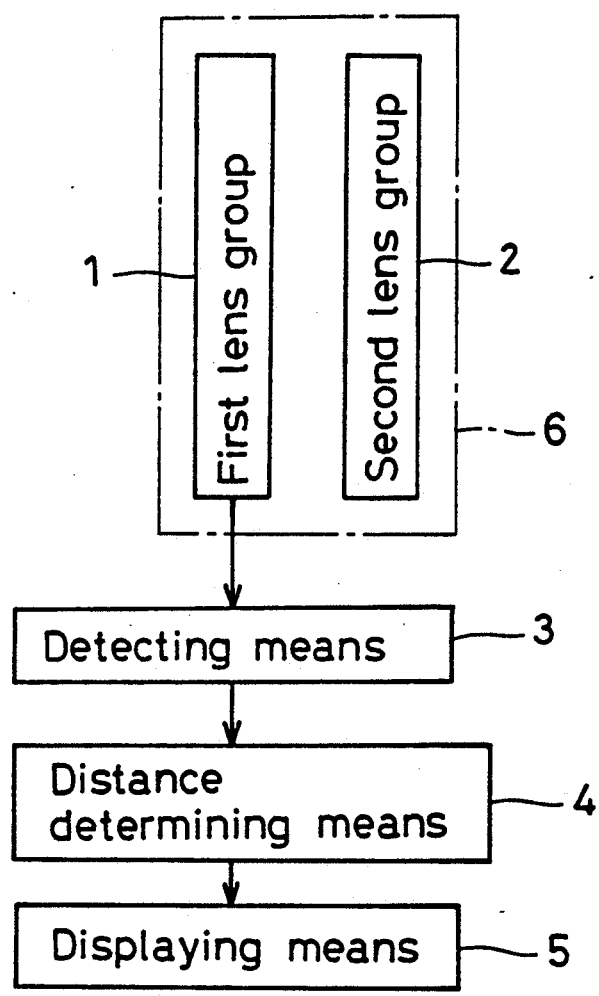
FIG. 1 is a block diagram showing a basic constitution of the device according to the present invention.

Hereinafter, an operation of an embodiment of the present invention is described referring to the drawings.

In FIG. 1, a first lens group 1 is driven in the zooming operation to vary the focal length, while a second lens group 2 is driven in the focusing operation to vary the photographing distance. According to the present system, each time the first lens group 1 is driven for zooming, the second lens group 2 must be driven to correct the resulting out-of-focus state of the subject. Additionally, the driving of the first lens group 1 causes a change in the minimum photographing distance. From this viewpoint, in the present invention, a position of the first lens group 1 is detected by the detecting means 3, the minimum photographing distance is determined based on the detected position by the distance determining means 4, and the determined photographing distance is displayed by the displaying means 5. Accordingly, a photographer can know the current minimum photographing distance corresponding to the focal length, even if the focal length is changed.

Hereinafter, detailed description is made of a configuration and an operation of a single-lens reflex camera equipped with the varifocal lens system embodying the present invention.

Figure 2A:
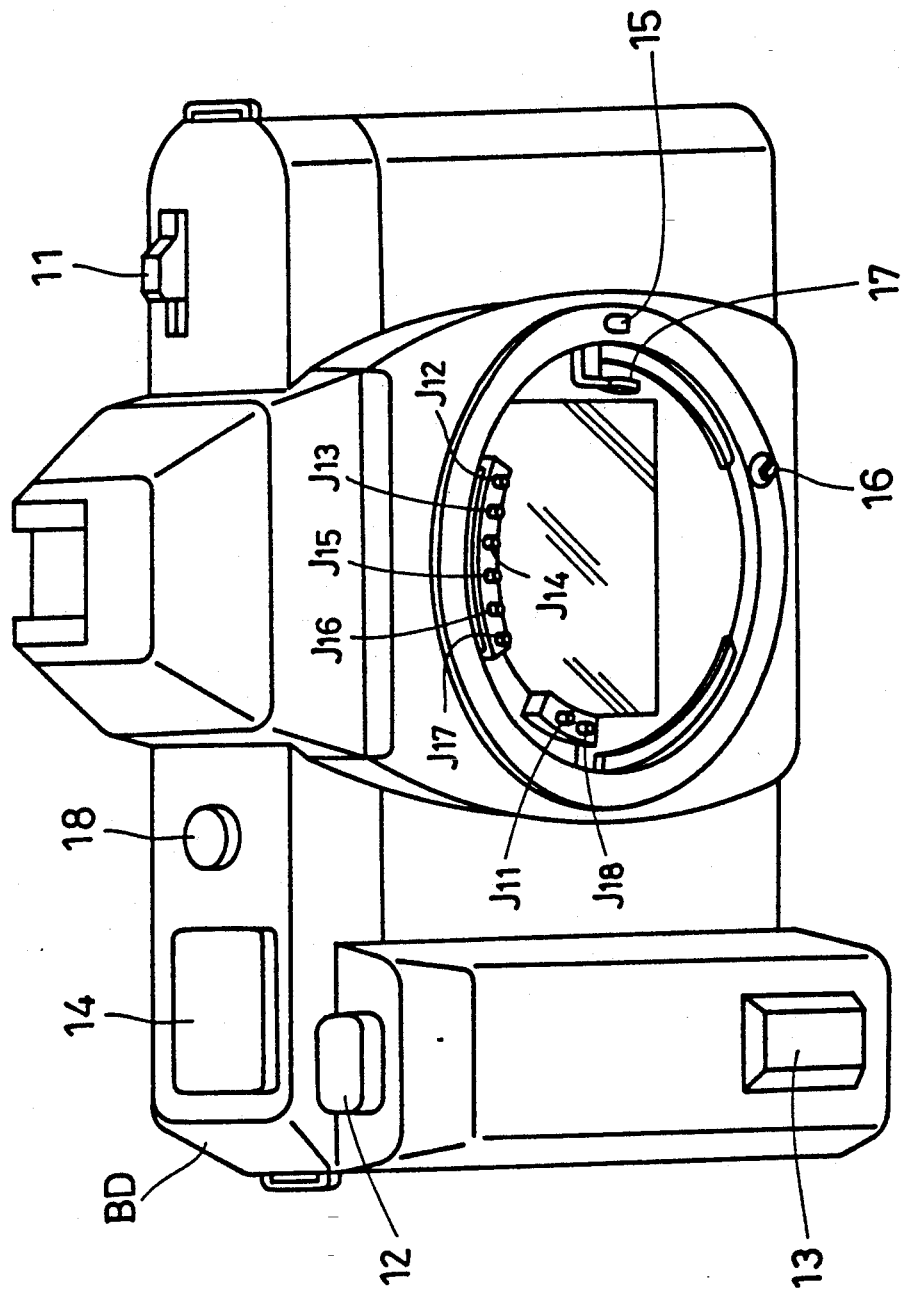
FIGS. 2(a) and 2(b) are perspective views respectively showing the external configurations of a camera body and an interchangeable lens applied to an embodiment of the present invention.
Figure 2:
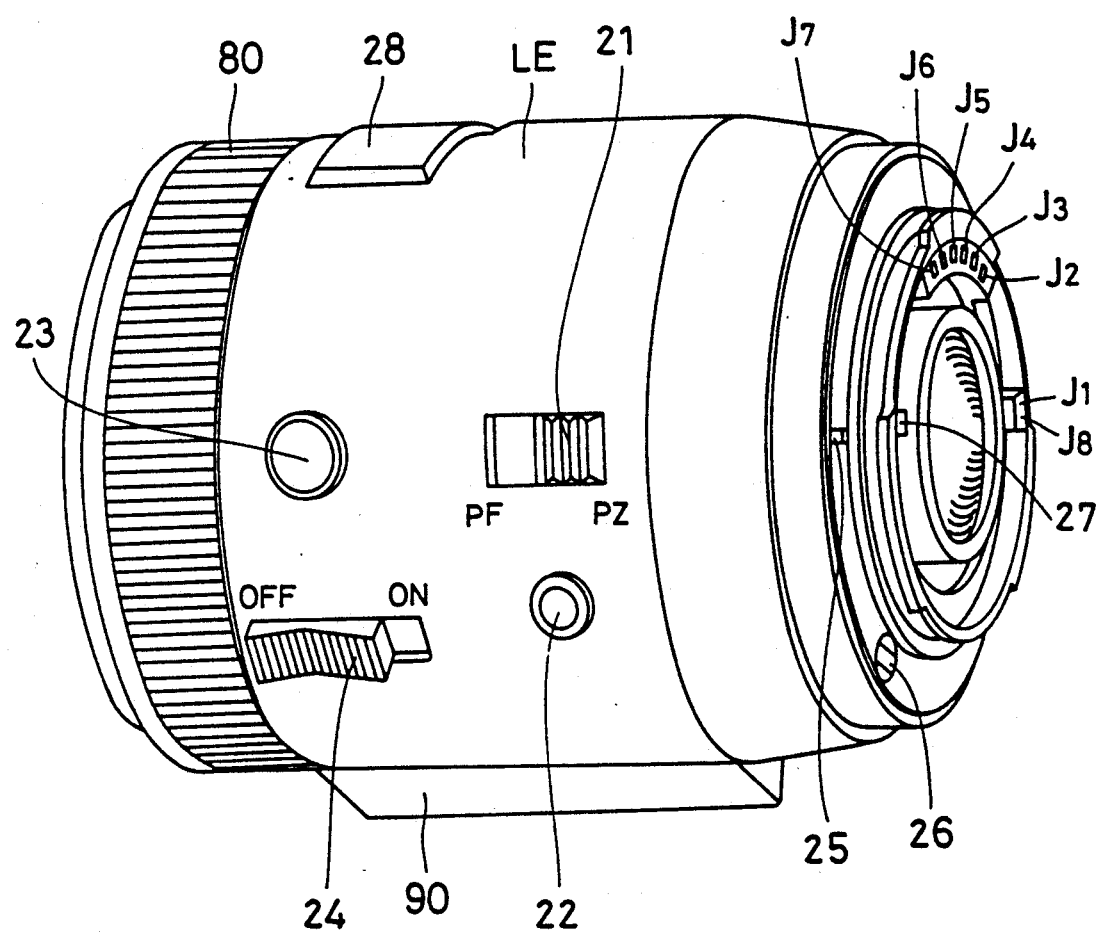

FIG. 2(a) shows the external configuration of a camera body BD constructed in accordance with the present invention, and FIG. 2(b) shows the external configuration of an interchangeable lens LE interchangeably attachable on the camera body BD.

A brief description is subsequently made of each constituent part which is assigned a reference numeral.

Referring to FIG. 2(a), a slider 11 for turning on a main switch brings the camera body BD into an operable state when it is slid to the ON position, and brings the camera body BD into an inoperative state when it is slid to the OFF position.

An operating button 12 turns on a preparation switch S1 (described with reference to FIG. 3) by its first-stroke depression to start preparatory operations such as photometry, exposure calculation and automatic focusing. The second-stroke depression turns on a release switch S2 (described with reference to FIG. 3) to start the exposure control operation.

An IC card insertion part 13 is provided for receiving an IC card incorporating a microcomputer. Due to insertion of the IC card, additional functions can be provided for the camera body BD.

The numeral 14 denotes a body display part for displaying a shutter speed, a diaphragm value, information as to the attached IC card, a battery warning mark and so on. On the other hand, on a view-finder display part (not illustrated) information such as the shutter speed, diaphragm value, zoom mode are displayed.

The numeral 15 denotes a mount lock pin. When the interchangeable lens LE is attached to the camera body BD and is in the mount locked state by means of the mount lock pin 15, a lens attachment switch $S_{LE}$ (FIG. 4) is turned off, and otherwise the switch $S_{LE}$ is in the ON state.

An AF coupler 16 is rotationally driven based on the rotation of an AF motor (not shown) mounted in the camera body BD.

A stop-down lever 17 makes the diaphragm aperture of the interchangeable lens LE narrower by stop-down steps calculated in the camera body BD.

A card key 18 is used to change-over ON/OFF of the function of the IC card.

Referring now to FIG. 2(b), the numeral 21 denotes a PF/PZ selecting lever for changing-over between electrical focusing (i.e., power focusing) and electrical zooming (i.e., power zooming) by a manual operation. When power focusing (PF) is selected, the in-body AF motor (not shown) is driven by manually rotating an operation ring 80 to allow a focusing lens group to shift in its move-in direction or move-out direction. On the other hand, when power zooming (PZ) is selected, an in-lens zoom motor (now shown) mounted in the lens is driven by a manual rotational operation of the operation ring 80 to allow a zooming lens group to move in the TELE direction (longer focal length) or the WIDE direction (shorter focal length) to change the focal length of the lens.

A mode key 22 is used for selection of various zoom modes (described later). Depression of this mode key 22 turns on a mode switch $S_{MD}$ as described later with reference to FIG. 4. A lens key 23 is depressed for performing a storage or an automatic return operation in a predetermined zoom mode (detailed description thereon is made later). Depression of this lens key 23 turns on a lens switch $S_Q$ as described with reference to FIG. 4.

The above-described storage operation is allowed by an operation of a memory key 24. The sliding operation of the memory key 24 turns on a memory switch $S_R$ as described with reference to FIG. 4.

The numerals 25, 26 and 27 denote a mount lock slot, an AF coupler and a stop-down lever, respectively. When the interchangeable lens LE is attached to the camera body BD, the mount lock pin 15 on the camera body BD is engaged with the mount lock slot 25. Additionally, a projection of the AF coupler 16 on the camera body side is engaged with a recess of the AF coupler 26 on the lens side. The interconnection of these elements allows rotation of the AF motor on the camera body side to be transmitted, via the AF couplers 16 and 26, to the lens side to move the focusing lens group for adjusting the photographing distance. In addition, the terminals $J_1$ to $J_8$ on the lens side are connected to the terminals $J_{11}$ to $J_{18}$ on the camera body side. Further, since the stop-down lever 17 is engaged with the stop-down lever 27 on the lens side, the stop-down lever 27 is moved by the movement amount of the stop-lever 17 on the camera body side. The diaphragm aperture is therefore controlled in proportion to the movement amount of the stop-down levers 17 and 27.

The numeral 28 denotes a lens display part for displaying a focal length f, a photographing distance D and so on.

The operation ring 80 is rotationally operated to specify the direction or the velocity of power zooming or power focusing.

The numeral 90 denotes a battery pack for holding an auxiliary battery.

Figure 3:
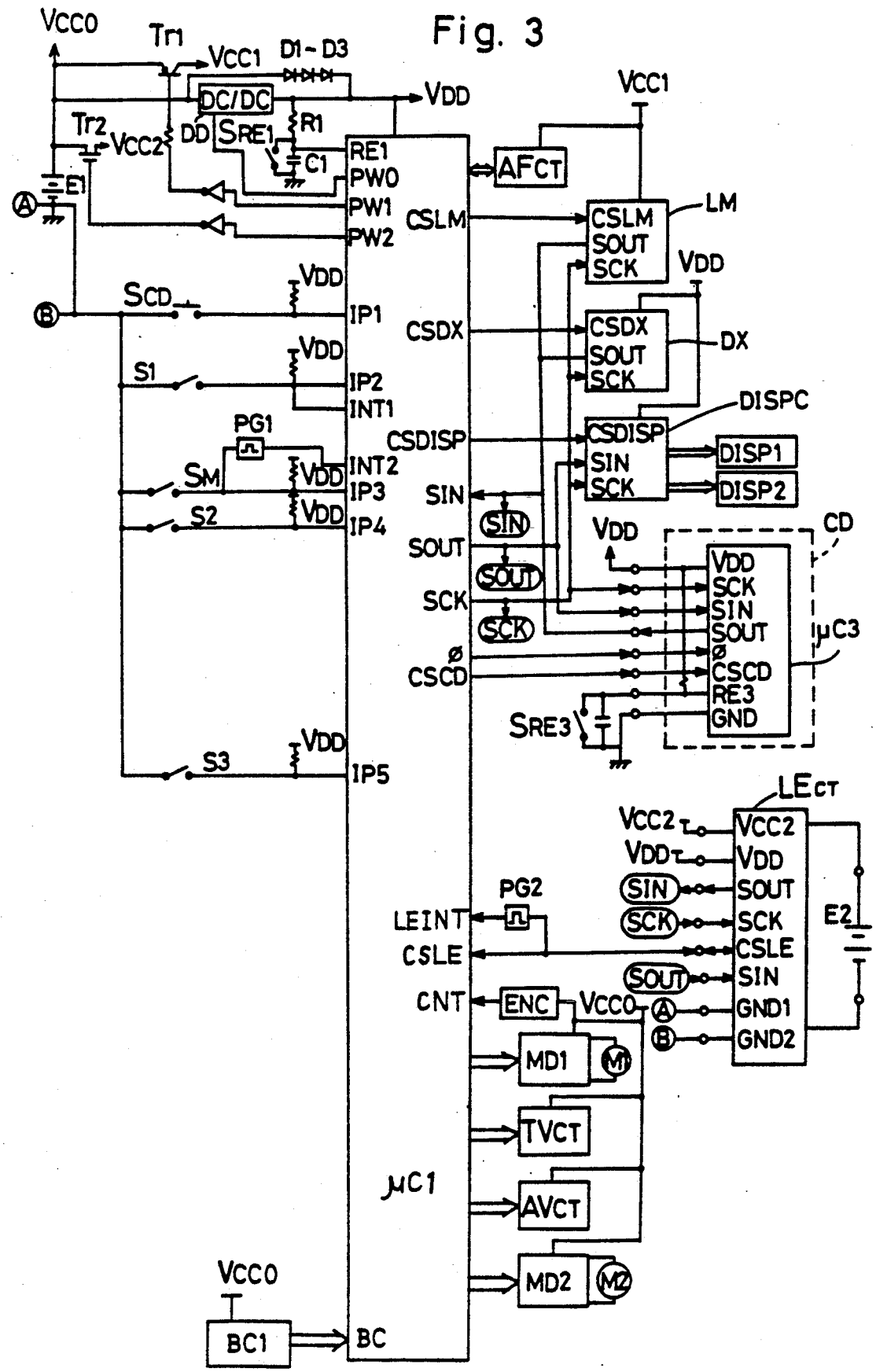
FIG. 3 is a block circuit diagram showing an in-body circuit and an in-card circuit related thereto.

Next, description is made of a circuit arrangement of an embodiment of the present camera system with reference to FIG. 3 which shows the in-body circuit and the in-card circuit related thereto.

μ C1 is an in-body microcomputer which performs control of the whole camera system and various calculations.

A light receiving circuit $AF_{CT}$ for focus condition detection includes a charge coupled device (hereinafter, referred to as CCD) for focus condition detection, a driving circuit for the CCD and a processing circuit in which the output from the CCD is supplied to the in-body microcomputer μ C1 after A/D (Analogue to Digital) conversion. The light receiving circuit $AF_{CT}$ is connected via a data bus to the in-body microcomputer μ C1. Through this light receiving circuit $AF_{CT}$, the in-body microcomputer μ C1 is given information as to the defocus amount of a subject in a distance measuring area.

LM is a photometric circuit which is arranged halfway of the optical path of view-finder light. A measured value of the photometric circuit LM is given to the in-body microcomputer μ C1 after A/D conversion as luminance information.

A film speed reading circuit DX is provided on a film case for reading data as to the film speed and sending the input data in series to the in-body micro-computer μ C1.

A display controlling circuit DISPC receives display data and a display control signal from the in-body microcomputer μ C1 to force a display part DISP1 (display part 14 in FIG. 2(a)) on the upper surface of the camera body BD and a view-finder display part DISP2 to perform predetermined displays respectively.

An IC card CD is attachable to the camera body BD by the user through insertion into the card insertion part 13. It includes an in-card micro-computer μ C3. The IC card employed in the present embodiment drives the zooming lens during exposure. Detailed description of this IC card CD will be provided later.

$LE_{CT}$ is an in-lens circuit incorporated in the interchangeable lens LE, and serves to supply information particular to the interchangeable lens to the in-body microcomputer μ C1. Detailed description of this in-lens circuit $LE_{CT}$ will also be made later.

An AF motor M1 drives the focusing lens group of the interchangeable lens LE through the AF couplers 16 and 26.

A motor driving circuit MD1 drives the AF motor M1 based on the focus condition detection information, and is controlled by a command from the in-body microcomputer μ C1 so as to rotate normally or in reverse or to stop.

ENC is an encoder for monitoring the rotation of the AF motor M1, and generates pulses every predetermined rotational angle which are provided to a counter input terminal CNT of the in-body microcomputer μ C1. Thereby, the in-body microcomputer μ C1 counts the number of the pulses to detect a move-out amount (the number CT of move-out pulses) from infinity to a present lens position, and further detects the photographing distance based on the number CT of the move-out pulses.

$TV_{CT}$ is a shutter controlling circuit which controls the shutter based on a control signal from the in-body microcomputer μ C1.

$AV_{CT}$ is a diaphragm controlling circuit which controls the diaphragm based on a control signal from the in-body microcomputer μ C1.

M2 is a motor for winding-up and rewinding of film and for charging an exposure control mechanism. The motor M2 is driven by a motor driving circuit MD2 based on a command signal from the in-body microcomputer μ C1.

The following description is made of a power supply arrangement.

E1 is a battery employed as a power source of the camera body BD.

$Tr_1$ is a first power supply transistor performing power supply to a part of the above-described circuit. $Tr_2$ is a second power supply transistor with a MOS (Metal Oxide Semiconductor) constitution which supplies a voltage to drive the in-lens zoom motor.

A DC/DC converter DD, which is operative at the time of "High" level of a power control signal PW0, serves to supply a stable voltage $V_{DD}$ to the in-body microcomputer μ C1. The voltage $V_{DD}$ is used to operate the in-body microcomputer μ C1, in-lens circuit $LE_{CT}$, in-card microcomputer μC3, film speed reading circuit DX and the display controlling circuit DISPC. A voltage $V_{CC1}$, which is used to operate the focus condition detecting circuit $AF_{CT}$ and the photometric circuit LM, is supplied from the battery E1 through the first power supply transistor $Tr_1$ under control of a first power control signal PW1. A voltage $V_{CC2}$, which is used to operate the in-lens zoom motor, is supplied from the battery E1 through the second power supply transistor $Tr_2$ under control of a second power control signal PW2. A voltage $V_{CC0}$, which is used to operate the motor driving circuit MD1, shutter controlling circuit $TV_{CT}$, diaphragm controlling circuit $AV_{CT}$ and the motor driving circuit MD2, is directly supplied from the battery E1.

$D_1$ to $D_3$ are diodes for supplying a lower voltage than the voltage $V_{DD}$ when the DC/DC converter DD is inoperative, thereby reducing power consumption. When the DC/DC converter DD is not operative, the lower voltage is set to the minimum voltage at which only the in-body microcomputer μ C1 can be made operative.

BC1 is a battery checking circuit which detects the voltage $V_{CC0}$ of the battery E1 and sends the detected voltage information to the in-body micro-computer μ C1.

GND1 is a ground line (a line connected to the ground) of a smaller power consumption part, and has the terminal $J_{17}$ (refer to FIG. 2(a)) and the terminal $J_7$ (refer to FIG. 2(b)) which are connected to each other when the lens LE is mounted to the camera body BD. In the camera body BD, separate ground lines are required for an analog and digital parts; however the two ground lines are shown as a single line in FIG. 3.

GND2 is a ground line of a larger power consumption part, and has the terminal $J_{18}$ (refer to FIG. 2(a)) and the terminal $J_8$ (refer to FIG. 2(b)) which are connected to each other when the lens LE is mounted to the camera body BD.

Next, description is made of the functions of various switches shown in the circuit diagram of FIG. 3.

A normally-opened push switch $S_{CD}$ for changing-over ON/OFF of the function of the attached IC card CD is turned on when the card key 18 is depressed.

A preparation switch S1 is turned on by the first-stroke depression of the operating button 12. When this switch S1 is turned on, an interrupt signal is sent to an interrupt terminal INT1 of the in-body microcomputer μ C1, whereby preparatory operations for photographing operations such as photometry and automatic focusing are started.

A main switch $S_M$ is turned on when the slider 11 is slide to the ON position to operate the camera system, and off when the slider 11 is at its OFF position.

A pulse generator PG1 generates low-level pulses every time the main switch $S_M$ is turned from on to off, or from off to on. The output of this pulse generator PG1 is transmitted as an interrupt signal to an interrupt terminal INT2 of the in-body microcomputer $\mu$ C1.

A release switch S2 is turned on by the second-stroke depression of the operating button 12. The photographing operation does not start until this release switch S2 is turned on.

A mirror-up switch S3 is turned on to charge the shutter mechanism at the time of completion of a mirror-up operation, and turns off the shutter mechanism when a mirror-down operation is performed.

A battery attachment detecting switch $S_{RE1}$ is turned off when the battery E1 is attached to the camera body BD. When the switch $S_{RE1}$ is off, a capacitor C1 starts to be charged through a resistance R1 to change the level of a reset terminal RE1 from "Low" to "High". Thus the in-body microcomputer $\mu$ C1 executes a reset routine as described later.

A card attachment detecting switch $S_{RE3}$ is turned off when the IC card CD is attached to the camera body BD. When this switch $S_{RE3}$ is turned off, similarly to the case of the battery attachment detecting switch $S_{RE1}$, a reset terminal RE3 of the in-card microcomputer $\mu$ C3 is changed from the "Low" to "High" level, allowing the in-card microcomputer $\mu$ C3 to execute a reset routine.

Next, description is made of the constitution for serial data communication.

The photometric circuit LM, film speed reading circuit DX, display controlling circuit DISPC and the in-card microcomputer $\mu$ C3 perform serial communication with the in-body microcomputer $\mu$ C1 through such signal lines as a serial input SIN, serial output SOUT, and a serial clock SCK. A partner of the serial communication with the in-body microcomputer $\mu$ C1 is selected through chipselect terminals CSLM, CSDX, CSDISP and CSCD. That is, the photometric circuit LM is selected when the terminal CSLM is at the "Low" level, the film speed reading circuit DX is selected in the case of the "Low" level of the terminal CSDX, the display controlling circuit DISPC is selected in the case of the "Low" level of the terminal CSDISP, and the in-card micro-computer $\mu$ C3 is selected in the case of the "Low" level of the terminal CSCD. Further, three signal lines SIN, SOUT, and SCK are connected to the in-lens circuit $LE_{CT}$ through the terminals $J_{15}$, $J_5$; $J_{14}$, $J_4$; and $J_{16}$, $J_6$ respectively (refer to FIGS. 2(a) and 2(b)). When serial communication is performed with the in-lens circuit $LE_{CT}$, the terminal CSLE is changed to the "Low" level, and this "Low" level signal is sent to the in-lens circuit $LE_{CT}$ through the terminals $J_3$, $J_{13}$ (refer to FIG. 2(a) and 2(b)).

Figure 4:
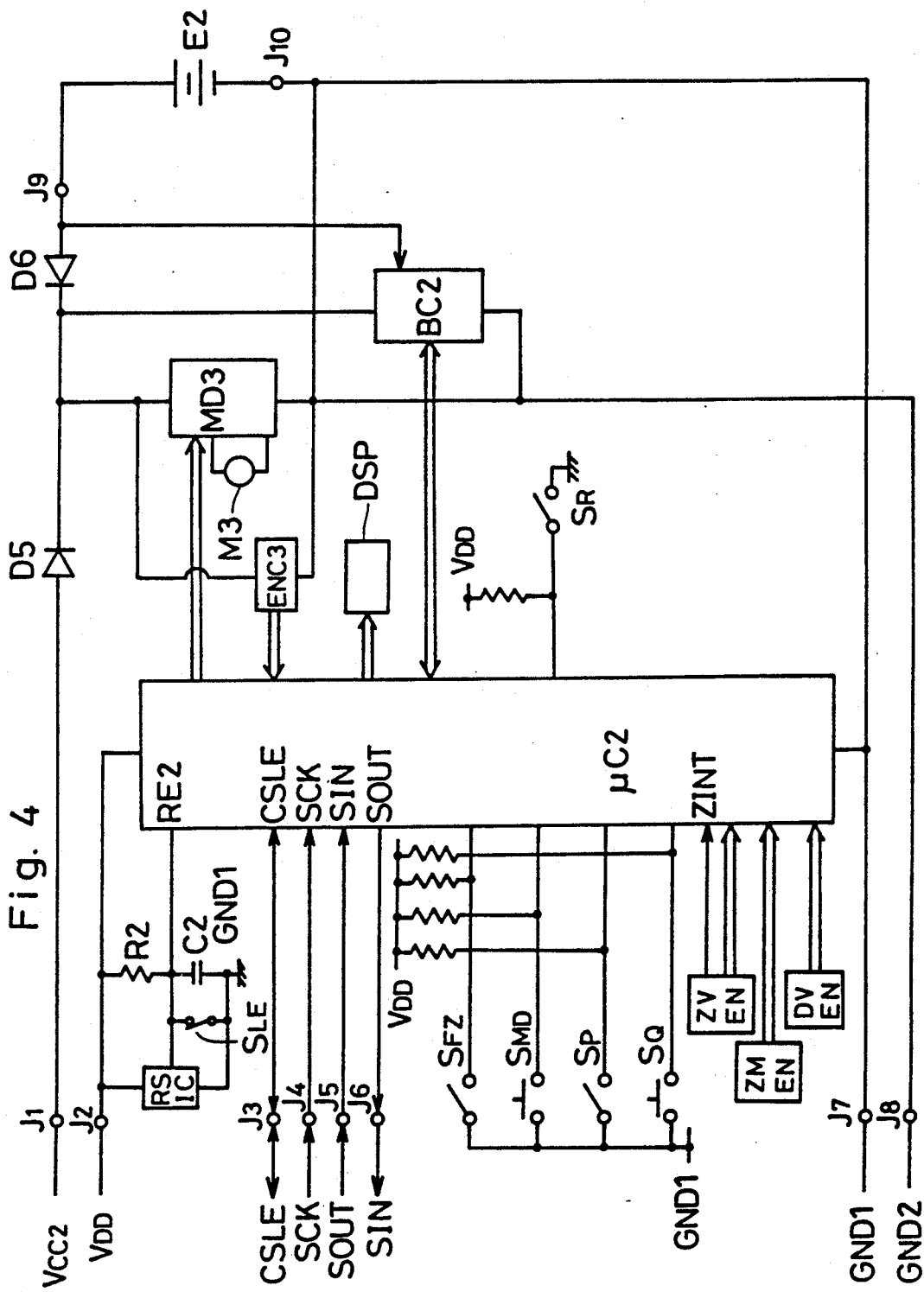
FIG. 4 is a block circuit diagram showing a circuit incorporated in an interchangeable lens.

FIG. 4 shows a circuit diagram of the in-lens circuit $LE_{CT}$ incorporated in the interchangeable lens LE. $\mu$ C2 is an in-lens microcomputer in the interchangeable lens LE for performing control of the zoom motor incorporated in the lens LE, data communication with the camera body BD and control of mode setting and so on.

Here, the description is made of the terminals $J_1$ to $J_8$ connected to the respective terminals on camera body side. $J_1$ is a power terminal for supplying the power voltage $V_{CC2}$ for driving the zoom motor from the camera body side to the lens side. $J_2$ is a power terminal for supplying the power voltage $V_{DD}$ to be used except for the zoom motor drive from the camera body side to the lens side. $J_3$ is an input/output terminal of a signal showing data communication requests. $J_4$ is a clock terminal for receiving a clock signal for data communication from the camera body side. $J_5$ is a serial input terminal for entering data from the camera body side, and $J_6$ is a serial input terminal for sending data to the camera body side. $J_7$ is a ground terminal for circuits other than the motor driving circuit, and $J_8$ is a ground terminal for the motor driving circuit. Sequentially, the description will be made of the terminals connected to the battery pack 90. $J_9$ and $J_{10}$ are a power terminal and a ground terminal thereof, respectively, for supplying the power voltage from an auxiliary battery E2 to the lens side to drive the zoom motor.

The signal line on the terminal CSLE, where signals are transmitted through the terminal $J_3$ of the lens LE and the terminal $J_{13}$ of the camera body, is a two-way signal line. That is, when a signal is sent through this signal line from the in-body micro-computer $\mu$ C1 to the in-lens microcomputer $\mu$ C2, an interrupt is applied to the in-lens microcomputer $\mu$ C2, bringing the in-lens microcomputer $\mu$ C2 into the operable state and also specifying the interchangeable lens LE for communication with the camera body BD. On the other hand, when a signal is sent through this line from the in-lens microcomputer $\mu$ C2 to the in-body microcomputer $\mu$ C1, an interrupt signal generated by a pulse generator PG2 is sent to a lens interrupt terminal LEINT of the in-body microcomputer $\mu$ C1, bringing the in-body microcomputer $\mu$ C1 into the operable state. When data communication is performed from the in-body microcomputer $\mu$ C1 to the in-lens microcomputer $\mu$ C2, the in-body microcomputer $\mu$ C1 is not designed to permit the interrupt LEINT.

RSIC is a resetting IC for applying a reset signal to the in-lens microcomputer $\mu$ C2 when the voltage $V_{DD}$ supplied from the camera body BD is lower than a normal operative voltage for the in-lens microcomputer $\mu$ C2. R2 and C2 are respectively a resistance and a capacitor for applying reset to the in-lens microcomputer $\mu$ C2.

RE2 is a reset terminal of the in-lens microcomputer $\mu$ C2. When the voltage $V_{DD}$ for driving the in-lens circuit is supplied to the lens LE and the terminal RE2 is, as a result changed from the "Low" to "High" level by means of the resistance R2 and the capacitor C2, the in-lens microcomputer $\mu$ C2 performs a resetting operation.

A zooming velocity encoder ZVEN interlocking with the operation ring 80 sets the velocity and the direction of the power zooming operation when power zooming is selected, or sets only the direction of the power focusing operation when power focusing is selected.

A zoom encoder ZMEN, which has a rough precision of detection, shows an absolute position of a zooming ring as described later. In accordance with the present embodiment, since the interchangeable lens LE with the focal length range from 28 mm to 200 mm is used, the zoom encoder ZMEN is provided with a code plate on which twelve focal length ranges are represented by 4-bit data, and a brush slidably contacted to the code plate. The focal lengths from 28 mm to 34 mm is detected as one focal length range, and in the case of over lengths 34 mm, one focal length range is allocated every time the focal length is lengthened by 15 mm.

A distance encoder DVEN detects a move-out amount from the infinity position for each focal length. As described above, the distance D is displayed on the lens display part 28 of the interchangeable lens LE according to the present embodiment. The distance D can be calculated based on the move-out amount data sent from the camera body side. In the case where this lens LE is attached to a conventional camera body which has no ability to send the move-out amount data to the lens LE, it is impossible to calculate the photographing distance D on the lens side. The distance encoder DVEN is therefore provided to display the photographing distance D even in the case of employing this type of conventional camera body.

The following description is made of a conventional camera body. The conventional camera body can not supply the power voltage $V_{CC2}$ for driving the zoom motor to the lens LE because of lack of a power terminal and a ground terminal for the power voltage $V_{CC2}$. For this reason, the lens LE according to the present embodiment is provided with the auxiliary battery E2 for driving this zoom motor. Furthermore, with the conventional camera body, data including the move-out amount data on the camera body side can not be sent to the lens side. The lens LE is therefore provided with the encoder DVEN for detecting the move-out amount as described above. Additionally, due to poor accuracy of the encoder DVEN, automatic zoom program mode and reset mode (described later) are inhibited and only power zooming can be performed when the conventional camera body is employed.

M3 is a zoom motor for driving the zooming ring as described later.

A motor driving circuit MD3 for driving the zoom motor M3 controls the rotation of the zoom motor M3 in response to a control signal showing the motor driving direction and the driving velocity provided by the in-lens microcomputer $\mu$ C2. Additionally, in response to a motor stop signal or a motor halt signal sent from the in-lens microcomputer $\mu$ C2, both terminals of the zoom motor M3 are shorted or the voltage supply thereto is stopped respectively by the motor driving circuit MD3.

An encoder ENC3 detects a rotational amount of the zoom motor M3, and further minutely detects the focal length range roughly detected by the zoom encoder ZMEN. The reason why both the zoom encoder ZMEN and this encoder ENC3 are used for the focal length range detection will be described later.

An in-lens display controlling circuit DSP performs display on the lens display part 28 (refer to FIG. 28(b)) based on data from the in-lens microcomputer $\mu$ C2. The contents of the display will be described later with reference to FIG. 58.

BC2 is a battery checking circuit for detecting a voltage of the auxiliary battery E2.

Diodes D5 and D6 supply the power voltage $V_{CC2}$ for driving the zoom motor or the voltage from the auxiliary battery E2 to the motor driving circuit MD3 and the battery checking circuit BC2, and additionally prevent countercurrents from one power source to the other one.

The following description is made of switches relating to the interchangeable lens LE.

A lens attachment detecting switch $S_{LE}$ is turned off when the interchangeable lens LE is attached to the camera body BD and brought into the mounted and locked state. In other words, when the interchangeable lens LE is removed from the camera body BD, the switch $S_{LE}$ is turned on, shorting the capacitor C2. Thereby, the capacitor C2 discharges the stored charges, bringing the terminal RE2 of the microcomputer $\mu$ C2 to the "Low" level. When the interchangeable lens LE is thereafter attached to the camera body BD, the switch $S_{LE}$ is turned off to charge the capacitor C2 through a power line $V_{DD}$. After a predetermined period of time, which is determined depending on the resistance of the resistor R2 and the capacitance of the capacitor C2, the terminal RE2 is changed to the "High" level, allowing the microcomputer $\mu$ C2 to perform the reset operation.

A mode switch $S_{MD}$ is turned on when the mode key 23 is depressed. In response to each successive switching of the mode switch $S_{MD}$, first automatic zoom program mode (AZP1 mode), two-spot automatic zoom program mode (AZP2 mode), reset mode (RST mode) and manual zoom mode (M·Z mode) are selected in sequence. AZP1 mode is a mode in which a magnification corresponding to a subject distance is automatically determined. In AZP2 mode, the magnification in the zooming operation is so determined as to link directly two magnifications, which correspond to the respective distances at two spots chosen by a photographer, relative to the distance between the two spots. Reset mode is a mode automatically returning to the distance and the focal length which were stored at a certain time. Manual zoom mode is a mode performing only the power zooming operation. In reset mode, the subject distance and focal length are set. The automatic return operation to the set distance and the set focal length is performed when a lens switch $S_Q$ is put in the ON state in manual zoom mode.

The lens switch $S_Q$ is a normally-opened push switch, which is operated at the times of data storage on two spots in AZP2 mode, and data storage on one spot in reset mode and also the automatic return operation thereafter.

A battery attachment detecting switch $S_P$ is turned on when the auxiliary battery E2 is attached to the camera body BD.

A PF/PZ changing-over switch $S_{F/Z}$, which is linked to the PF/PZ selecting lever 21 for changing-over power focusing and power zooming, is turned on when the lever 21 is at the PF position and off when it is at the PZ position.

A memory switch $S_R$, which is turned on when the memory key 24 is slid to the ON position, is operated when the storage operation is performed or released in AZP1 mode or AZP2 mode.

Figure 59:
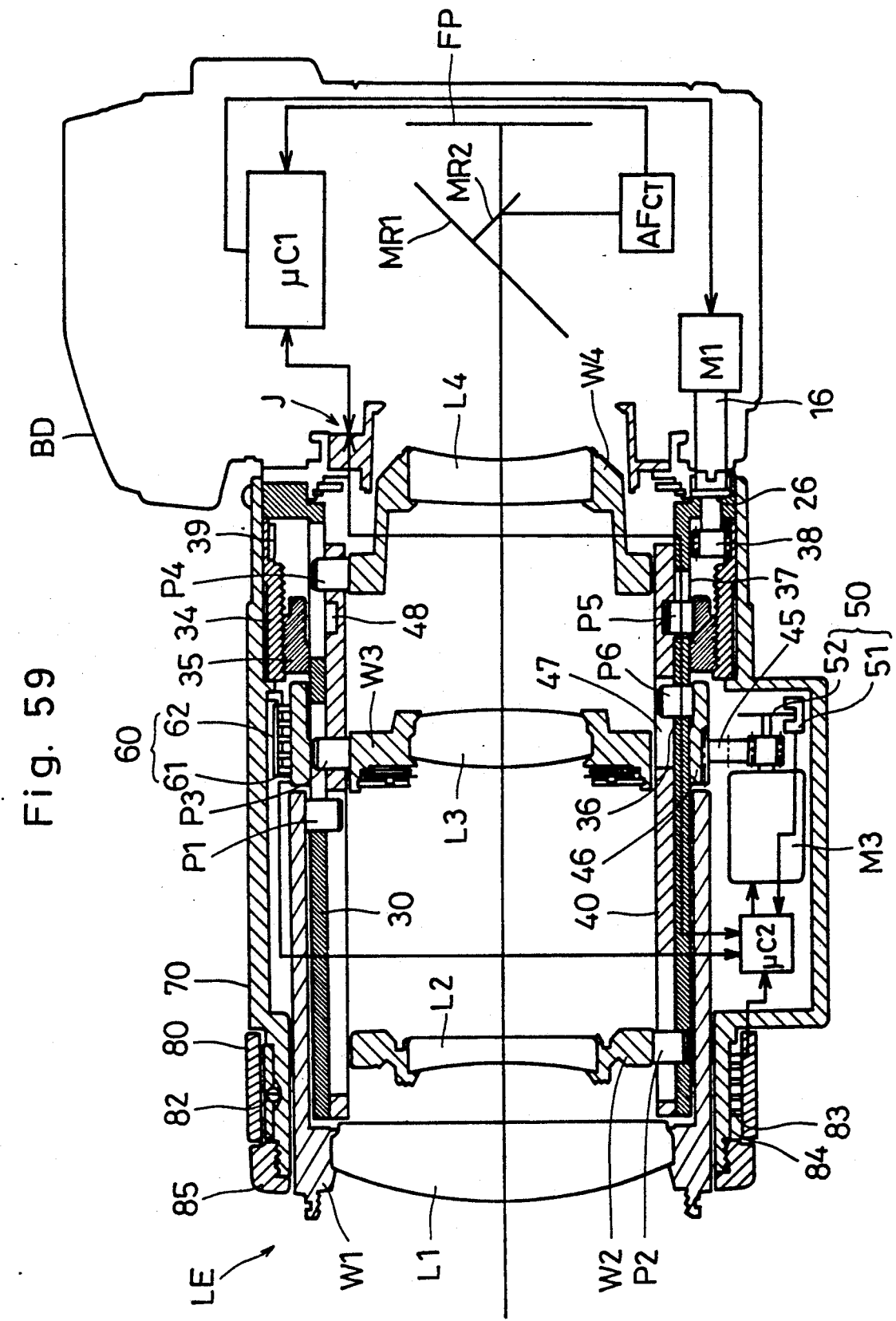
FIG. 59 is a sectional view showing the configuration of the interchangeable lens and the schematic constitution of the camera body.
Figure 60:
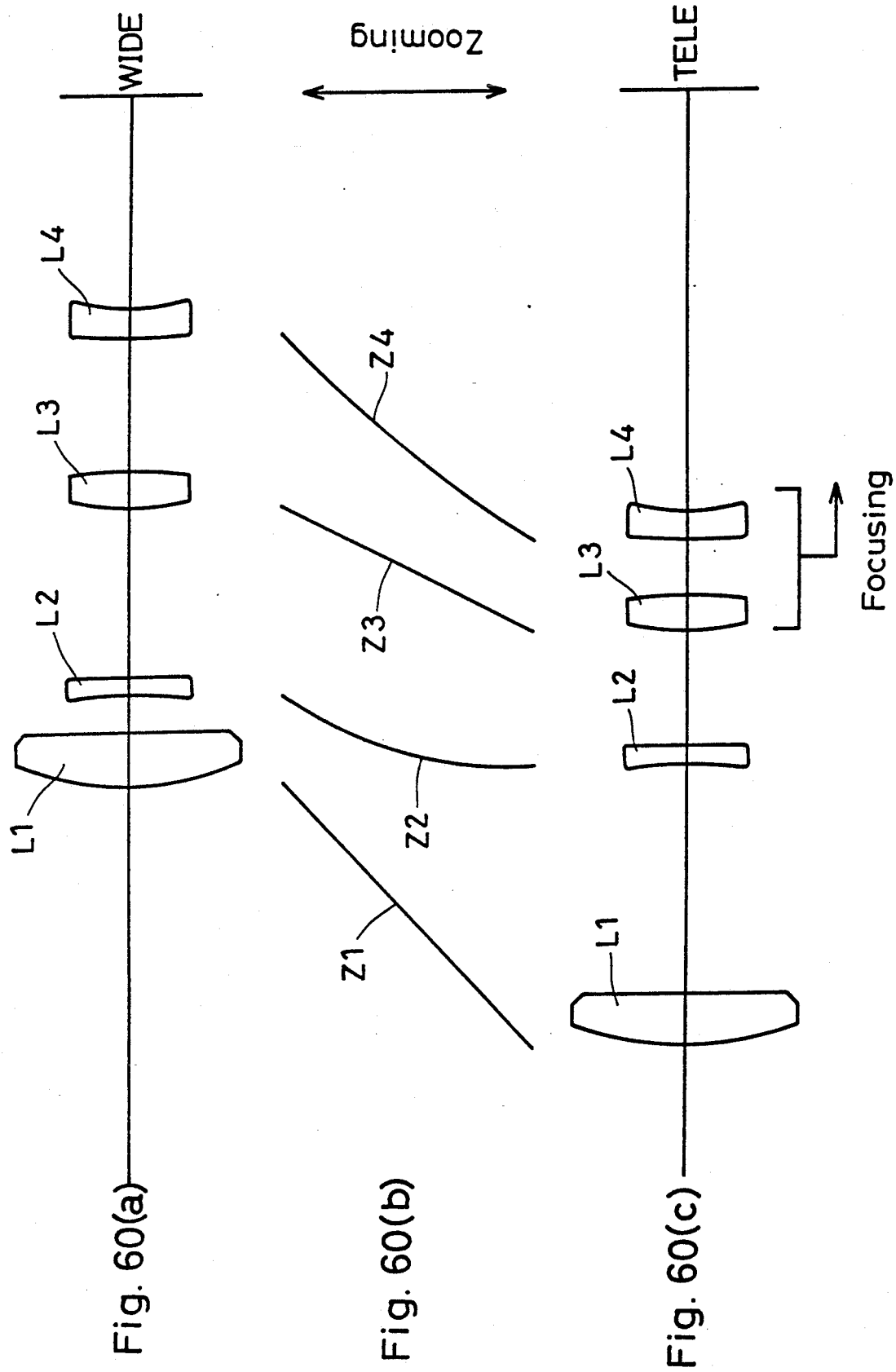
FIGS. 60(a), 60(b) and 60(c) are views for explaining the lens movement of a zoom lens system applied to the interchangeable lens of the present invention.

FIG. 59 sectionally shows the configuration of the interchangeable lens LE and schematically shows the configuration of the camera body BD to which the lens LE is attached. The interchangeable lens LE has a varifocal lens system consisting of a first lens group L1 to a fourth lens group L4. FIGS. 60(a), 60(b) and 60(c) are explanatory views for explaining the moving amounts of the first lens group L1 to the fourth lens group L4 in the varifocal lens system. In FIG. 60(b), curved lines Z1 to Z4 show the shifting lines of the first lens group L1 to the fourth lens group L4 in the zooming operation. The optical axis of the lens is horizontally shown, while changes in focal length due to the zooming operation is longitudinally shown. FIG. 60(a) shows the arrangement of the first lens group L1 to the fourth lens group L4 at the WIDE end (the shortest focal length condition), while FIG. 60(c) shows the same at the TELE end (the longest focal length condition). In any zooming position between the shortest and the longest focal length, the first lens group L1 to the fourth lens group L4 are interlockingly shifted so that the respective lens groups L1 to L4 are designed to be arranged on the intersection point of the curved lines Z1 to Z4 and any horizontal line. The zooming operation is thus performed in such a manner that the first lens group L1 to the fourth lens group L4 are independently shifted between the shortest and the longest focal length condition. On the other hand, the focusing operation (focus condition adjustment) is so performed that only the third and fourth lens groups L3 and L4 are integrally shifted forward or backward in the axial direction.

The varifocal lens system is applied to the present embodiment, in which an out-of-focus condition after each zooming operation is compensated by shifting the focusing lens groups L3 and L4. In comparison with the normal zoom lens system having the same zoom ratio, adoption of the varifocal lens system generally enables compactness and light weight of the whole lens system, and in addition gives an advantage in that the shortest photographing distance can be made shorter. Therefore, if focus condition adjustment is automatically performed each time the zooming operation is performed as described above, an advantageous varifocal lens system which is substantially as convenient as a zoom lens system can be realized.

The following is a description of the configuration and action of the interchangeable lens LE described with reference to FIG. 59.

Figure 61:
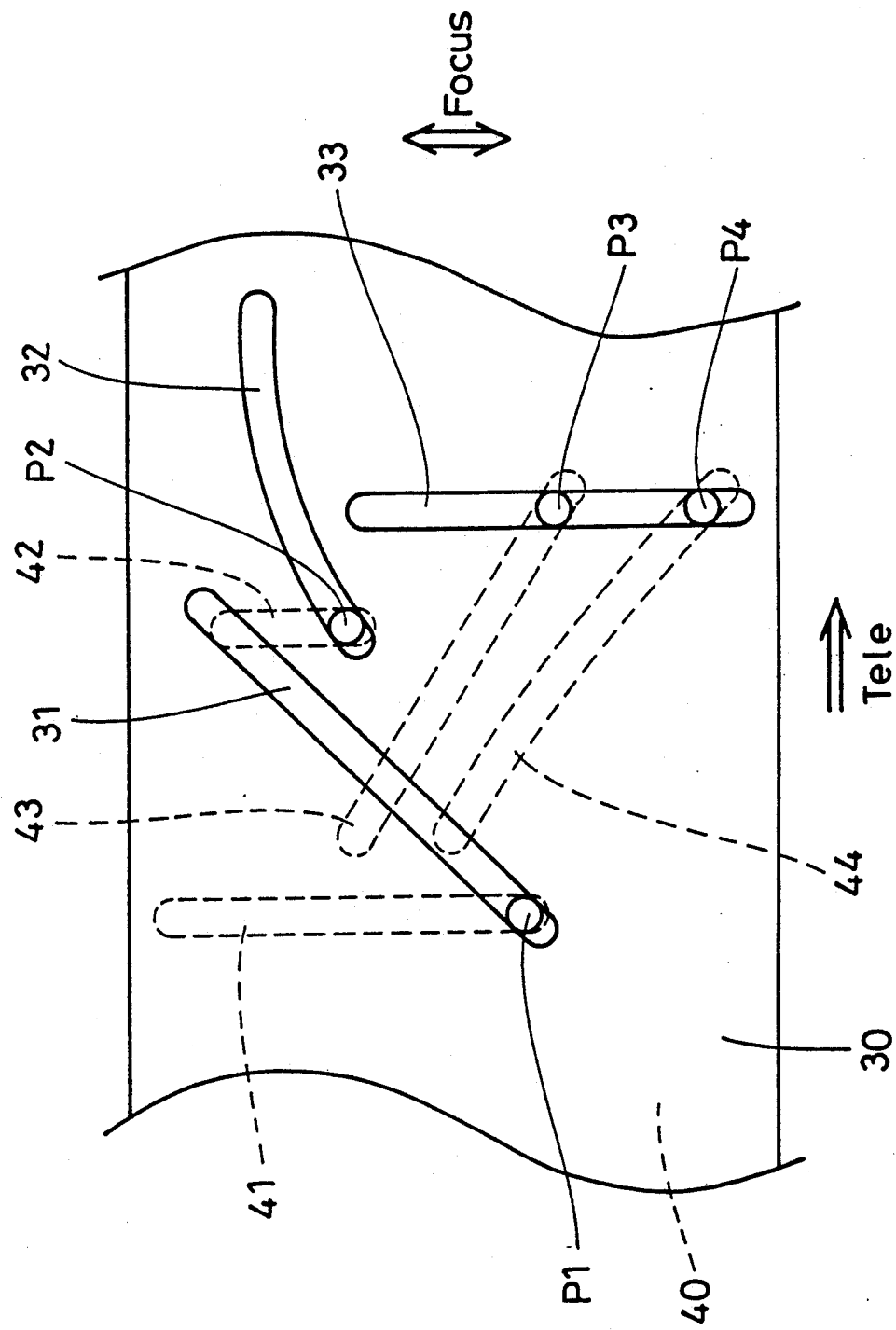
FIG. 61 is a development view showing a cam ring employed in the interchangeable lens.

In FIG. 59, W1 to W4 are frames for supporting the first lens group L1 to the fourth lens group L4. Pins P1 to P4 provided on the respective frames W1 to W4 are positioned at intersection points of the respective cams formed in a fixed cam ring 30 and a movable cam ring 40, whereby the movements of the pins are restricted. FIG. 61 is a development view of the fixed and movable cam rings 30 and 40. In FIG. 61, cams 31 and 32 on the fixed cam ring 30, which are shown by solid lines, are for the first and second lens groups L1 and L2 respectively, while a cam 33 formed by a longitudinal slot is commonly used for the third lens group L3 and L4. Further, cams 41 to 44 on the movable cam ring 40, which are shown by dash lines, are used for the first to the fourth lens groups L1 to L4 respectively. The rotational movement of the movable cam ring 40 at the WIDE end, shown in FIG. 61, causes the cams 41 to 44 to move in the TELE direction (longer focal length) shown by an arrow, whereby the first and second lens groups L1 and L2 are moved-out to the TELE end according to the respective cam shapes while rotating, and the third and fourth lens groups L3 and L4 are similarly moved-out without rotating. Meanwhile, in the focusing operation, the axial-direction driving ("Focus" direction shown by an arrow) of the movable cam ring 40 causes the third and fourth lens groups L3 and L4 to move forward or backward along the shapes of the cams 43 and 44 respectively, while the first and second lens groups L1 and L2 do not follow the driving of the movable cam ring 40 because the cams 41 and 42 are longitudinal slots.

Referring to FIG. 59, the operation ring 80 for power focusing or power zooming is manually rotatable around the optical path. The rotational operation of the operation ring 80 by a photographer starts the power focusing or power zooming operation, whose velocity is varied in proportion to the rotation and whose direction is determined corresponding to the rotational direction of the operation ring 80. After the operation ring 80 is released by the photographer, it is automatically returned to the original position due to a spring 82, completing the power focusing or power zooming operation.

Subsequently the mechanism for power focusing is explained. A shifting ring 35 for focusing is linked to a focusing ring 34 by a helical coupling. A shift transmitting pin P5 provided on the inner surface of the shifting ring 35 is longitudinally movable along a shift guide slot 37. The shifting ring 35 is accordingly movable in the axial direction, but is not allowed to rotate relative to the fixed cam ring 30. Meanwhile, the focusing ring 34 is rotatable relative to the fixed cam ring 30, but is not designed to axially move because it is engaged with a recess formed on the inner surface of a fixed cylinder 70. Thus, the rotational drive of the focusing ring 34 causes the longitudinal movement of the shifting ring 35 in the axial direction. That is, when the focusing ring 34 is rotated in one direction, the shifting ring 35 is moved forward, and the reverse rotation of the focusing ring 34 causes the backward-movement of the shifting ring 35. The focusing ring 34 is rotatable dependent on drive power transmitted from the camera body BD through the AF couplers 26 and 16. The lens-side AF coupler 26 is, at its front end, equipped with a pinion 38, which is engaged with an inner gear 39 provided on the inner surface of the back end portion of the focusing ring 34. A recess is formed on the back edge surface of the AF coupler 26, which is engaged with a projection provided on the front edge surface of the body-side AF coupler 16 to transmit the rotating power from the camera body BD. The rotation of the body-side AF coupler 16 is controlled by an AF motor M1, which is under the control of the in-body microcomputer $\mu$ C1.

Light from a subject, having passed through the lens system, is introduced by a main mirror MR1 to a finder optical system (not shown) arranged on the upper part of the camera body BD. The light is simultaneously transmitted through the center portion of the main mirror MR1, reflected by a sub-mirror MR2 and resultingly introduced to the light receiving circuit $AF_{CT}$ for focus condition detection. The light receiving circuit $AF_{CT}$ is arranged on the lower part of a mirror box. A film plane FP is arranged just behind a focal plane shutter (not illustrated). The light receiving circuit $AF_{CT}$, which is arranged in the vicinity of a predetermined image plane equivalent to the film plane FP, detects the focus condition of the interchangeable lens LE based on the light from the subject, and sends a signal showing a defocus amount and defocus direction to the in-body microcomputer $\mu$ C1. The rotation of the AF motor M1 is accordingly controlled on the basis of this signal by the microcomputer $\mu$ C1.

The following is description of the mechanism for power zooming. The rotation of the movable cam ring 40 is in response to rotation of the zooming ring 46. In particular, the zooming operation is effected in such a manner that an operation signal is sent to the in-lens microcomputer $\mu$ C2 to rotate the zoom motor M3 when the operation ring 80 is manually operated. The rotation of the zoom motor M3 is transmitted through a gear 45 to the zooming ring 46 which is rotatable but fixed in the axial direction. This is because on the inner surface of the back edge portion of the zooming ring 46, a rotation transmitting pin P6 is provided which is movable along a circumferential guide slot 36 formed along the circumferential direction of the fixed cam ring 30. The front edge of the rotation transmitting pin P6 is engaged with a shift guide slot 47. When the zooming ring 46 is rotated, the rotation is transmitted through the rotation transmitting pin P6 and the shift guide slot 47 to the movable cam ring 40, thus resulting in rotation of the cam ring 40. The movable cam ring 40 is not, however, restricted to move longitudinally due to the rotation transmitting pin P6 because the pin P6 is designed to be movable in the longer-extended direction of the shift guide slot 47. A circumferential guide slot 48 is provided on the external surface of the movable cam ring 40, having an engagement configuration with the shift transmitting pin P5 of the focusing ring 35. Therefore, the movable cam ring 40 is longitudinally shifted when the longitudinal movement of the shift ring 35 accompanied by the rotation of the focusing ring 34 is transmitted via the shift transmitting pin P5 and the circumferential guide slot 48, while the rotational movement around the optical axis of the movable cam ring 40 is performed when the rotation of the zooming ring 46 is transmitted via the rotation transmitting pin P6 and the shift guide slot 47.

According to the varifocal lens system used in the present embodiment, variation in focal length due to the zooming operation also yields variation in photographing distance. Accordingly if the subject is intended to be focused at the previously-set photographing distance also after the zooming operation is completed, compensation for focus shift is needed. For this focus condition adjustment, it is necessary to know the present focal length, which is obtained by detecting a rotational angle of the movable cam ring 40 because the rotational angle of the movable cam ring 40 from a reference position (for example, the WIDE end) corresponds to the focal length. For this reason, the rotational angle of the movable cam ring 40 is designed to be obtained by both encoders 50 (the encoder ENC3 in FIG. 4) and 60 (the zoom encoder ZMEN in FIG. 4) as described above. The in-lens microcomputer $\mu$ C2 receives information on the focal length from the encoders 50 and 60 and further sends a value for compensation corresponding to the calculated focal length to the in-body microcomputer $\mu$ C1 through an electrical contact group J. The in-body microcomputer $\mu$ C1 shifts the focusing lens groups L3 and L4 to instantaneously adjust the focus condition so as not to be out-of-focus even when the zooming operation is performed.

Figure 62:
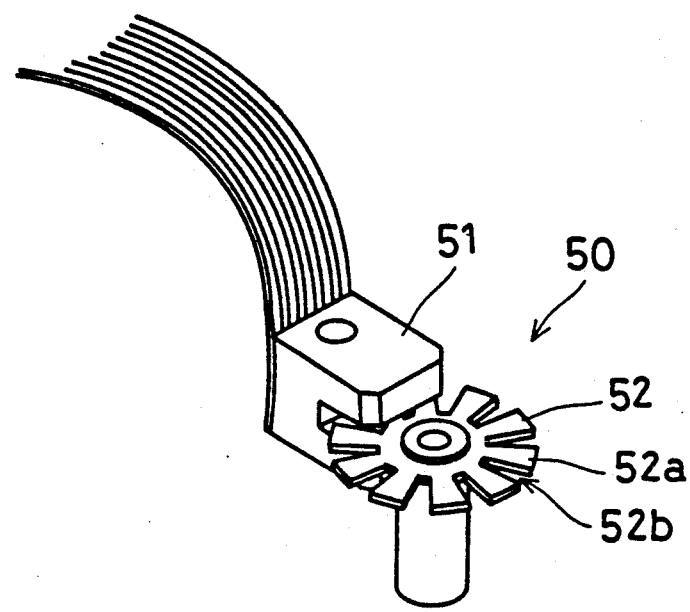
FIG. 62 is a perspective view of an encoder employed in the interchangeable lens.

FIG. 62 is an enlarged perspective view of the encoder 50 for detecting the number of rotations of the zoom motor M3. The encoder 50 is composed of a photo-interrupter 51 and an encoder plate 52. The photo-interrupter 51 consists of a light emitting diode and a light receiving diode arranged to be directed to each other. When there is no obstacle in the optical path from the light emitting diode to the light receiving diode, a light receiving signal is produced in the light receiving diode by receiving a light signal from the light emitting diode, otherwise (when there is an obstacle in the optical path), the light receiving diode does not produce light receiving output because the light signal is not received by the light receiving diode. The encoder plate 52 is constituted that a circular plate mounted on a rotating shaft which has cut-out portions at predetermined fixed angles so as to form wing portions 52a and cut-out portions 52b. The plate 52 is positioned relative to the photo-interrupter 51 such that the wing portion 52a and the cut-out portions 52b are alternately placed in the optical path of the photo-interrupter 51 while the zoom motor M3 is rotating. The photo-interrupter 51 thus generate pulse signals every time the zoom motor M3 is rotated by a predetermined angle, whereby the rotational angle of the zoom motor M3 is detected by counting the number of the pulse signals.

Figure 63:
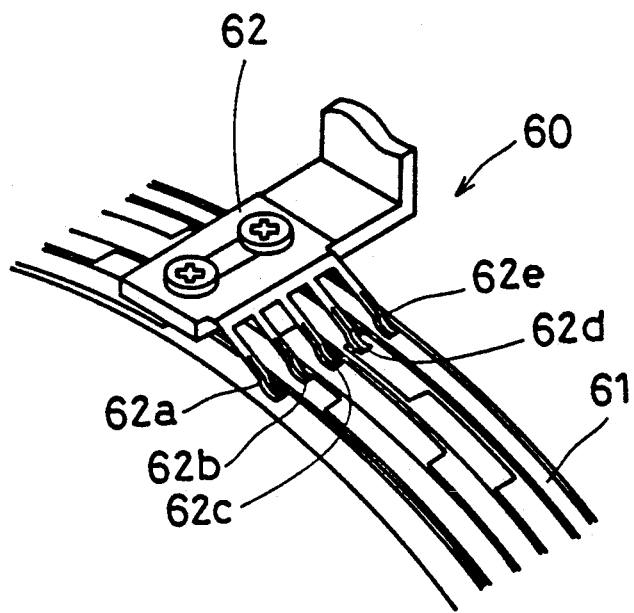
FIG. 63 is a perspective view of a zoom encoder employed in the interchangeable lens.

FIG. 63 is an enlarged perspective view of the encoder 60 for detecting a rotational angle of the zooming ring 46 with rough accuracy. The encoder 60 consists of a code plate 61 and a brush 62. The code plate 61, where five kinds of code patterns are circumferentially inscribed, is constituted by a flexible print plate fixed on the external circumferential surface of the zooming ring 46, and the brush 62 is constituted by an elastic conducting plate (including five contacts 62a–e according to the present embodiment) fixed on the inner periphery of the fixed cylinder 70. The five contacts 62a–e are slidably brought in contact with the five code patterns inscribed on the code plate 61 respectively. A conducting portion and a non-conducting portion is provided on each code pattern in the circumferential direction of the zooming ring 46. Each contact is brought in contact with the conducting portion or the non-conducting portion, whereby a digital value "1" or "0" is obtained respectively. Thus, five-bit data can be obtained from the code plate 61 corresponding to the rotational angle of the zooming ring 46.

The reason why the encoders 50 and 60 are both employed in the present embodiment will now be explained. In the varifocal lens system used with the present embodiment, the focus condition is also varied when the focal length is varied due to zooming. According to the present embodiment, the variation is photographing distance is intended to be compensated on the basis of the calculation in the in-lens microcomputer $\mu$ C2. For this purpose, information on the present focal length should first to be sent to the in-lens microcomputer $\mu$ C2. In addition, the focal length should be detected with high resolution for more an accurate calculation. In the conventional zoom lens system, since it is not necessary to detect the focal length with such high accuracy, the encoder 60 as shown in FIG. 63 with rough accuracy has been employed for the focal length detection. However, the lens system according to the present embodiment requires a higher degree of accuracy which can not be attained only by fractionizing the code patterns of the code plate 61 in the encoder 60. This is the reason why the photo-interrupter 51 which has been conventionally used for detecting the driving amount of the AF motor M1 in the camera body is provided in the lens LE. That is to say, the number of rotations of the zoom motor M3 is determined based on the number of pulses generated in the photo-interrupter 51, whereby the rotational angle of the zooming ring 46 is precisely detected. If a value of the focal length is determined depending on a rotational angle of the zooming ring 46, the accurate focal length can be detected. On the other hand, if only the encoder 50 is employed for the focal length detection in the present lens system, the following drawback is brought about, though resolution is improved compared with use of the single encoder 60 as shown in FIG. 63. Comparing with the encoder 60 which almost directly detects the rotational amount of the zooming ring 46, in the case of the encoder 50, the detection of the rotational amount of the zooming ring 46 is effected through such process that the rotational velocity of the zooming ring 46 is increased up to the same rotational angle as the axial rotational angle of the zooming motor M3 through a gear mechanism. Accordingly, the rotational amount detected by the encoder 50 possibly includes errors due to backrush and so on. Furthermore, since the encoder 50 reads-out the focal length as the number of all pulses from the TELE end or the WIDE end, for example, when as many as 1,000 pulses are generated between the WIDE end and the TELE end, it is difficult to obtain an exact absolute value of the focal length because errors are accumulated due to backrush and so on. For this reason, both of the encoders 50 and 60 are employed for obtaining the accurate focal length with higher resolution in the present lens system, where the encoder 50 further fractionizes the section in which the code output of the encoder 60 for detecting the absolute position of the zooming ring 46 does not change. That is, every time the value read-out by the code plate 61 is changed, the counter for counting output pulses of the photo-interrupter 51 is reset to zero, and output pulses of the photo-interrupter 51 is counted in the section in which the value read-out by the code plate 61 does not change. If it is previously stored how much change (mm) in focal length corresponds to one pulse from the photo-interrupter 51 in each section relative to each value read-out by the code plate 61, the encoder having higher resolution as a whole can be realized.

Figure 64:
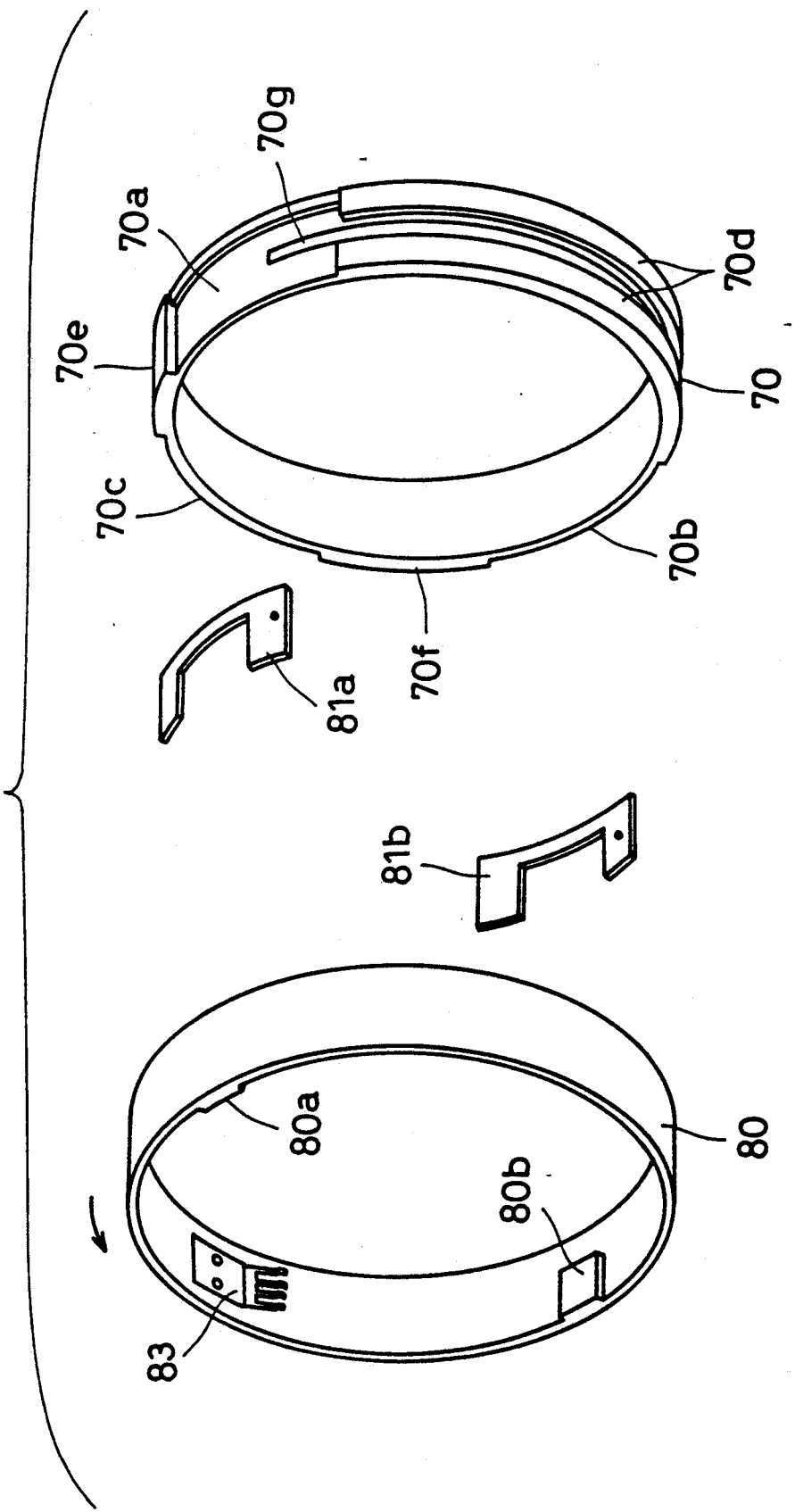
FIG. 64 is an exploded perspective view of an operation ring employed in the interchangeable lens.
Figure 65:
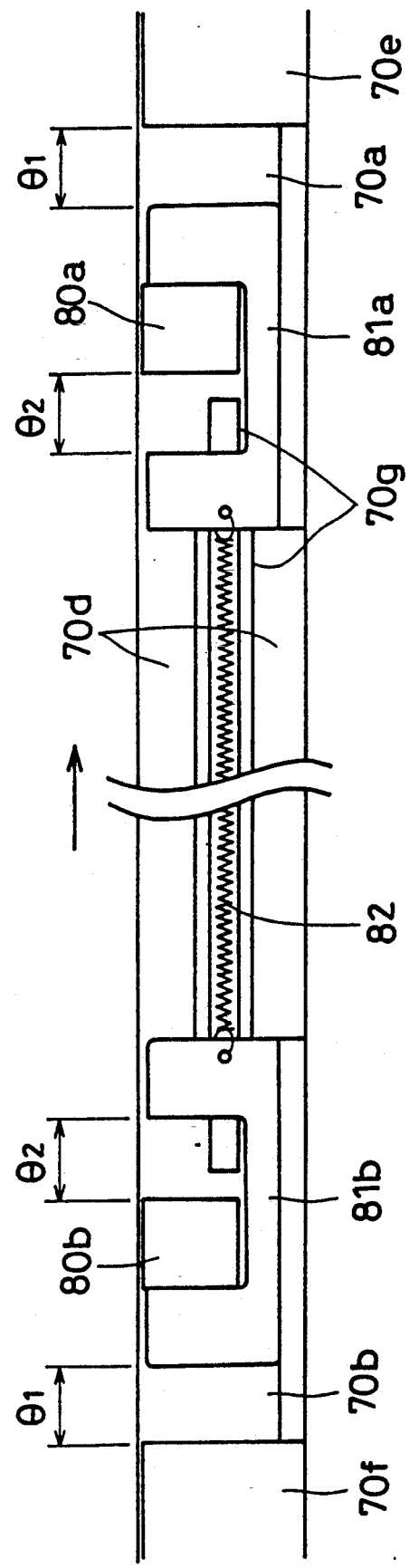
FIG. 65 is a development view of an essential portion of the operation ring.
Figure 66A:
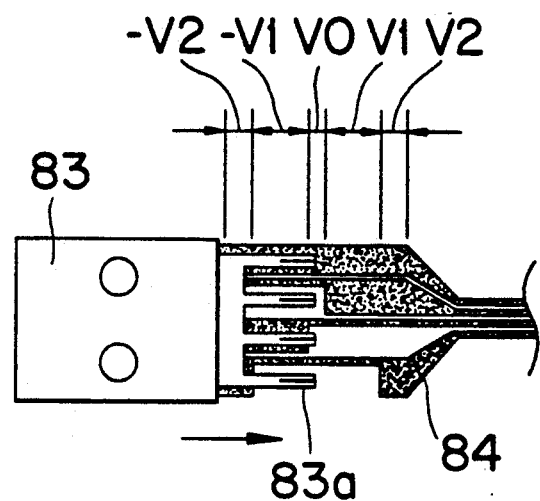
FIGS. 66(a) and 66(b) are plan and sectional views of an electrical switch portion of the operation ring.
Figure 66B:
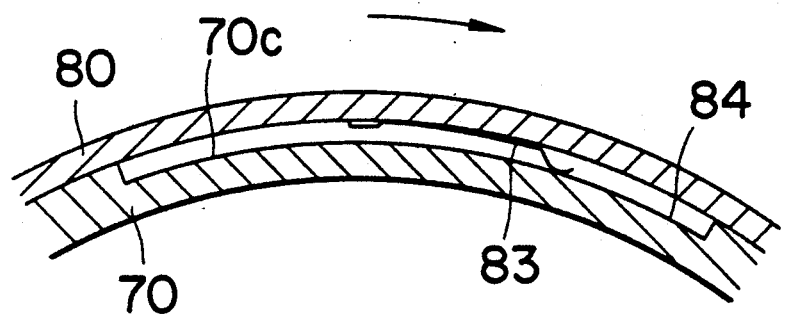

FIG. 64 is an exploded perspective view for explaining the constitution of the automatic-return type operation ring 80, and FIG. 65 is a view of the circumferentially developed operation ring 80. FIGS. 66(a) and 66(b) are a plan view and sectional view respectively for explaining the configuration of the electric switch portion. In these figures, U-shaped members 81a and 81b respectively provided on the small-diameter portions 70a and 70b are stopped at the edge portions of a large-diameter portion 70d of the fixed cylinder 70 with the pulling force of the coil spring 82 arranged along a guide slot 70g. The operation ring 80 is engaged to the large-diameter portions 70d, 70e and 70f on the inner surface thereof, with its inner projections 80a, 80b loosely fit in the U-shaped openings of the U-shaped members 81a and 81b. As shown in FIG. 65, the inner projections 80a and 80b are designed to nearly contact the external edge surfaces of the U-shaped openings. The operation ring 80 is, as shown in FIG. 59, prevented from falling out due to a circular member 85 threadingly secured to the fixed cylinder 70.

When the operation ring 80, in the state shown in FIG. 65, is manually rotated in the direction indicated by the arrow, the U-shaped member 81a, which is kept in engagement with the inner projection 80a, is shifted on the inner projection 70a in the direction indicated by the arrow against the pulling force of the coil spring 82 by a rotational angle $\theta_1$ so as to contact the edge surface of the large-diameter portion 70e. At this time, the inner projection 80b is designed to be simultaneously shifted in the U-shaped opening of the U-shaped member 81b so as to move along a rotational angle $\theta_2$ larger than $\theta_1$, and therefore the inner projection 80b and the U-shaped member 81b receive no restriction for the respective motions from each other.

When the operation ring 80 is subsequently released by a photographer's manual operation, it is instantly reversely rotated to be restored to the original state by the biasing force of the coil spring 82. This mechanism of the operation ring 80 similarly works in the case where it is manually rotated in the opposite direction to that indicated by the arrow, that is, the operation ring 80 is capable of being rotated by a distance substantially equal to the angle $\theta_1$ in both the right and left directions and returning to the original state when it is released.

In order to allow the operation ring 80 to operate as an electric switch, as shown in FIGS. 66 (a) and 66 (b), a brush 83 is secured to the inner surface of the operation ring 80 by a threaded engagement or some other means of fixation, and a code plate 84 constituted by a flexible print plate is arranged on the small-diameter portion 70c of the fixed cylinder 70. When the operation ring 80 is at the normal position as shown in FIG. 65, a brush contact 83a is within the range of "V0" shown in FIG. 66 (a) with the electric switch kept in the OFF state. When the operation ring 80 is rotatively operated in the direction of the arrow, the brush 83 is shifted on the code plate 84 so as to cause the contact 83a to enter the range "V1", and further the range "V2". Thereby, an output signal including two kinds of information is sent from the code plate 84 to the in-lens microcomputer $\mu$ C2, which controls the rotation of the zoom motor M3 so as to have a first velocity in the case of the range "V1" or a second velocity in the case of the range "V2". Also when the operation ring 80 is reversely operated, the zoom motor M3 is controlled to reversely rotate at the first velocity in the case of the range "−V1" or at the second velocity in the case of the range "−V2". The same information as is sent to the in-lens microcomputer $\mu$ C2 is transmitted also to the in-body microcomputer $\mu$ C1, whereby the AF motor M1 is controlled. According to the present embodiment, however, in the power focusing operation the rotational velocity of the AF motor M1 does not change, but only the rotational direction thereof is controlled corresponding to the operational direction of the operation ring 80 between the ranges "V1" and "V2".

As described above, the present embodiment supposes that the rotational velocity of the zoom motor M3 can be changed by two steps per one direction. It may be likewise applicable that a velocity change of more than two steps is enabled by increasing the number of contacts on the brush 83 and changing the setting of the patterns of the code plate 84.

FIG. 67 shows the external appearances of the interchangeable lens LE and the battery pack 90 removably attached thereto for holding a pair of the auxiliary batteries E2. A motor holder 71 is mounted on the bottom of the fixed cylinder 70 of the interchangeable lens LE, which is designed to be fit in a recess portion 91 formed in the battery pack 90. The recess portion 91 is provided, on the upper side walls thereof, with slide grooves 92a, 92b, and on the back wall of the recess portion 91, electrode terminals 93a, 93b are provided.

Figure 68B:
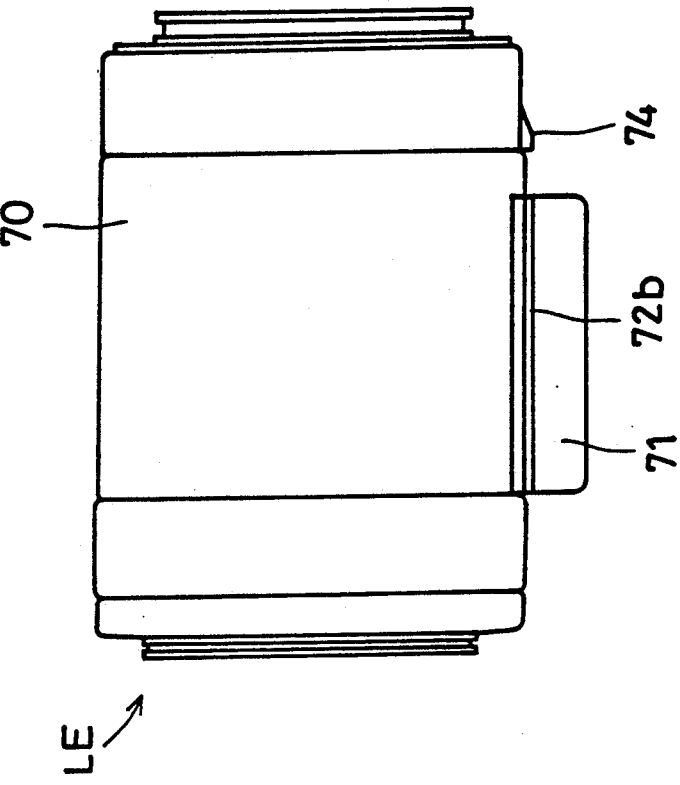
FIGS. 68(a) and 68(b) are front and side views respectively showing the state in which the battery pack is removed from the interchangeable lens.
Figure 68A:
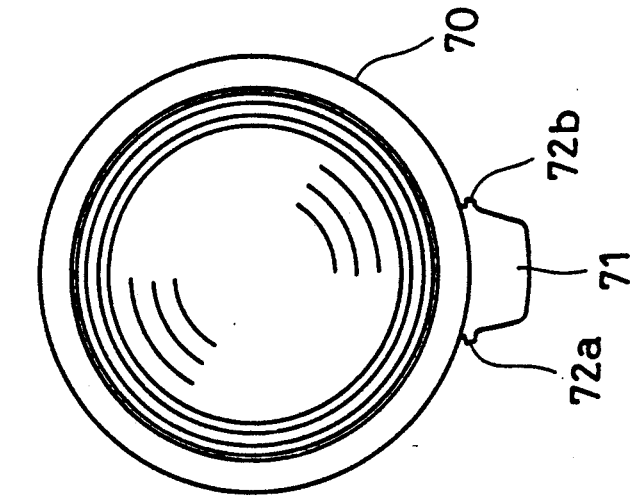

FIGS. 68(a) and 68(b) are front and side views of the interchangeable lens LE without the battery pack 90. On both sides of the motor holder 71 of the interchangeable lens LE, linear projections 72a, 72b are provided to be fit in the respective slide grooves 92 of the battery pack 90. In addition, a push-type stopper 74 is adjacently disposed behind the motor holder 71.

Figure 69A:
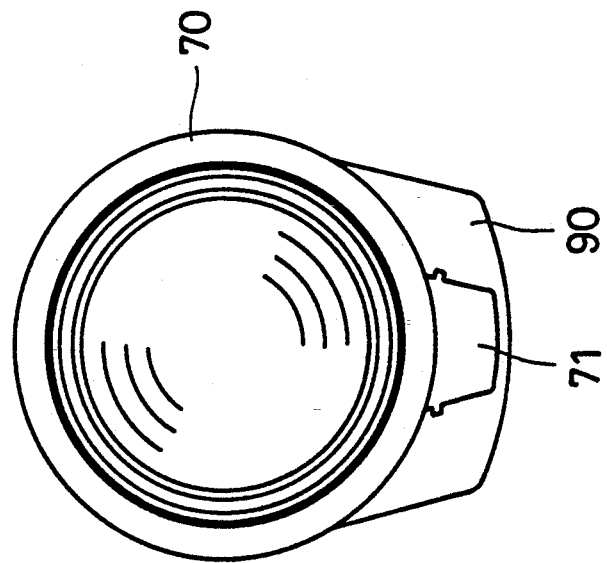
FIGS. 69(a) and 69(b) are front and side views respectively showing the state in which the battery pack is attached to the interchangeable lens.

The interchangeable lens LE with the attached battery pack 90 is subsequently shown in FIGS. 69(a) and 69(b). The attachment of the battery pack 90 is performed in a manner that the battery pack 90 is slid from the right side of the interchangeable lens LE to reach the attached state while the engagement between the slide grooves 92a, 92b and the linear projections 72a, 72b is respectively maintained. In this attached state, where the recess portion 91 of the battery pack 90 is engaged with the motor holder 71 of the interchangeable lens LE, as shown in FIG. 69(b), the push-type stopper 74 contacts the rear edge of the battery pack 90 to prevent the pack 90 from falling out.

Figure 69B:
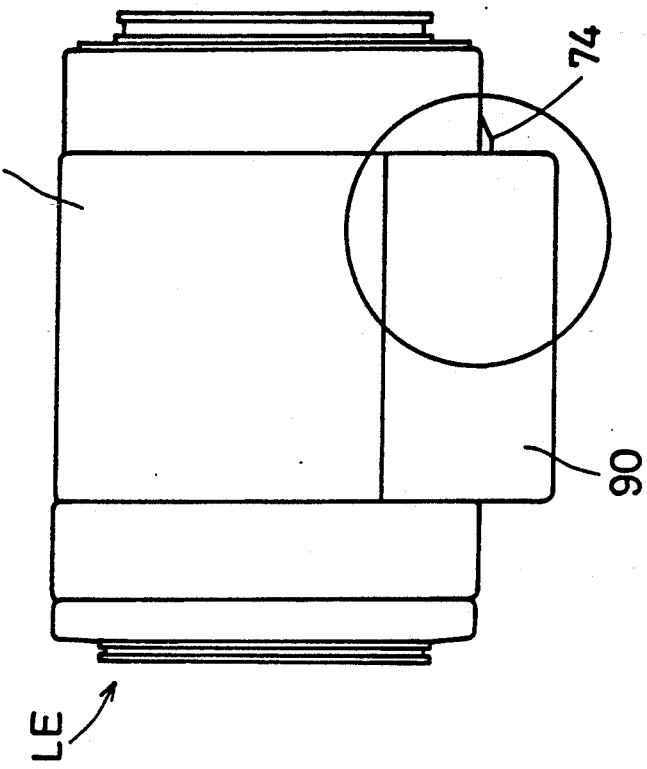
Figure 70:
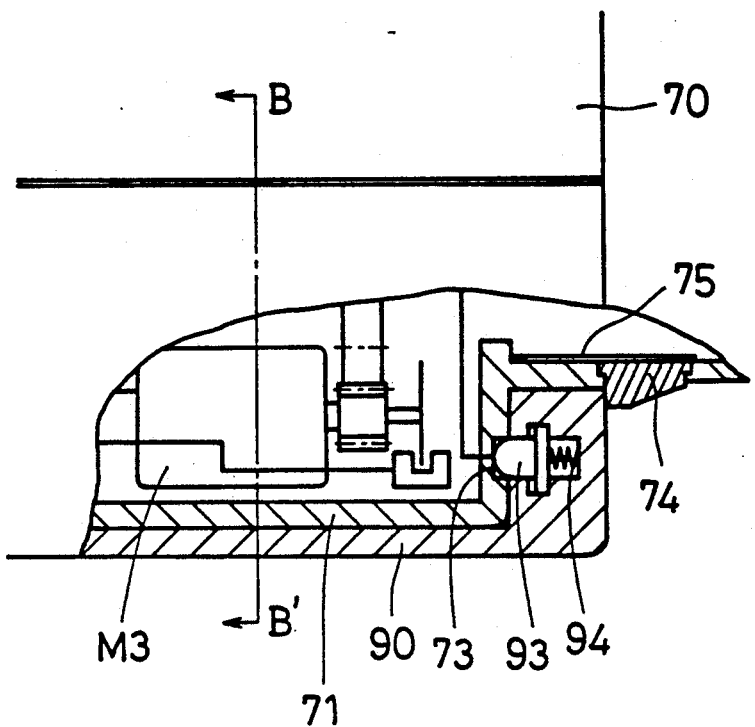
FIG. 70 is a sectional view of the circled portion of FIG. 69(b)

FIG. 70 is an enlarged view showing the configuration of the portion surrounded by the circle of FIG. 69(b). The push-type stopper 74, which is attached to a plate spring 75, normally protrudes from the fixed cylinder 70 due to the biasing force of the plate spring 75, but perfectly retracts into the fixed cylinder 70 by pressing it up. Accordingly, when the battery pack 90 is removed, the stopper 74 has only to be perfectly pressed into the fixed cylinder 70 for sliding the battery pack 90 in the right direction of FIG. 70. Receiving the biasing force of a coil spring 94, the electrode terminal 93b of the battery pack 90 is inevitably brought in contact with an electrode terminal 73 provided on the rear edge of the motor holder 71.

Figure 71:
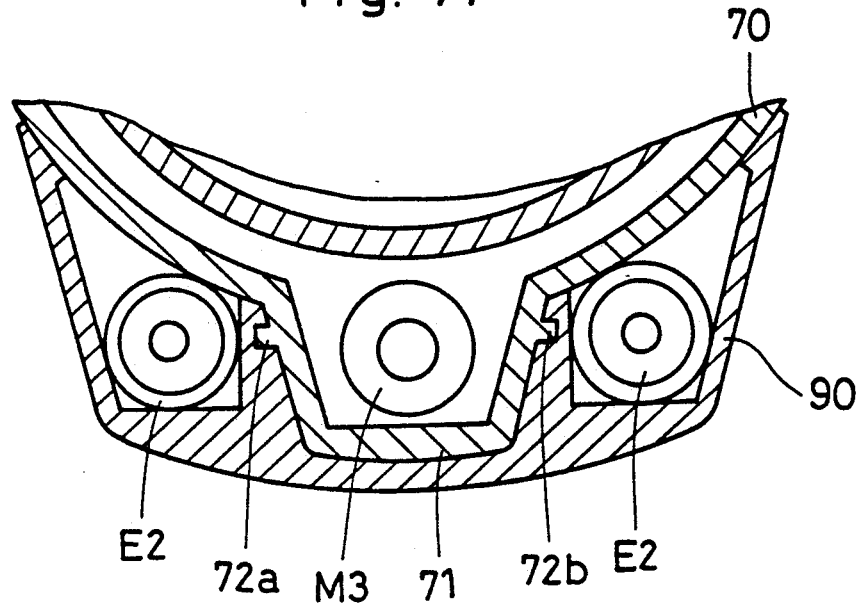
FIG. 71 is a sectional view taken on line B—B' of FIG. 70.

FIG. 71 is a sectional view taken on line B—B' of FIG. 70. As is apparent from FIG. 71, a pair of linear projections 72a, 72b of the interchangeable lens LE are fit in the slide grooves 92a, 92b of the battery pack 90, whereby the battery pack 90 is desirably designed to be prevented from falling out of the interchangeable lens LE. Furthermore, since the pair of auxiliary batteries E2 are disposed on both sides of the motor holder 71, the interchangeable lens LE with the attached battery pack 90 is desirably well-balanced both in the whole weight and external appearance.

FIGS. 72 and 73 show a modified example of the operation ring 80, in which a magnet is utilized as the automatic-return mechanism in place of the coil spring 82 as described above. FIG. 72 is a front sectional view of the modified operation ring 280 in the normal state (the electrical switch is off). As shown in FIG. 72, on the inner surface of the operation ring 280 a magnet 281 is provided with the "S" pole downside (hereinafter, referred to as "S" pole). In addition, a magnet 271 is attached to a fixed cylinder 270 with the "N" pole upside (hereinafter, referred to as "N" pole), and on both sides of the magnet 271, magnets 272, 273 with the "S" poles upside are arranged. As can be appreciated from FIG. 72, when the electrical switch is off, the stable state is brought about in which the "S" pole 281 attached on the inner surface of the operation ring 280 and the "N" pole 271 attached on the external surface of the fixed cylinder 270 are attracted to each other. When the operation ring 280 is manually rotated in the clockwise direction as shown in FIG. 73, the "S" pole 281 is separated from the "N" pole 271 and further brought near to the "S" pole 272. As a result, a repelling force in the direction indicated by an arrow of FIG. 73 is produced, whereby the operation ring 280 is automatically returned to the state shown in FIG. 72 when it is released from the manual operation. Stoppers 282 and 283 serve to restrict the rotational angle of the operation ring 280. Such a mechanism can realize the electrical switch with further simple configuration.

Completing the explanation on the hardware of the present embodiment, an example of an embodiment of the software will be subsequently described below.

Operation of in-body microcomputer μ C1

Figure 5:
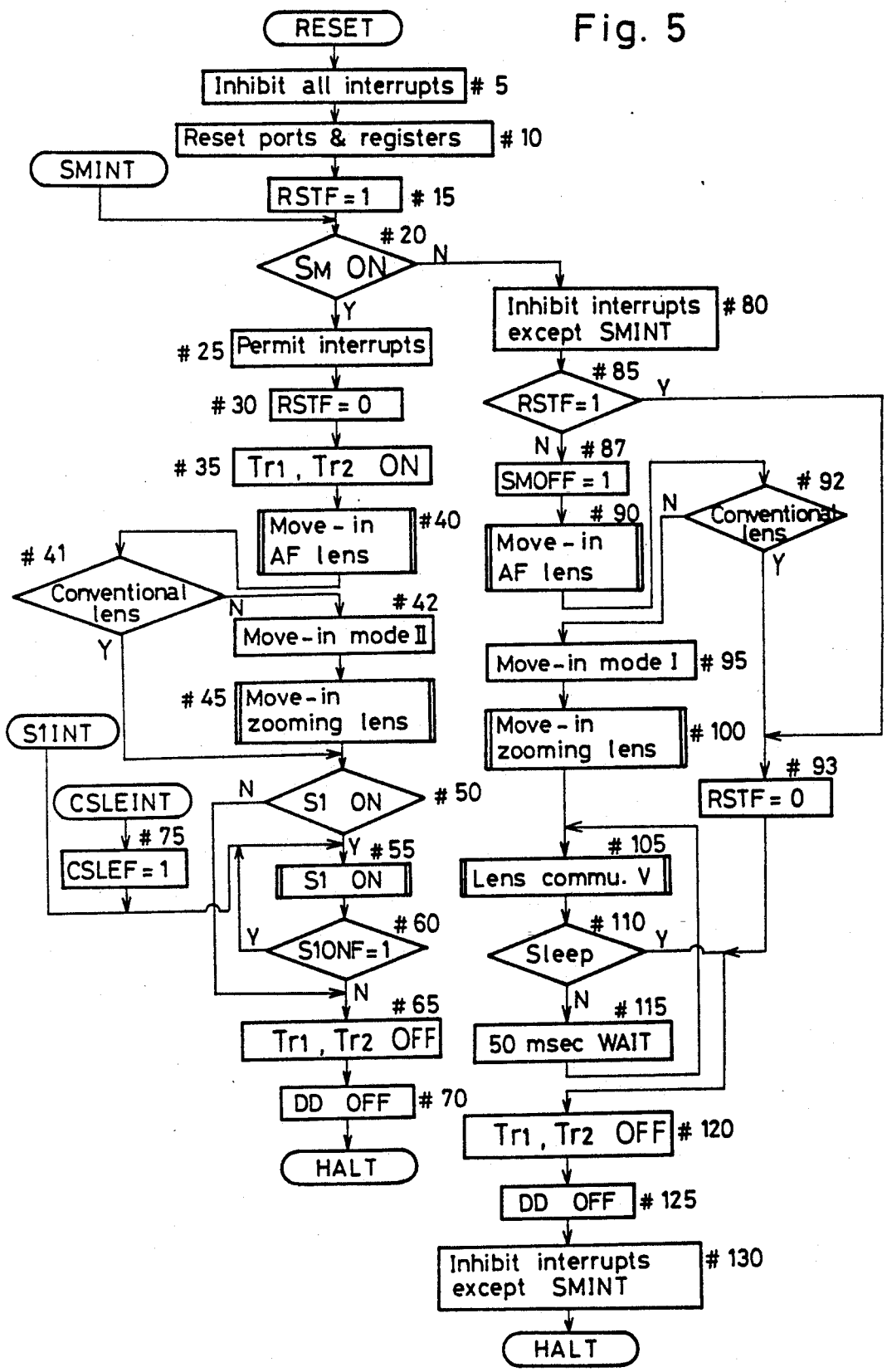
FIGS. 5–12, 13(a), 13(b), and 14–30 are flowcharts of routines and subroutines executed by a microcomputer in the camera body according to an embodiment of the present invention.

When the battery E1 is attached to the camera body BD, the battery attachment detecting switch $S_{RE1}$ (refer to FIG. 3) is turned off to start charging of the resetting capacitor C1 through the resistor R1, whereby the reset signal is sent to turn the voltage of the reset terminal RE1 of the in-body microcomputer μ C1 for controlling the whole camera system from the "Low" to "High" level. Receiving the reset signal, the in-body microcomputer μ C1 starts generation of clock pulses in an inner hardware manner, and also energizes the DC/DC converter DD to get supply of the voltage $V_{DD}$ enough for executing a reset routine as shown in FIG. 5. In the stopped state (halt state) as described later, the microcomputer μ C1 stops the generation of clock pulses and also deenergizes the DC/DC converter. In the case of control by interrupt routine from this halt state, the generation of clock pulses and the operation of the DC/DC converter start in the inner hardware manner similarly to the case of the battery attachment described above.

In the reset routine shown in FIG. 5, first, the process inhibits all interrupts, resets various ports and registers and sets a flag RSTF showing that the reset routine has been passed through (#5 to #15). Then, it is judged whether or not the main switch $S_M$ is turned on. An interrupt SMINT, initiated by the operation of the main switch $S_M$, is executed from step #20 also when the main switch $S_M$ is turned from ON to OFF or from OFF to ON. When the main switch $S_M$ is on, the process permits all interrupts, resets the flag RSTF showing passage of the reset routine and sets power control terminals PW1 and PW2 (output ports) to the "High" level respectively to turn on the transistors $T_{r1}$ and $T_{r2}$ for supplying power to each circuit and lens side circuits (#25 to #35).

Figure 6:
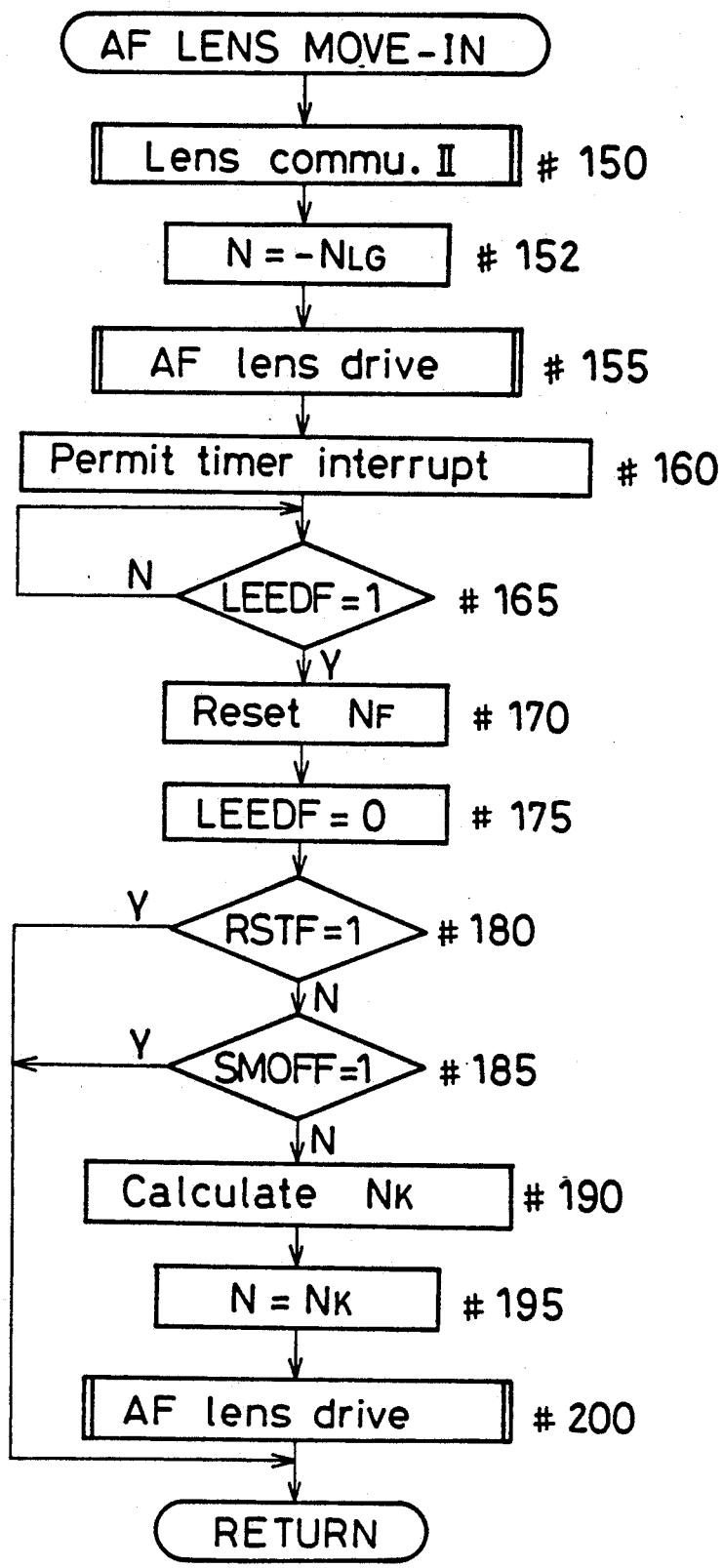

Subsequently, the process executes a subroutine of AF lens move-in (#40) which is shown in FIG. 6. In this AF lens move-in subroutine, a subroutine of lens communication II is first executed (#150).

Figure 11:
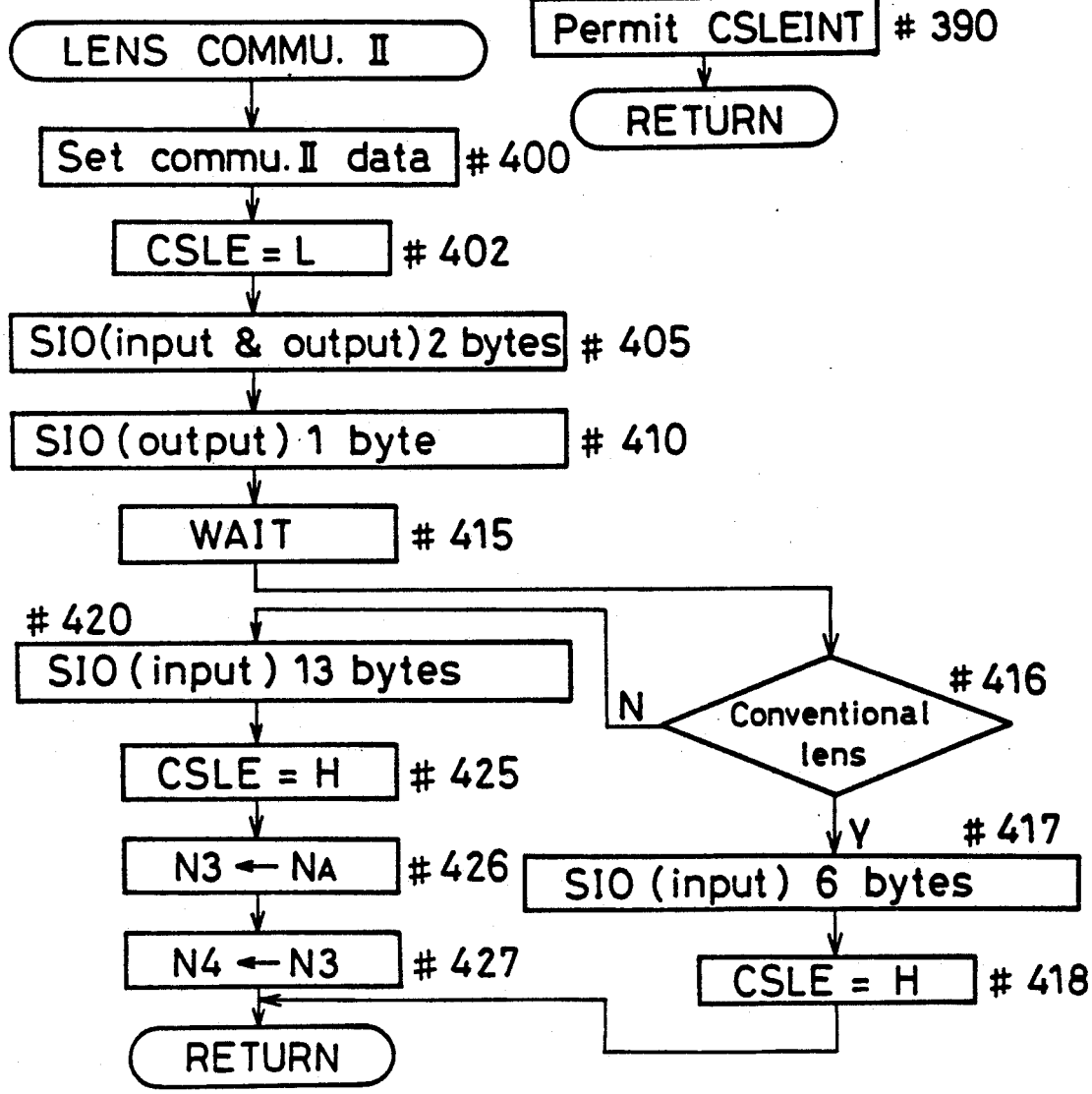

Lens communication II means a communication mode among communication modes with the lens side, in which data is received from a new-type lens (hereinafter, referred to as new lens) disclosed in the present embodiment, a subroutine for which is shown in FIG. 11. In the subroutine of lens communication II, the process first sets the data showing that the communication mode is mode II, sets the terminal CSLE to the "Low" level and informs the lens that data communication will be performed (#400, #402). Then, 2-byte serial communication is performed (#405). At this time, the camera body and the new lens send data in series to each other while receiving data from each other in series. At the first byte, data showing the kind of camera body is sent from the camera body, while meaningless data $FF_H$ (the subscript of which is a hexadecimal number) is sent from the lens side. The lens and the camera body thus receive the data from each other. At the second byte, the lens transmits data showing the kind of the lens to the camera body, while the camera body transmits the meaningless data $FF_H$ to the lens side. Then, the process sends one byte of data to the lens side to inform it that the communication mode is set to mode II, waits for a little while and judges whether the attached lens is new type or conventional type. If a conventional type, the microcomputer μ C1 receives 6-byte data from the lens, sets the terminal CSLE to the "High" level (#416 to #418) and thereafter returns. If the lens is judged to be a new-type at the step #416, the microcomputer μ C1 receives 13-byte data from the lens and sets the terminal CLSE to the "High" level (#420, #425). Thereafter, substituting a predetermined move-out amount $N_A$ in a variable N3 (described later) at step #426, and a variable N3 in a variable N4 (described later) at step #427, the process returns.

Now, description is made of the contents of the communication data between the camera body and the lens.

In the lens communication with the conventional lens, the following data particular to the lens is sent from the lens to the camera body:
(i) open diaphragm value $AV_o$
(ii) maximum diaphragm value $AV_{max}$
(iii) defocus amount—drive-amount conversion coefficient $K_L$
(iv) focal length f
(v) lens attachment signal
(vi) move-out amount—distance conversion coefficient $K_N$ Meanwhile, lens communication is performed with the "new" lens in modes I to V. Here, the respective modes are explained in detail.

In the lens communication of mode I, data representing zoom move-in mode is sent from the camera body to the lens.

In the lens communication of mode II, in addition to the above-mentioned data from (i) to (vi) as the particular data being sent to the lens, the following data (vii) to (xiii) showing the state of the lens is sent from the lens to the camera body:
(vii)
  battery check data BC
  state of the lens switch $S_Q$
  automatic zoom program mode
  ON/OFF of the zoom switch
(viii)
  signal showing power focusing (PF) or power zooming (PZ)
  moving direction and moving velocity of power zooming (PZ)
(ix) predetermined move-out amount $N_A$
(x) target focal length $f_C$ in AZP mode
(xi)
  one-bit data for view-finder display showing whether or not setting has been completed when zoom mode is reset
  one-bit data showing presence/absence of the warning data in AZP1 mode
  2-bit data showing the set state (i.e., non-set, one-spot set or two-spot set) in AZP2 mode
(xii) minimum focal length $f_{min}$
(xiii) maximum focal length $f_{max}$ In the lens communication of mode III, the following data is sent from the camera body to the lens:
(xiv)
  permit/inhibit of zooming
  presence/absence of reset
  presence/absence of focused state
(xv) move-out amount N from infinity position $N_F$
(xvi) focal length f In the lens communication of mode IV, in the zooming control operation during exposure, a signal which sets the terminal CSLE to the "Low" level is sent from the camera body to the lens.

In the lens communication of mode V, the following data is transmitted from the lens to the camera body:
(xvii) permit/inhibit of sleep It is noted that the respective data from (i) to (xvii) is sent or received between the camera body and the lens as one-byte data.

Reverting to the flow of FIG. 6, the count value N of the counter for showing the moving amount of the focusing lens groups (hereinafter, referred to as AF lens) is set to $-N_{LG}$, i.e., a negative value having a large absolute value (the sign, positive or negative, of the count value is determined by whether the first bit is "0" or "1") and thereafter a subroutine of AF lens drive is executed (#152, #155).

Figure 24:
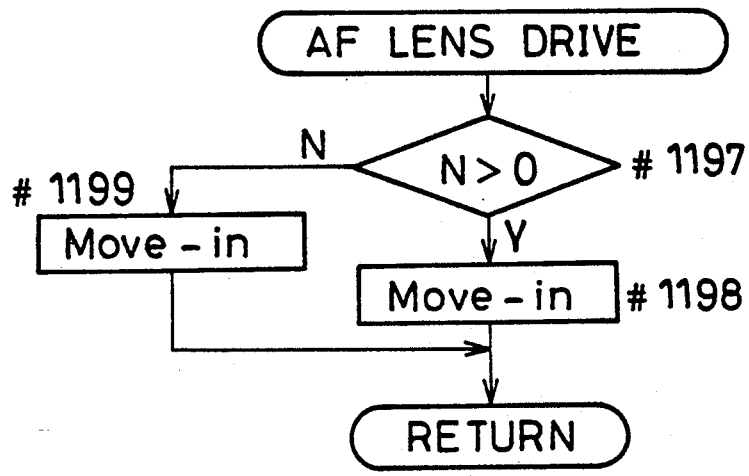

Here, the subroutine of AF lens drive is explained referring to FIG. 24. At step #1197, it is judged whether or not the sign of the AF lens moving amount N is positive (whether or not the first one-bit is "1"), whereby it is detected whether or not the lens has reached the endmost position. A signal for moving out the lens if N is positive, or a signal for moving in the lens if N is negative, is sent to the motor driving circuit MD1 (#1198, #1199), and the process returns.

According to the present embodiment, the AF lens drive is controlled by a counter interrupt and a timer interrupt. The counter interrupt is executed when a pulse showing AF lens drive is sent from the encoder ENC. The timer interrupt is executed when a next counter interrupt is not applied within a predetermined time after completing the counter interrupt, whereby it is detected that the lens has reached the endmost position (infinity or the nearest end). The reason why the process sets N to $-N_{LG}$ at the step #152 of the flow in FIG. 6 is that stopping the AF lens-drive, which is caused by setting N=0 by the counter interrupt, is prevented from occurring. In other words, this means that there is no lens having a moving amount N set as $-N_{LG}$. Then the process permits the timer interrupt, and waits until a flag LEEDF showing that the lens has reached the endmost position is set (#160, #165). When the flag LEEDF has been set, assuming that the lens has been moved in to infinity, a counter (as described later) for counting the move-out amount $N_F$ of the AF lens from infinity is reset, and the flag LEEDF is also reset (#170, #175). Thereafter, judgment is made of whether or not the flag RSTF showing that the AF lens is shifted for the move in drive by a battery attachment has been set. If the flag RSTF has been set, the process returns with the AF lens kept in the moved in state at infinity (#180). If the flag RSTF has not been set, it is judged whether or not a flag SMOFF, showing that the AF lens is shifted for the move in drive by turning off the main switch $S_M$, has been set. If the flag SMOFF has been set, the process returns with the AF lens kept in the moved-in state at infinity (#185). If the flag SMOFF has not been set, assuming that the AF lens is shifted for the move-in by turning on the main switch $S_M$, a move-out amount $N_K$ for moving-out the AF lens at a specified position is calculated (#190). This move-out amount $N_K$ is calculated in the following manner: first, the photographing distance D at the magnification $\beta$ of 1/60 and the focal length f of 80 mm is calculated by $D = f/\beta = 60 \times 80$ mm $= 4.8$ m. The move-out amount $N_K$ is obtained in a manner such that the photographing distance D of 4.8 mm is divided by the move-out amount sent from the lens, i.e., the distance conversion coefficient $K_N$. Substituting the move-out amount $N_K$ calculated by $N_K = D/K_N$ in the count value N showing the AF lens moving amount, the process performs the AF lens drive (#195, #200), and returns.

Figure 7:
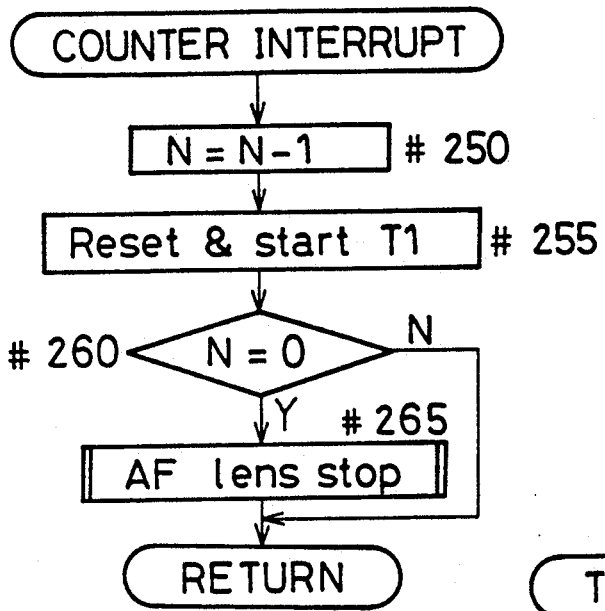

Next, the counter interrupt, which is executed when a pulse is sent from the encoder ENC, is described referring to FIG. 7. First, the count value N of the counter for showing the moving amount of the AF lens is subtracted by 1 and (N−1) is newly set as the count value N of the AF lens counter, thereafter a timer T1 for the timer interrupt is reset and started (#250, #255). Then, judgment is made at step #260 of whether or not the count value N equals zero. If N=0, judging that the AF lens has been driven by the predetermined amount, the process executes a subroutine of AF lens step at step #265 and thereafter returns. If N≠0, the process returns without executing the AF lens stop subroutine.

Figure 8:
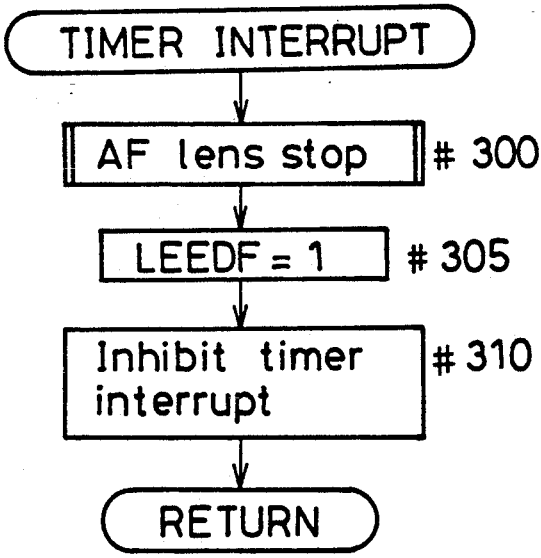

With reference to FIG. 8, the timer interrupt is subsequently described which is executed when the timer T1, reset and started in the above-described counter interrupt, has reached a predetermined value. At step #300, assuming that the AF lens has reached the endmost position (infinity or the near end), the process executes a subroutine of AF lens stop. Subsequently, the process sets the flag LEEDF showing the passage of this flow, inhibits the timer interrupt (#305, #310) and returns.

Figure 9:
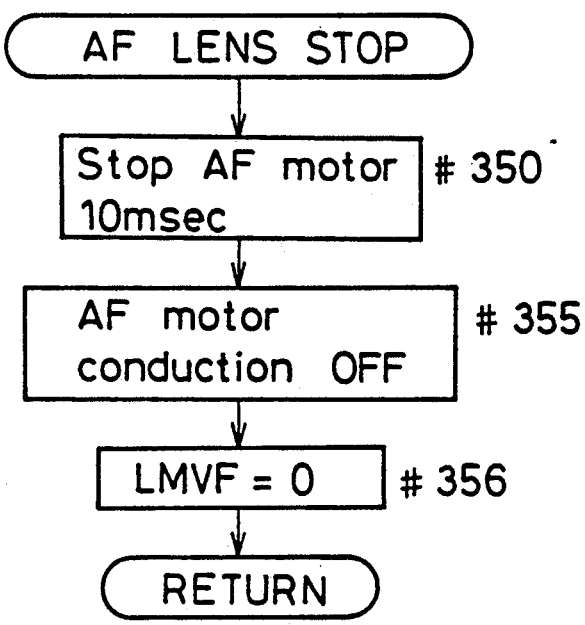

Here, the description is made on the subroutine of AF lens stop to be executed at step #265 in the counter interrupt subroutine and step #300 in the timer interrupt subroutine, referring to FIG. 9. In the AF lens stop subroutine, a control signal for shorting both terminals of the AF motor M1 is sent to the motor-driving circuit MD for 10 msec (#350). The process thereafter sends a control signal, for turning off the current flow to the AF motor M1, to the motor driving circuit MD1, resets a flag LMVF showing that the AF lens is being moved (#355, #356), and returns.

Reverting to the flow of FIG. 5, judgment is made of whether or not the conventional lens is attached: if the conventional lens is not attached, a subroutine of zooming lens move-in is executed after specifying move-in mode II to initialize the zooming lens at a predetermined position (#41, #42 and #45).

Figure 10:
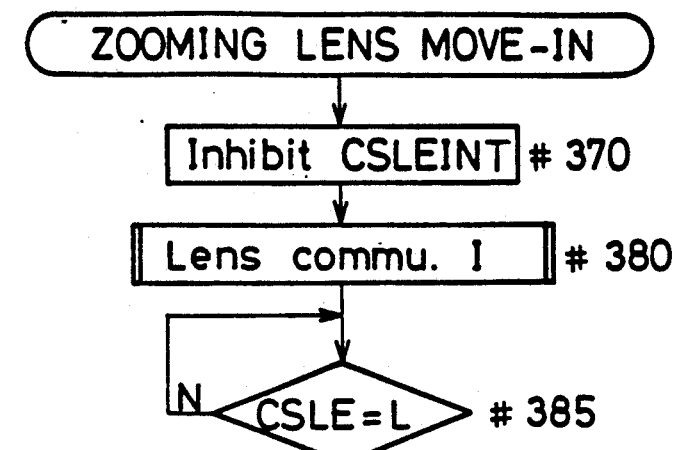

The subroutine of zooming lens move-in is now described referring to FIG. 10. In this subroutine, the process inhibits an interrupt CSLEINT due to a lens select signal from the lens, executes a subroutine of the lens communication I to transmit the data of move-in mode, and waits until a signal from the lens to the terminal CLSE of the camera body is set to the "Low" level (#370 to #385). When the signal from the lens to the terminal CSLE of the camera body is set to the "Low" level (the "Low" level signal is to be sent from the lens when the zooming lens is set at the specified position), the process permits the interrupt CSLEINT from the lens (#390) and returns.

Figure 12:
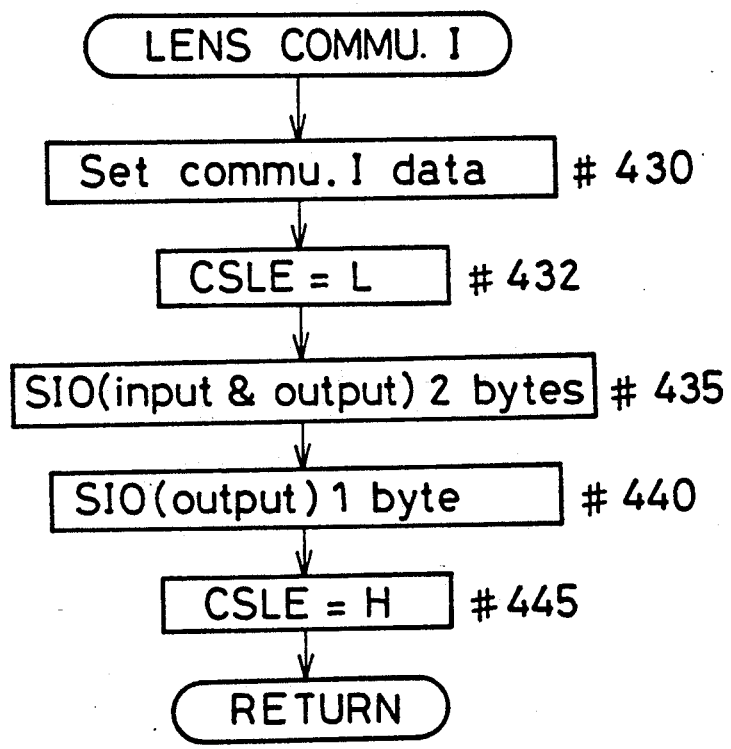

Next, the subroutine of the lens communication I is described referring to FIG. 12. The process first, in the lens communication I subroutine, sets data showing communication mode I, sets the terminal CSLE to the "Low" level, and performs 2-byte data communication with the lens to send and receive information as to each other's kind (#430 to #435). The process subsequently performs one-byte data communication to indicate the communication mode, i.e., mode I in this case, sets the terminal CSLE to the "High" level (#440, #445) and returns.

Reverting to the flow of FIG. 5, the process proceeds to step #50 if the conventional lens is attached at step #41. It is judged at step #50 whether or not the preparation switch S1 is on. In the case of the OFF state of the preparation switch S1 at step #50, the process proceeds to step #65, in which the power control terminals PW1 and PW2 are respectively set to the "Low" level to turn off the power supply transistors $T_{r1}$ and $T_{r2}$. Thereafter at step #70, the power control terminal PW0 is set to the "Low" level to stop the operation of the DC/DC converter DD. When the preparation switch S1 is on at step #50, the process executes a subroutine of S10N at step #55, and judges whether or not a flag S10NF, showing that 5 seconds have not elapsed after ON or OFF of the preparation switch S1, is set at step #60. If the flag S10NF is set, the process proceeds to step #55, otherwise (if the flag S10NF is not set) proceeds to step #65. In an interrupt S11NT executed when the preparation switch S1 is turned from OFF to ON, the process from step #55 is executed. In an interrupt CSLEINT executed when an interrupt signal is sent from the lens to the interrupt terminal LEINT, the process from step #55 is executed after a flag CSLEF, showing that the interrupt from the lens has been applied, is set at step #75.

Figure 13A:
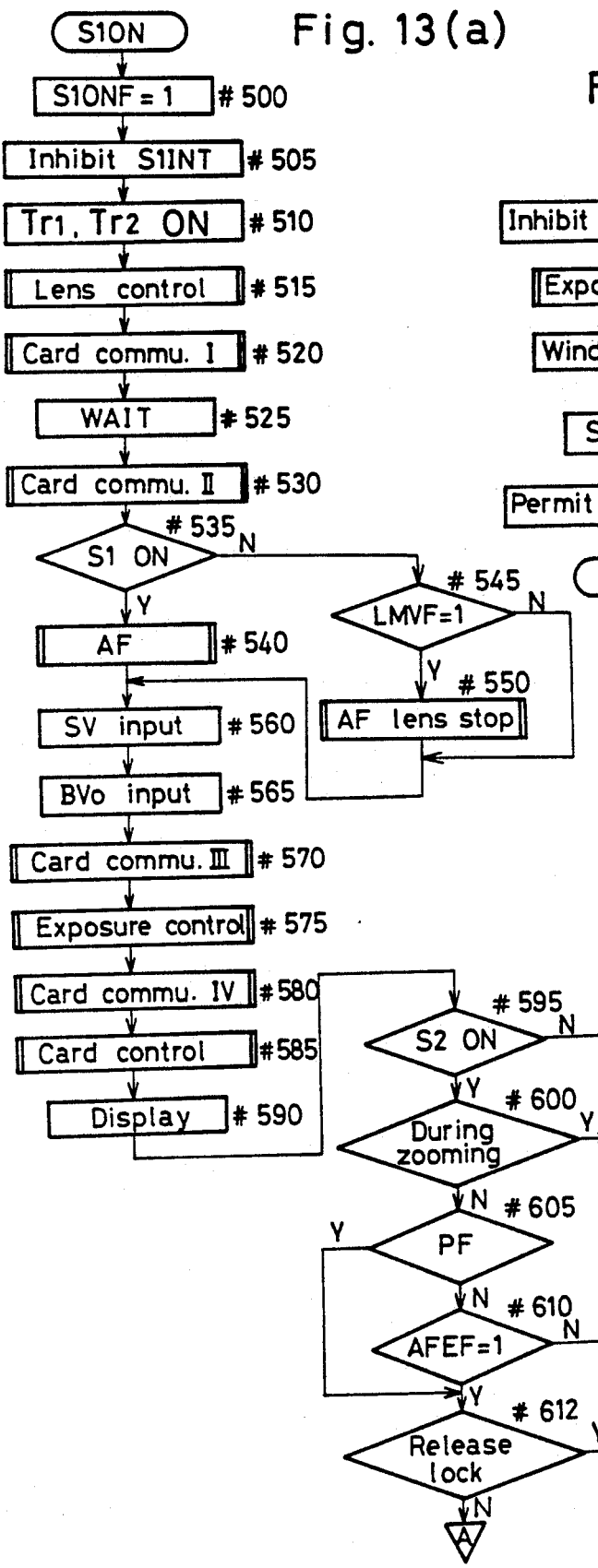
Figure 13B:
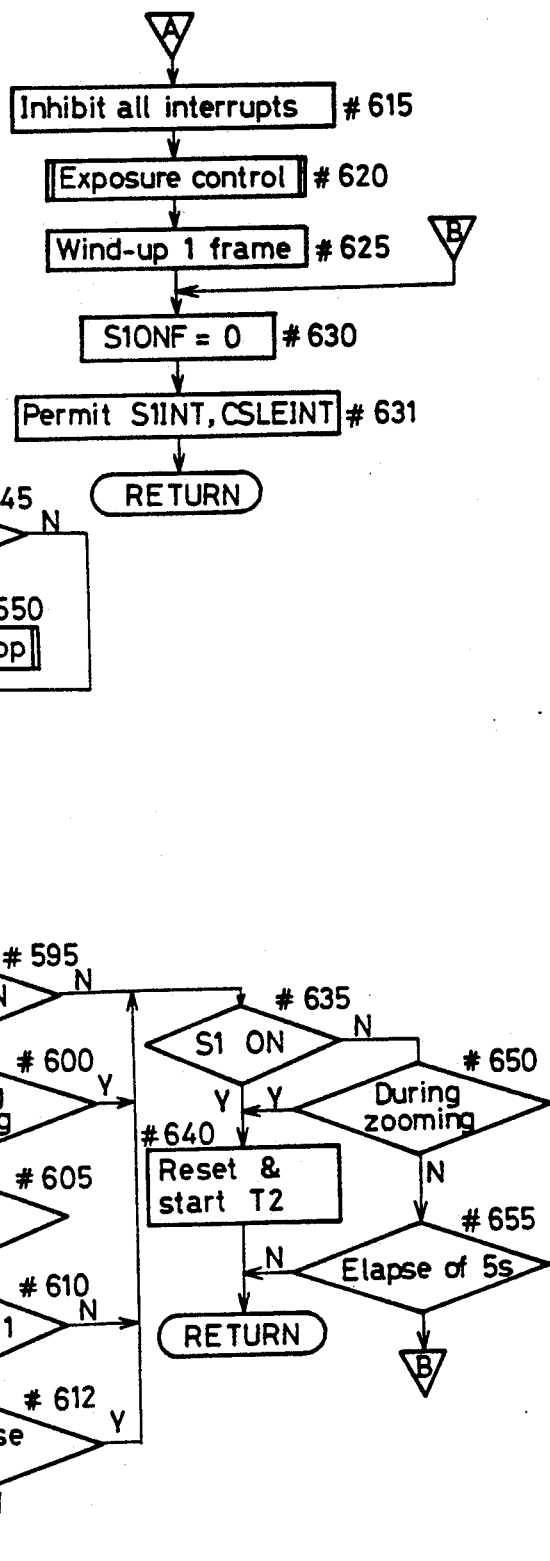

The subroutine of S10N is explained referring to FIGS. 13(a) and 13(b). In the S10N subroutine, the process first sets the flag S10NF showing that this flow has been passed through (#500). The process thereafter inhibits the interrupt S11NT, and sets the power control terminals PW1 and PW2 to the "High" level to turn on the power supply transistors $T_{r1}$ and $T_{r2}$ (#505, #510), followed by step #515 where a subroutine for lens control is executed.

Figure 14:
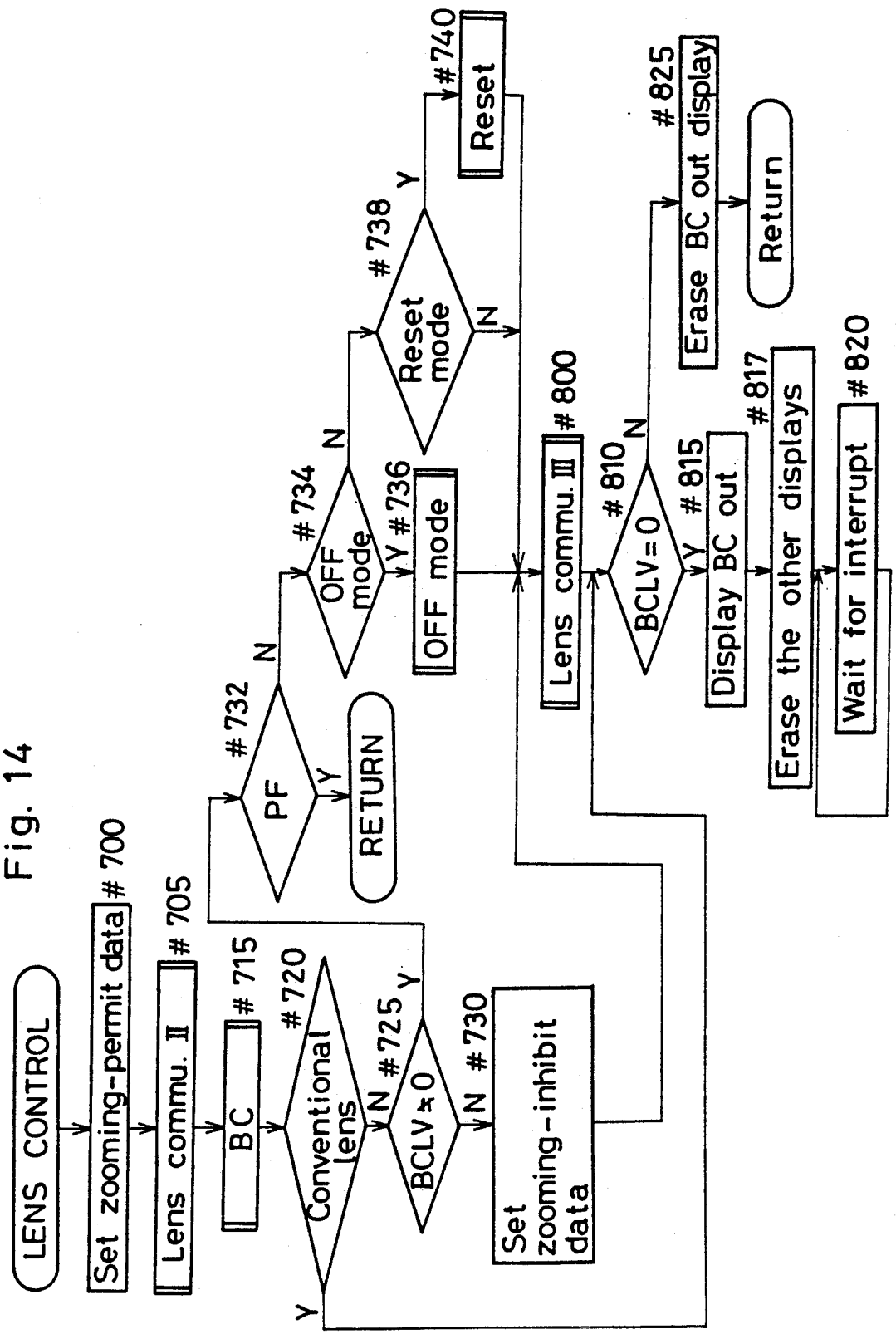

Now, the subroutine for lens control is described referring to FIG. 14. First, the process sets data for permitting the zooming operation, and executes a subroutine of the lens communication II to input the predetermined data (#700, #705). The process subsequently executes a subroutine for battery check BC (#715).

Figure 17:
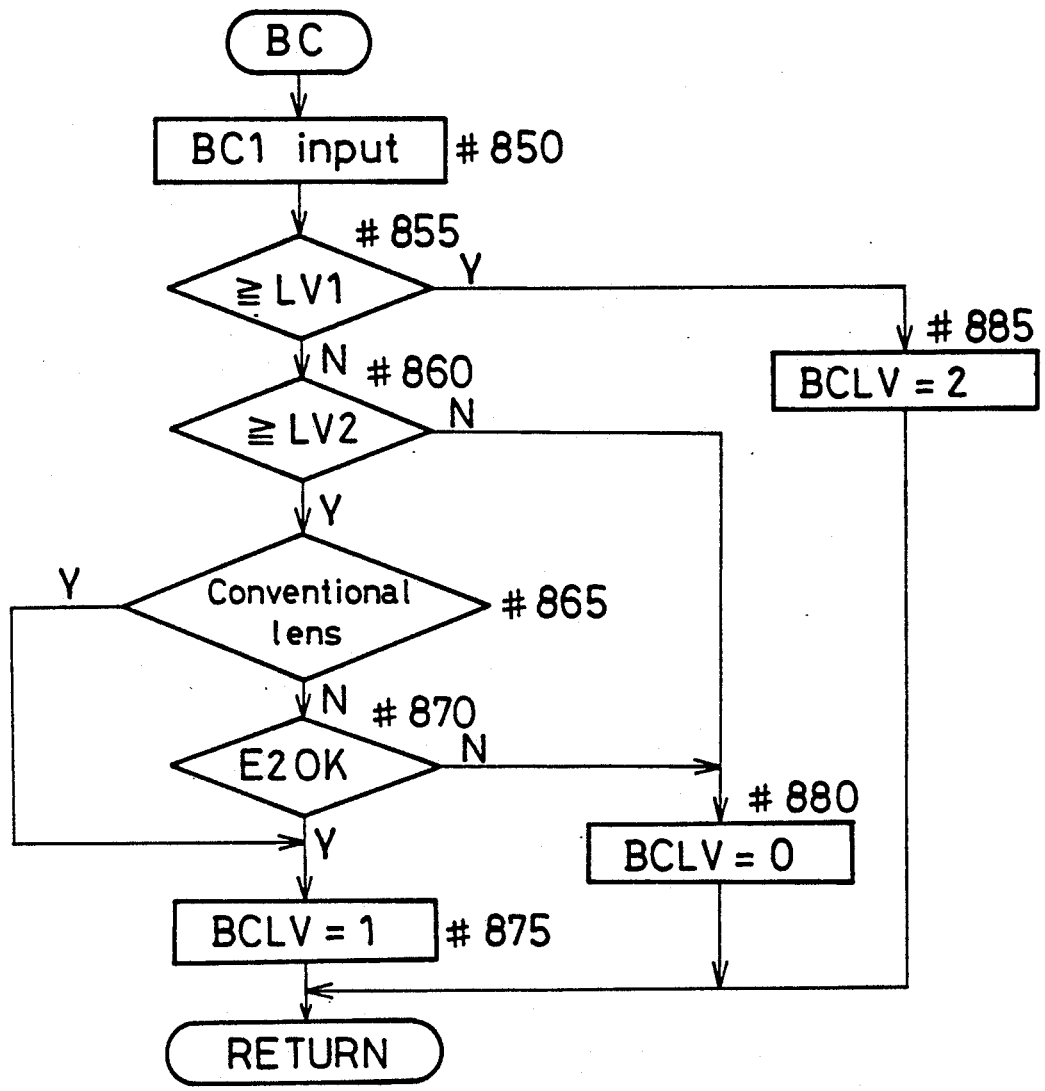

The battery check BC subroutine is next described referring to FIG. 17. When this subroutine is called, the process first inputs the data from the battery checking circuit BC1. The input data shows whether the battery voltage is not less than level LV1 which is enough to control the zooming operations of both the camera body and the lens, or the voltage is less than level LV1 and not less than level LV2, whereby it would be difficult to control both the camera body and the lens, or the voltage is less then level LV2, whereby it would be impossible to control either the camera body or the lens. Receiving this data, the process judges at step #855 whether or not the battery voltage is not less than level LV1. If not less than LV1, the process sets data showing the battery voltage level as BCLV=2 at step #885, and thereafter returns. If less than level LV1 as a result of the #855 judgment, judgment is further made at step #860 on whether or not the battery voltage is not less than LV2. If less than LV2, the process sets the data showing the battery voltage level as BCLV=0 at step #880, and thereafter returns. If not less than LV2 as a result of the #860 judgment, the process further judges at step #865 whether or not a conventional lens is attached. In the case of the camera system in which a conventional lens is attached to the camera body, the process sets the data showing the battery voltage level as BCLV=1 at step #875, and returns. This is because even this voltage level as set as BCLV=1 makes it possible to actuate only the camera body because a conventional lens has no power-zooming function. If the attached lens is not a conventional-type lens at the step #865 judgment, the process judges from data inputted from the lens whether or not the voltage level of the auxiliary battery E2 on the lens side has been sufficiently applied. If the voltage level of the auxiliary voltage E2 is sufficiently high, judging that both the camera body and the lens are in the operable state, the process sets BCLV=1 at step #875, and returns. If the voltage level of the auxiliary battery E2 is insufficient, the process sets BCLV=0 at step #880 to inhibit control of both the camera body and the lens, and thereafter returns.

Figure 55A:
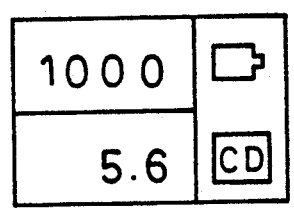
FIGS. 55(a) to 55(c) are views showing display examples of a display part on the camera body.
Figure 55B:
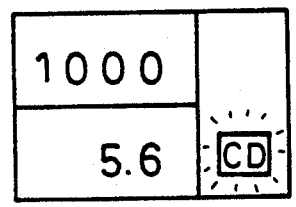
Figure 55C:
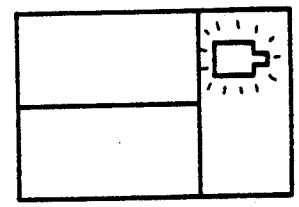

Reverting to the flow of FIG. 14, after completing the battery checking subroutine at step #715, the process judges at step #720 whether or not a conventional lens is attached to the camera body. In the case where a conventional lens is attached, the process proceeds to step #810, in which judgment is made of whether or not the data showing the battery voltage level is set as BCLV=0. If BCLV=0 at the #810 judgment, the process performs a warning display showing shortage of the battery voltage, erases the other displays and waits for an interrupt to be applied (#815 to #820). FIG. 55(c) shows the display state at this time, in which a battery mark is blinking. If BCLV≠0 at the #810 judgment, the process proceeds to step #825, in which the warning display is erased, and thereafter the process returns. FIG. 55(a) shows the state where all display elements are glowing, in which display "CD" glows when the card function is effected, and is otherwise erased. Further, the display "CD" blinks as shown in FIG. 55(b) when release lock is performed because of failing to fulfill the card function as to be described later. In FIGS. 55(a) and 55(b), the numerical values "1000" and "5.6" respectively indicate 1/1000 second of the shutter speed and F5.6 of the diaphragm value.

When the judgment at step #720 results in a determination that a conventional lens is not attached, the process further judges whether or not the data showing the battery voltage level is set as BCLV≠0. If BCLV=0 at step #725, the process sets data for zooming inhibit at step #730, and proceeds to step #800, where a subroutine of lens communication III is executed, followed by step #810.

Figure 18:
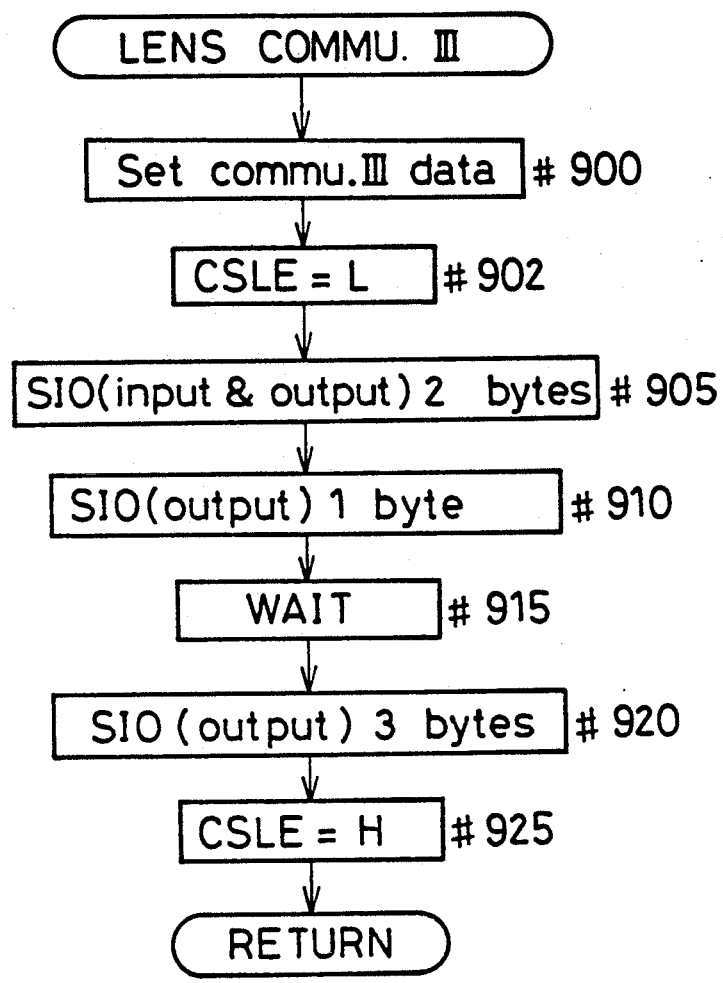

The subroutine of lens communication III is now explained referring to FIG. 18. When the subroutine is called, the process first sets data showing that the communication mode is mode III, performs 2-byte data communication with the lens to send/receive the data as to each other's kind, and subsequently performs one-byte data communication with the lens to show the communication mode (i.e., mode III) (#900 to #910). The process enters into a wait state and after a while outputs 3-byte data to the lens (#915, #920). The terminal CSLE is thereafter set to the "High" level at step #925 and the process returns.

Reverting to the flow of FIG. 14, if judgment at step #725 results in BCLV≠0, the process proceeds to step #732, where judgment is made on the basis of the data inputted from the lens as to whether or not power focusing (PF) has been set. If power focusing has been set at step #732, the process directly returns because zoom control is not performed at the time of power focusing. If power focusing has not been set at step #732, that is, zoom control has been set, the process proceeds to step #734 and the subsequent steps, where judgment of the zoom mode is performed. The process first judges at step #734 whether or not the set mode is OFF mode (manual zoom mode), and if OFF mode is found at the step #734 judgment, a subroutine of OFF mode is executed at step #736 and thereafter the process proceeds to step #800. On the other hand, if the set mode is judged to be not OFF mode at step #734, the process further judges whether or not reset mode is set. If reset mode is detected at the step #738 judgment, the process executes a subroutine of reset mode at step #740, followed by step #800. If the set mode is not the reset mode at the step #738 judgment, the process directly proceeds to step #800 because the set mode is assumed to be automatic zoom program (AZP) mode in which no control operation is required.

Figure 15:
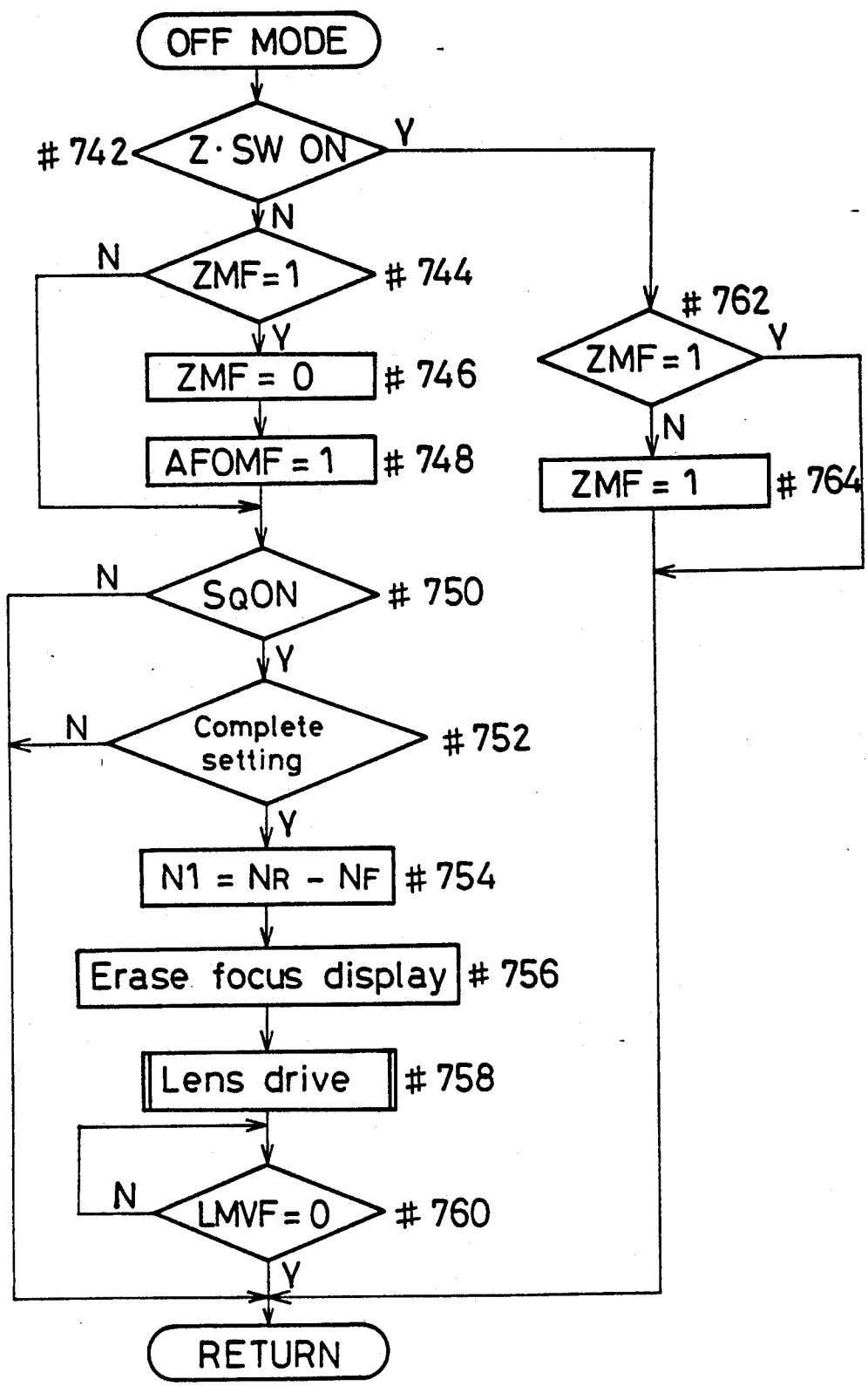

Next, the OFF mode subroutine is described with reference to FIG. 15. The process first judges, on the basis of the data inputted from the lens, whether or not the zoom switch (briefly designated as Z·SW) is in the ON state (#742). In the case of the OFF state of the zoom switch, the process judges whether or not a flag ZMF, showing that the zoom switch has been turned on one time, is set (#744). When the flag ZMF has been set, assuming that the zoom switch is has been turned from on to off, the process resets the flag ZMF and sets a flag AFOMF showing that focus condition detection is to be performed again (#748), proceeding to step #750. Meanwhile, when the flag ZMF has not been set, assuming that the state of the zoom switch OFF is maintained, the process proceeds to step #750, where judgment is made of whether or not the lens switch $S_Q$, which is operated to return the focal length f and the photographing distance D to the ones set in reset mode, is in the ON state. If the lens switch $S_Q$ is off, the process directly returns, otherwise the process proceeds to step #752, where judgment is made on the basis of the data inputted from the lens as to whether or not the setting of the focal length f and the photographing distance D has been completed. When setting of the focal length f and the photographing distance D has not been completed, the process directly returns. When the step #752 judgment results in a determination of the completion of the setting, the moving amount N1 of the lens is calculated at step #754 in such a manner that the move-out amount $N_F$ from the present lens position to infinity is subtracted from a reset value $N_R$ of the move-out value at the time when the focal length f and the photographing distance D are set. Thereafter, the process erases the infocus display at step #756, and drives the lens by the moving amount N1 at step #758 (refer to FIG. 24). On completing the lens drive (LMVF=0) at step #760, the process returns.

Figure 16:
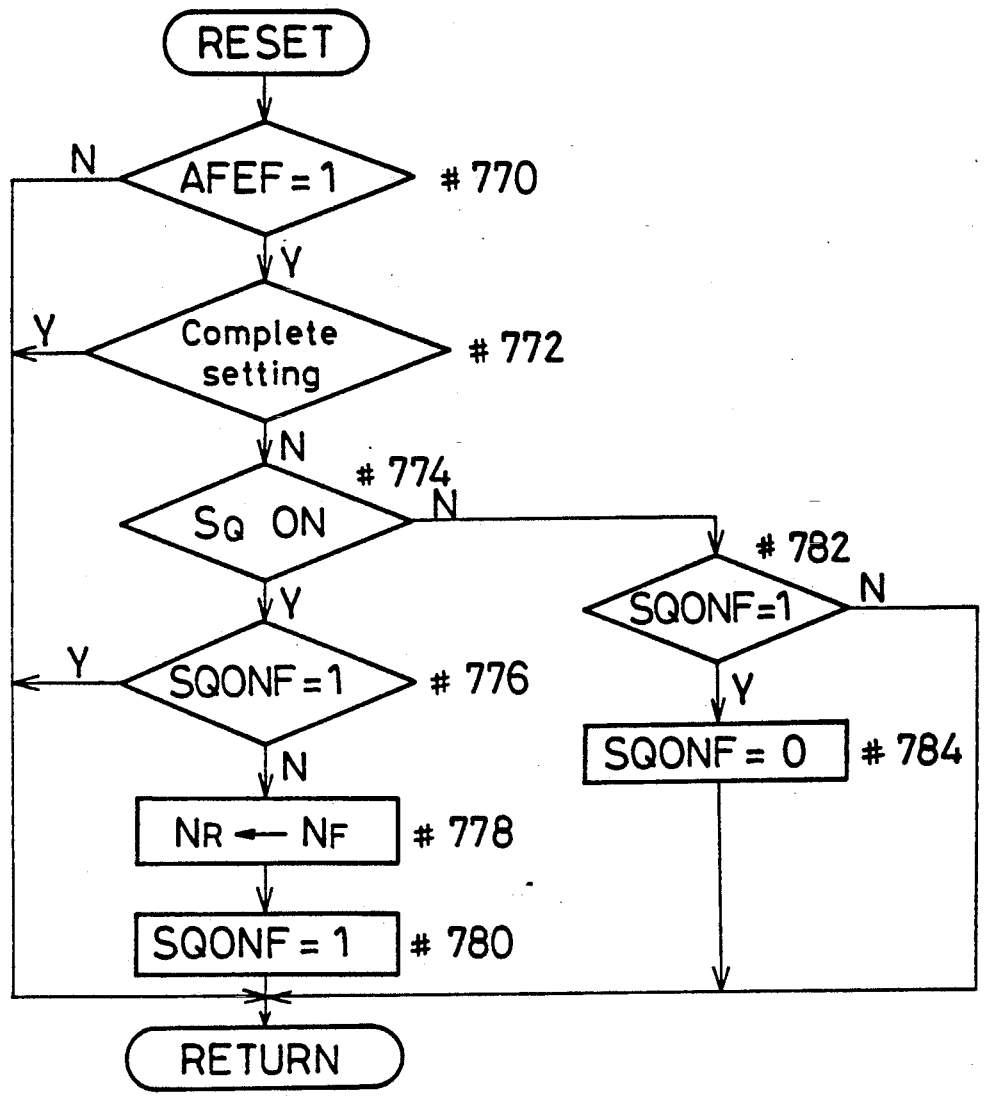

The following is description of the reset mode subroutine referring to FIG. 16. When this subroutine is called, the process first judges at step #770 whether or not a flag AFEF, showing that the subject is in an in-focus state, has been set. When the flag AFEF has not been set at the step #770 judgment, that is, the subject is not focused, assuming that the reset value $N_R$ of the move-out amount is not set, the process immediately returns. On the other hand, when the flag AFEF has been set, that is, the subject is focused, the process further judges at step #722 based on the data (data (xi) described above) inputted from the lens, whether or not the setting of the reset value $N_R$ of the move-out amount has been completed. In the case of completion of the setting, the process returns, otherwise the process judges at step #774 whether or not the lens switch $S_Q$ is turned on. In the case of the ON state of the lens which $S_Q$ as a result of the step #774 judgment, the process judges at step #776 whether or not a flag SQONF, showing that the lens switch $S_Q$ has been turned on by one time, is set. If the flag SQONF is set, assuming that the setting of the reset value $N_R$ has been completed, the process returns. If the flag SQONF is not set at step #776, the move-out amount $N_F$ from the infinity lens position to the present lens position is set as the reset value $N_R$ at step #778, and the flag SQONF is set at step #780, thereafter the process returns. Meanwhile, when the step #774 judgment results in a determination that the lens switch $S_Q$ is in the OFF state, the process proceeds to step #782, where judgment is made as to whether or not the flag SQONF is set. When the flag SQONF is set at step #782, assuming that the lens switch $S_Q$ has been turned from on to off, the process resets the flag SQONF at step #784 and thereafter returns. When the flag SQONF is not set at the #782 judgment, assuming that the lens switch $S_Q$ is kept in the OFF state, the process directly returns.

Reverting to the flow of FIG. 13, upon completing the lens control subroutine, the process executes a subroutine of card communication I (#520).

Figure 19:
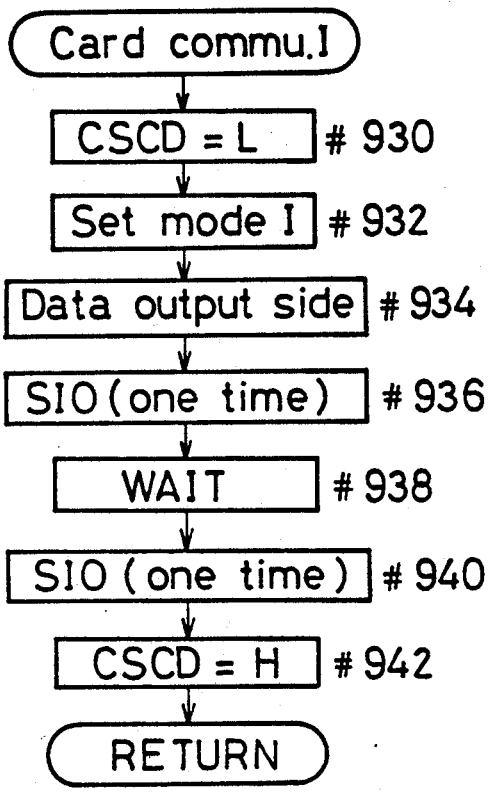

This card communication I subroutine is now described referring to FIG. 19. When the subroutine is called, the process first sets the terminal CSCD to the "low" level to inform the card that a data communication is to be performed with the card, and sets data showing the card communication in mode I (#930, #932). The process thereafter sets the output mode, and performs serial data communication one time to inform the card of the card communication in mode I (#934, #936). The process remains in the wait state until a predetermined process is completed on the card side, and subsequently performs serial data communication one time and further sets the terminal CSCD to the "High" level to inform the card of completion of the data communication (#938 to #942) and returns. In the data communication at step #940, data as to ON/OFF of the card switch $S_{CD}$ on the camera body are sent to the card.

Reverting to the flow of FIG. 13, the in-body microcomputer $\mu$ C1 remains in the wait state for the necessary time for the card-side control which is performed in response to the data from the camera body (#525). At the following step #530 a subroutine of the card communication II is executed.

Figure 20:
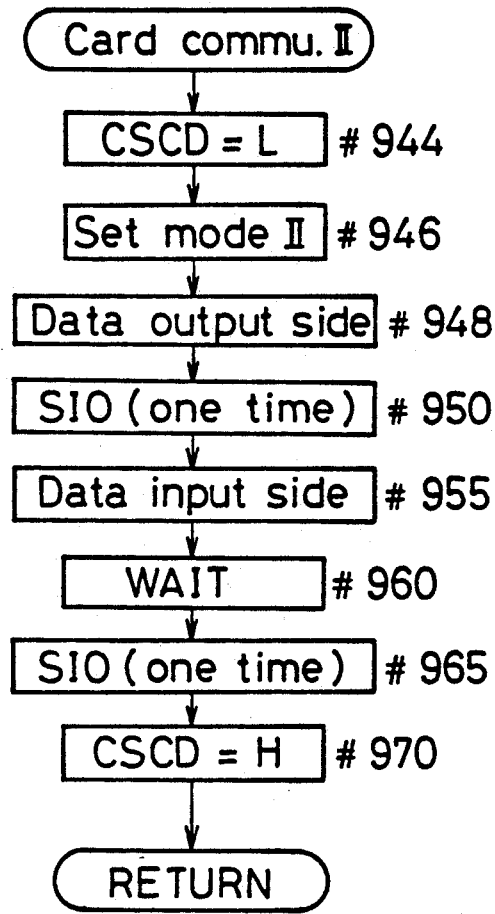

The card communication II subroutine is now described referring to FIG. 20. When this subroutine is called, the process first sets the terminal CSCD to the "Low" level to perform data communication with the card, and sets data showing the card communication in mode II (#944, #946). The process subsequently sets the camera body to output mode, and executes transmitting and receiving of serial data between the camera body and the card one time to inform the card CD of the card communication in mode II (#948, #950). The process next performs a mode change to input mode at step #955, remains in the wait state at step #960 for the necessary time for the card-side control, and transmits/receives serial data to/from the card one time to input data concerning presence/absence of card control (for example, exposure of the camera) by which an exposure and so on is performed on the basis of data set on the card side (#965). The process subsequently sets the terminal CSCD to the "High" level at step #970, and returns.

Reverting to the flow of FIG. 13, after completion of the card communication II subroutine, the process judges at step #535 whether or not the preparation switch S1 has been turned on. When the preparation switch S1 is on, a subroutine of AF control is executed (#540).

Figure 23:
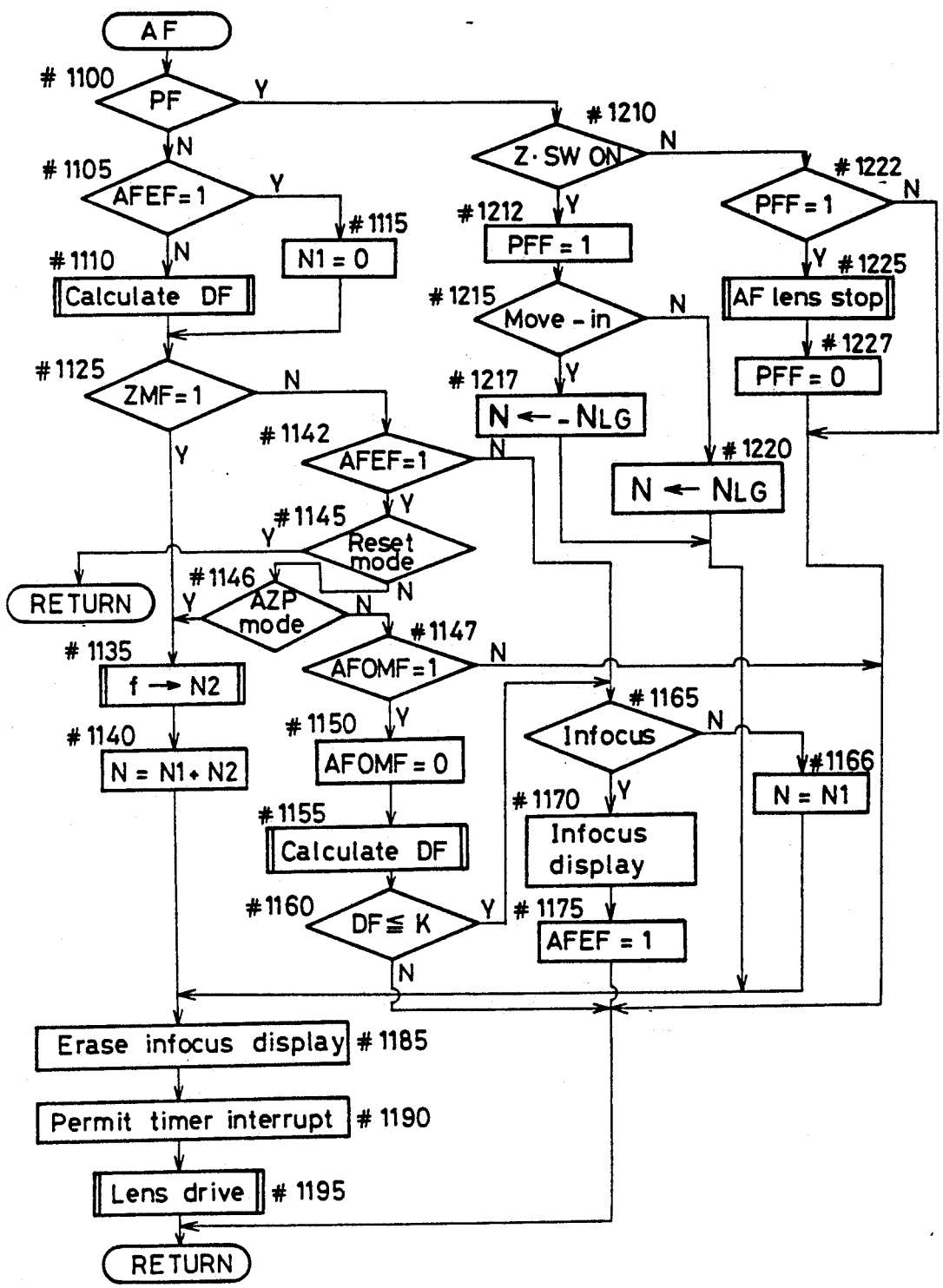

The AF control subroutine is now described referring to FIG. 23. When this subroutine is called, the process first judges at step #1100 on the basis of the data inputted from the lens whether or not power focusing (PF) has been set. In the case of power focusing, judgment is further made at step #1210 on the basis of the data inputted from the lens whether or not the zoom switch is on. As described above, since the zooming operation at power zooming and the focusing operation at power-focusing are both operated by means of the operation ring 80, the zoom switch here functions as the focus switch. When the zoom switch is off, the process judges at step #1222 whether or not a flag PFF showing power focusing has been set. If the flag PFF has been set, a subroutine of AF lens stop is executed at step #1225 because operation of the operation ring 80 is stopped to stop driving the AF lens, and the flag PFF is reset at step #1227, thereafter the process returns. If the flag PFF has not been set as a result of the step #1222 judgment, the process returns without performing anything because the operation ring 80 is not being operated in the stop state of the AF lens.

Meanwhile, when the zoom switch is on at step #1210, the process sets the flag PFF showing power focusing, and judges the direction of power focusing operation based on the data inputted from the lens (#1212, #1215). In the case of the move-in direction, the count value N of the counter is set to a negative large value $-N_{LG}$, and otherwise a positive large value $N_{LG}$ is set as the count value N of the counter (#1217, #1220). It is for the purpose of prevention of the counter interrupt that the count value N of the counter is thus set as a positive or negative large value. Thereafter, the process erases the infocus display, permits the timer interrupt, and executes a subroutine of lens drive (#1185 to #1195). Then the process returns.

When the step #1100 judgment results in that power focusing (PF) has not been set, the process proceeds to step #1105, where it is judged whether or not the flag AFEF, showing the infocus state, has been set. In the case of the infocus state (AFEF=1) at the step #1105 judgment, the process resets the moving amount N1 of the AF which is calculated based on the defocus amount, and then proceeds to step #1125. In the case of the out-of-focus state (AFEF=0) at the step #1105 judgment, the process executes a subroutine of defocus amount calculation, and proceeds to the following step #1125.

Figure 25:
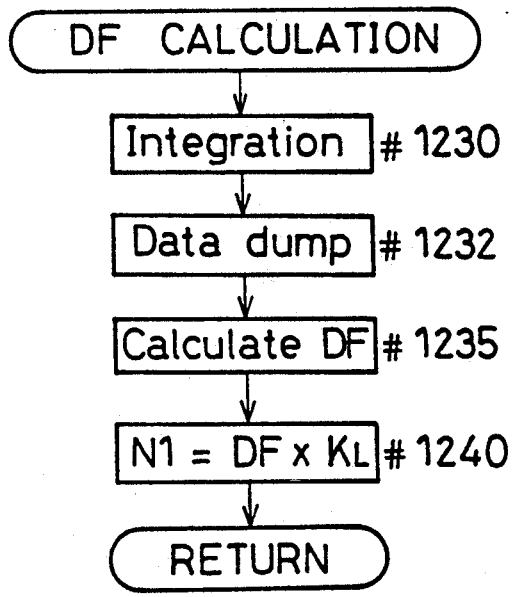

Now, description is made of the subroutine of defocus amount calculation referring to FIG. 25. When this subroutine is called, integration (charge accumulation) is first performed in a Charge Coupled Device (hereinafter, referred to as CCD) of the light receiving circuit $AF_{CT}$ for focus condition detection (#1230). On completing the integration, the microcomputer $\mu$ C1 receives data converted to a digital signal (data dump), calculates a defocus amount DF from this data, and then calculates the moving amount N1 from $N1 = DF \times K_L$, where $K_L$ represents a moving amount conversion coefficient, i.e., defocus amount inputted from the lens (#1232 to #1240). Then the process returns.

Reverting to the flow of FIG. 23, the process judges at step #1125 whether or not the flag ZMF has been set. When the flag ZMF has been set, the process calculates a moving amount N2 of the AF lens to correct for an out-of-focus condition due to the focal length change (#1135).

Figure 57:
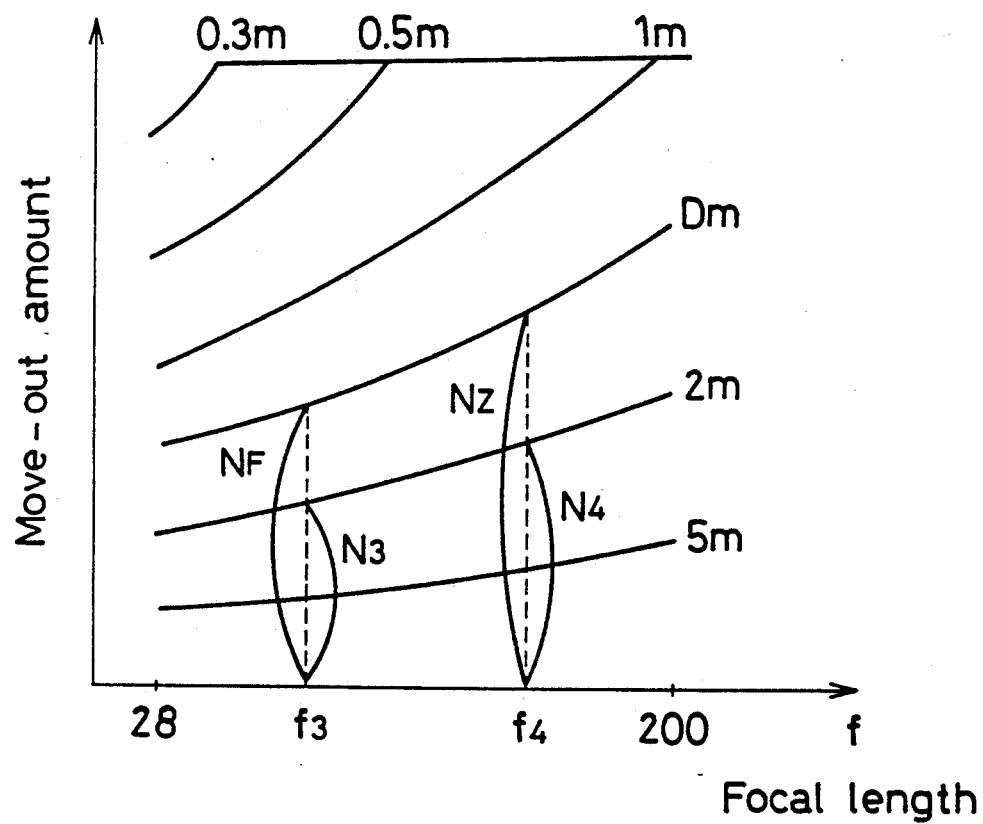
FIG. 57 is a graph for explaining the method of adjusting the focus condition of a varifocal lens system.

FIG. 57 is a graph which shows the focal length f as the abscissa and the move-out amount as the ordinate. As can be appreciated from this graph, according to the lens applied to the present embodiment, the ratio of the move-out amount of the lens at a predetermined distance (for example, 2 m) to the move-out amount of the lens at a detected distance (D [m]) is designed to be kept substantially constant independent of the focal length. Thus, the data as to the move-out amount of the lens at the predetermined distance relative to each focal length is stored in a Read-Only Memory (hereinafter, referred to as ROM) of the in-lens microcomputer $\mu$ C2. Here, the description is made on the case where the predetermined distance is set as 2 m and a subject at the distance D [m] is focused at a focal length $f_3$, and thereafter the zooming operation is performed so as to have a focal length $f_4$. Settings of the move-out amounts are performed as follows: a move-out amount relative to the distance 2 m at the focal length $f_3$ is represented as N3, a move-out amount relative to the distance D [m] at the focal length $f_3$ is represented as $N_F$, and a move-out amount relative to the distance 2 m at the focal length $f_4$ is represented as N4. One the basis of $N_F/N3 = N_Z/N4$, a move-out amount $N_Z$ relative to the distance D [m] at the focal length $f_4$ can be obtained from $$N_Z = N_F(N4/N3).$$

Thus, the corrected move-out amount N2, which is used for correcting the out-of-focus of the subject due to the zooming operation from the focal length $f_3$ to $f_4$, can be calculated by $$N2 = N_Z - N_F = (N4/N3 - 1)N_F.$$

Figure 26:
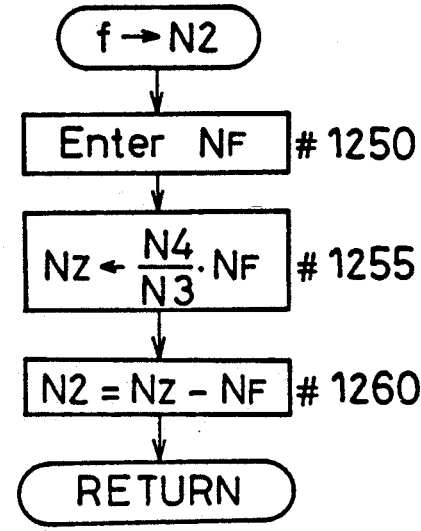

The subroutine for calculating the moving amount N2 of the AF lens is described below referring to FIG. 26. When this subroutine is called, the process first at step #1250 enters the AF lens move-out amount $N_F$ from infinity on the basis of a count value of a counter. This counter is a hard counter incorporated in the in-body-microcomputer $\mu$ C1 for counting pulses sent through the terminal CNT from the encoder ENC. When the AF lens is moved-out, the counter counts-up, and counts-down when the AF lens is moved-in. At step #1255, the process calculates the move-out amount $N_Z$ from infinity in the case of the changed focal length by $$N_Z = (N4/N3).$$

Then the process calculates the moving amount N2 at step #1260 by $$N2 = N_Z - N_F,$$

and returns.

Reverting to the flow of FIG. 23, at step #1140, the process calculates the moving amount N by N=N1+N2, and proceeds to step #1185 to erase the infocus display during the zooming operation. When the flag ZMF has not been set at the step #1125 judgment, that is, the zooming operation is not being performed, the process proceeds to step #1142, where judgment is made of whether or not the flag AFEF, showing the infocus state, has been set. If the flag AFEF has been set, the process proceeds to step #1145, where judgment is further made of whether or not reset mode has been set. In the case of reset mode, the process returns without performing anything. When reset mode has not been set, the process proceeds to step #1146, where judgment is made of whether or not AZP mode has been set. If AZP mode has been set, the process proceeds to step #1135 to correct the out-of-focus state due to the zooming operation. If AZP mode has not been set, the process proceeds to step #1147, where judgment is made of whether or not the flag AFOMF, which shows that automatic-focusing operation is to be performed once again, has been set. When the flag AFOMF has been set, the process resets this flag AFOMF, and calculates the defocus amount (#1150, #1155). As a result of the calculation of the defocus amount DF, if the defocus amount DF exceeds a predetermined value K, assuming that a subject to be photographed is altered, the process returns without performing focus condition detection and lens drive. On the other hand, if the defocus amount DF is less than or equal to the predetermined value K, the process proceeds to step #1165 to perform the AF operation once again (#1147 to #1165). At step #1165, the process judges from the obtained defocus amount DF whether or not the subject is focused. If an infocus state is detected, the process performs the infocus display, sets the infocus flag AFEF (#1170, #1175), and thereafter returns. If the out-of-focus state is detected at the step #1165 judgment, the process sets the moving amount N1 obtained at step #1110 as the lens moving amount (#1166), and then proceeds to step #1185. Also when the infocus flag AFEF has not been set at step #1142, the process executes step #1165 and the subsequent steps. When the step #1147 judgment results in a finding that the flag AFOMF, showing that the AF operation is performed once again, has not been set, the process returns without performing anything further. At the step #1185 and the subsequent steps, as described above, the process erases the infocus display, permits the timer interrupt, and performs the lens drive (#1185 to #1195). Then, the process returns. In the case where a conventional lens is employed, the process proceeds as follows because the conventional lens is not equipped with functions of the new lens. When the AF operation has been completed (AFEF=1), the process proceeds in sequence of #1100-#1105-#1115-#1125-#1142-#1145-#1146-#1147, and then returns. On the other hand, when the AF operation has not yet been completed, the process proceeds in sequence of #1100-#1105-#1110-#1125-#1142, and executes step #1165 and the subsequent steps. This means that the ordinary AF operation conventionally well known is performed when the conventional lens is attached.

Reverting to the flow of FIG. 13, the process proceeds to step #560 upon completion of the AF control subroutine at step #540. Returning to the judgment at step #535, when the preparation switch S1 is in the OFF state, the process judges at step #545 whether or not the flag LMVF showing during- AF lens drive has been set. When the flag LMVF has been set, the process executes the AF lens stop subroutine at step #550, and otherwise the process skips step #550. Then the process proceeds to step #560 in either case. At the step #560, the process receives data of the film speed SV from the film speed reading circuit DX and at the next step #565, receives data of the subject luminance $BV_o$ at open aperture from the photometric circuit LM. In performing this data input, the process first sets the terminal CSDX or CSLM to the "Low" level to select the circuit (DX or LM) for data input. Then the process receives the data through a terminal SIN. After completion of the data input, the process sets the terminal CSDX or CSLM to the "High" level to complete the data input. Subsequently, the process executes a subroutine of the card communication III to transmit the data as described above to the card (#570).

Figure 21:
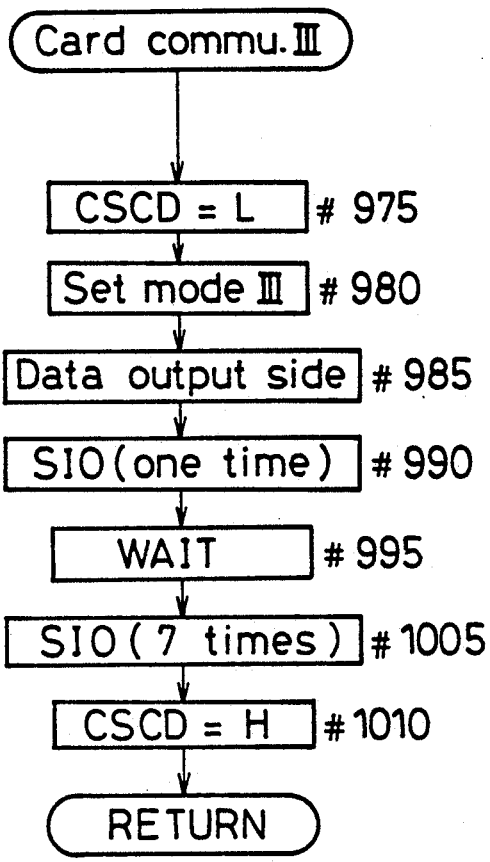

The card communication III subroutine is described referring to FIG. 21. When this subroutine is called, the process first sets the terminal CSCD to the "Low" level to show a data communication request to the card side, and sets data showing the card communication in mode III (#975, #980). The process subsequently sets the camera body to output mode to perform serial data communication one time, and thereafter remains in the wait state for the necessary time for the card-side calculation (#985 to #995). Next, the process performs serial communication seven times, sets the terminal CSCD to the "High" level to show the completion of data communication to the card side (#1005, #1010), and returns. The data which is transmitted and received in the data communication to the card side #1005 includes the present focal length $f_p$, the minimum focal length $f_{min}$, the maximum focal length $f_{max}$, the photometric value $BV_o$, the film speed SV, the open diaphragm value $AV_o$ and a maximum diaphragm value $AV_{max}$.

Reverting to the flow of FIG. 13, the in-body microcomputer μCl executes a subroutine for an exposure operation at step #575.

Figure 27:
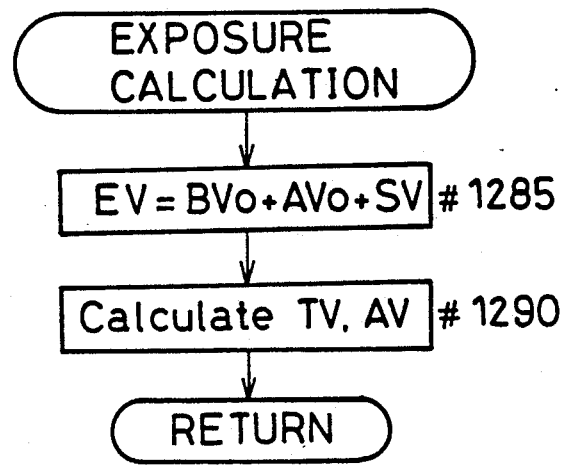

The exposure operation subroutine is now described referring to FIG. 27. When this subroutine is called, the process first calculates an exposure value EV at step #1285 by:

$$EV = BV_o + AV_o + SV,$$

where $BV_o$ represents the subject luminance at open aperture, $AV_o$ represents the open diaphragm value and SV represents the film speed. The process calculates the shutter speed TV and the diaphragm value AV from this exposure value EV on the basis of a predetermined AE program diagram (#1290), and returns. Description of the AE program diagram and a drawing thereof are omitted because the present invention have no direct relation to the AE program.

Figure 22:
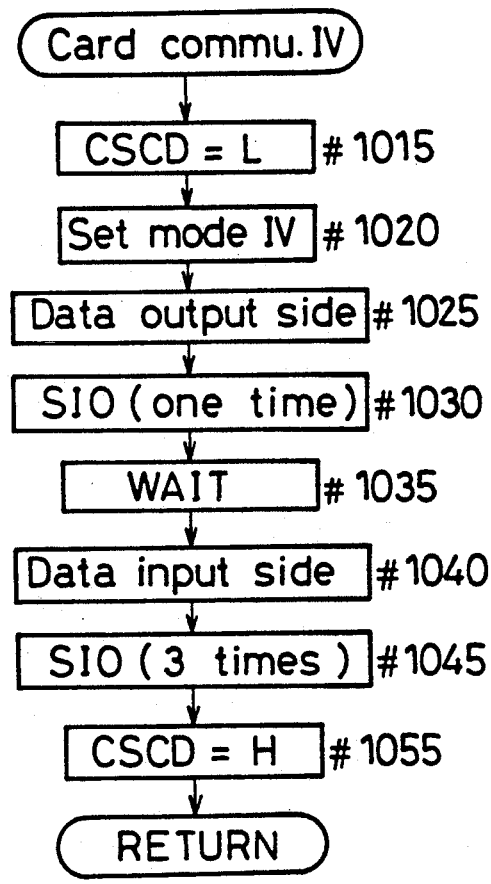

On completing the exposure operation subroutine, the in-body microcomputer μCl executes a subroutine of the card communication IV (#580), which is shown in FIG. 22. This card communication IV subroutine is the same as the card communication II subroutine of FIG. 20 with the exceptions that the communication mode set at step #1020 is mode IV and that serial communication is performed three times at step #1045. Detailed description of the card communication IV subroutine is therefore omitted. Data transmitted from the card side to the camera body in the card communication IV includes a card-side calculated shutter speed $TV_{CD}$, a card-side calculated diaphragm value $AV_{CD}$ and presence/absence of release lock.

After executing the card communication IV subroutine, the in-body microcomputer μCl judges on the basis of both the data obtained in the card communication IV and the previous data, whether or not exposure control should be performed according to the card-side data (#585).

Figure 28:
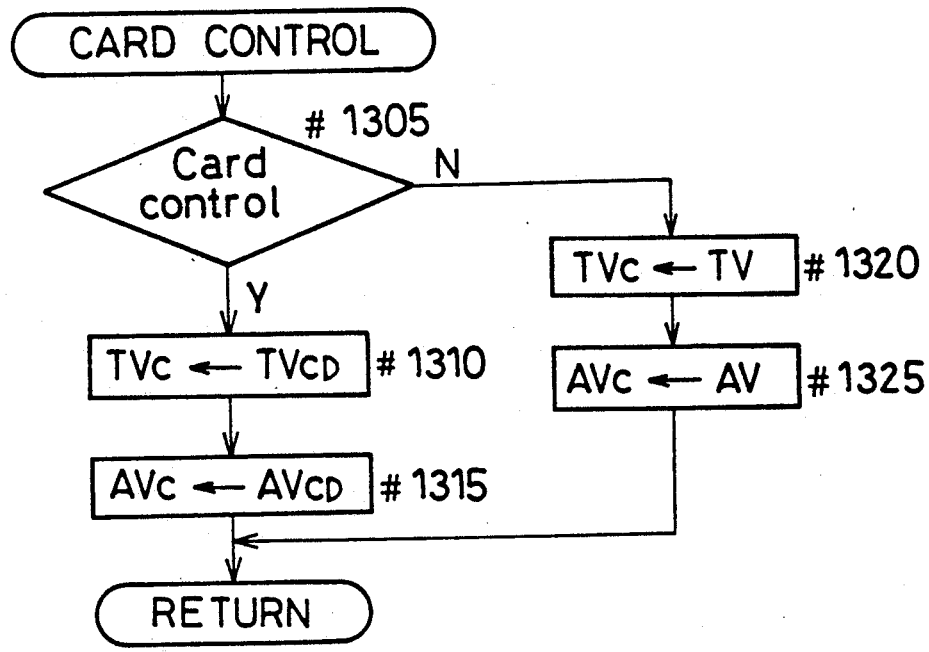

This subroutine of card control judgment is described below referring to FIG. 28. On the basis of the data on presence/absence of card control received from the card to the camera body in the card communication II, the process judges whether or not the card control should be preformed (#1305). When the card control is judged to be preformed, the process sets the card-side calculated shutter speed $TV_{CD}$ and the similarly card-side calculated diaphragm value $AV_{CD}$ to a control shutter speed $TV_C$ and a control diaphragm value $AV_C$ respectively (#1310, #1315). On the other hand, when the camera-side control is selected at the step #1305 judgment, the process sets the shutter speed TV and the diaphragm value AV calculated on the camera side at step #575 as the control shutter speed $TV_C$ and the control diaphragm value $AV_C$ respectively (#1320, #1325), and thereafter returns.

Reverting to the flow of FIG. 13, after completion of the card control judgment, the in-body microcomputer μCl transmits such serial data as the control shutter speed $TV_C$, the control diaphragm value $AV_C$, presence/absence of the card function (presence/absence of the card control), presence/absence of release lock and the result of the battery check, to the display controlling circuit DISPC. The display controlling circuit DISPC sends signals to the body indication part DISP1 and the view-finder indication part DISP2 so that display on the basis of the input data may be performed thereon (#590). The display contents of the body indication part DISP1 are described above referring to FIGS. 55(a) to 55(c). Therefore description thereof is omitted here. The display contents of the view-finder indication part DISP2 are shown in FIGS. 56(a) to 56(i). In FIG. 56(a), the shutter speed is displayed as a four-digit number by using four display components for numerical values on the left side, and the diaphragm value is displayed by using the next two display components. These values are displayed based on the serial data sent from the in-body microcomputer μCl to the display controlling circuit DISPC. In addition to the data of the shutter speed and the diaphragm value, data for zoom mode display is included in the serial data transmitted from the in-body microcomputer μC1 to the display controlling circuit DISPC. For example, in the case of automatic zoom program mode I, "AZPI" is displayed as shown in FIG. 56(b) by the display controlling circuit DISPC. Similarly, displays "AZP II", "M·Z" and "RST" are performed at automatic zoom program mode II, manual zoom mode and reset mode respectively as shown in FIGS. 56(d), 56(g) and 56(h). In addition, if warning data, which is set when the magnification β reaches the limit value for its change, is included in the data for zoom mode display at the time of AZPI mode, the display "AZPI" blinks as shown in FIG. 56(c). In AZP II mode, if the magnification β of a first spot is set, display "AZP II°" is effected as shown in FIG. 56(e), and display "AZP II " is performed as shown in FIG. 56(f) if the magnification β of a second spot is set. Further, if the setting of reset mode is completed, display "$RST_o$" is performed as shown in FIG. 56(i).

Returning to the flow of FIG. 13, after effecting the above-described display, the process judges at step #595 whether or not the release switch S2 has been turned on. When the release switch S2 is on, the process judges at step #600 whether or not the flag LMVF, showing on on-going zooming operation, has been set. If the zooming operation is on-going (LMVF=1), the process proceeds to step #635. If the zooming operation is not on-going (LMVF=0) at the step #600 judgment, the process proceeds to step #605, where judgment is made of whether or not power focusing (PF) has been set. In the case of power focusing, the process proceeds to step #612. Otherwise (when power focusing has not been set) the process judges at step #610 by the flag AFEF whether or not the subject is focused. If infocus state is detected (AFEF=1), the process proceeds to step #612, where judgment is further made of whether or not release lock data sent from the card exists. When the release lock data exists, the process proceeds to step #635. Also when the step #610 judgment results in a determination that the subject is not focused (AFEF=0), the process proceeds to step #635. On the other hand, when the release lock data does not exist, the process proceeds to step #615 and the subsequent steps #620, #625, where all interrupts are inhibited, exposure control is performed, and thereafter control of one-frame winding-up is performed. Then the process resets the flag S1ONF to show the completion of the S1ON subroutine, and permits the interrupt S1INT due to turning on of the preparation switch S1 or the interrupt CSLEINT from the lens (#630, #631). The process thereafter returns.

In the flow of FIG. 13, the process proceeds to the step #635 also when the #595 judgment results in that the release switch S2 has not been turned on. At the step #635, judgment is made of whether or not the preparation switch S1 has been turned on. When the preparation switch S1 is on, the process resets and starts the timer T2 for holding power supply, and returns. When the preparation switch S1 is off, the process judges at step #650 by the flag LMVF whether or not the zooming operation is being performed. If the zooming operation is being performed (LMVF=1), the process proceeds to step #640, where the timer T2 is reset and started to extend the power supply holding time. If the step #650 judgment results in a determination that the zooming operation is not being performed, the process judges at step #655 whether or not 5 seconds have elapsed from the start of the timer T2. When 5 seconds have not elapsed, the process returns. Otherwise the process proceeds to step #630, where control for completing the photographing operation is performed due to turning off the preparation switch S1.

Figure 29:
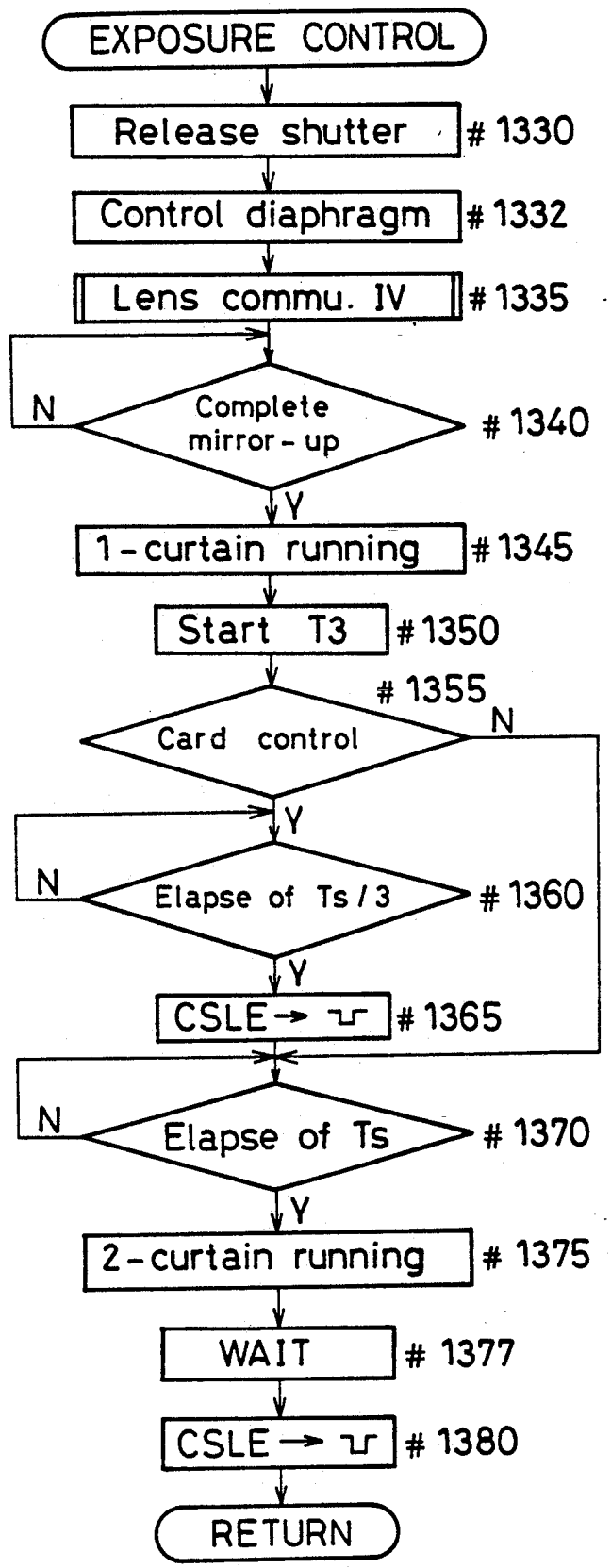

Next, the exposure control subroutine executed at step #620 is described referring to FIG. 29. When this subroutine is called, the process first sends a predetermined control signal to perform release control (#1330). Receiving this control signal, a link pin (not illustrated) is removed, whereby the release operation such as a mirror-up action is performed. At the following step #1332. the aperture is made narrower by reducing the diaphragm value up to the control diaphragm value $AV_C$. Then the process executes a subroutine of the lens communication IV to send a signal showing shutter release to the lens side (#1335).

Figure 30:
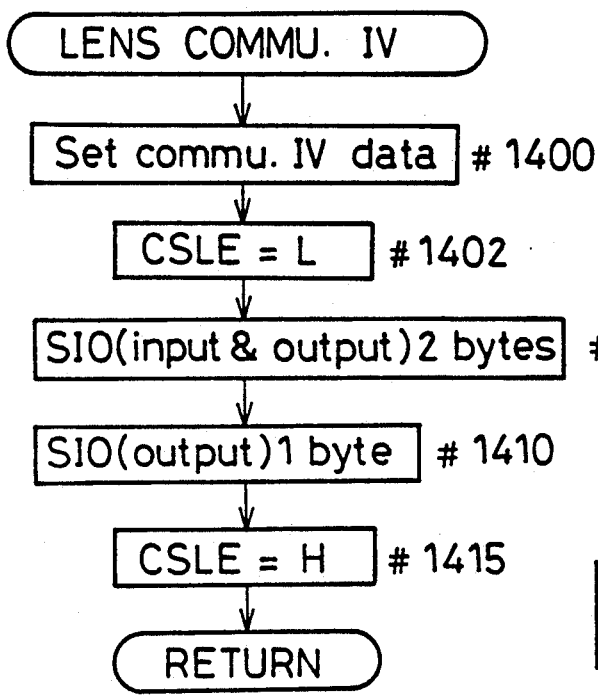

The lens communication IV subroutine is described referring to FIG. 30. The process first sets data showing the communication IV, and sets the terminal CSLE to the "Low" level to perform communication with the lens circuit (#1400, #1402). Then 2-byte serial communication is performed with the lens to transmit the data as to the kind of camera and receive the data of the kind of lens (#1405). The process thereafter performs one-byte serial communication with the lens to show that the set mode is mode IV (#1410). On completing the data communications, the process sets the terminal CSLE to the "High" level at step #1415 and returns.

Reverting to the flow of FIG. 29, the in-body microcomputer $\mu$ C1 remains in the wait state until the mirror-up operation is completed. On completing the mirror-up operation, first-curtain running of the shutter is effected (#1334). Then the process resets and starts the timer T3 for counting actual exposure time $T_S$ corresponding to the shutter speed $TV_C$ (#1350). At the following step #1355, judgment is made of whether or not card control has been set. In the case of card control, that is, when the zooming operation is made possible during exposure, the process waits until $\frac{1}{2}$ time of the exposure time $T_S$ has elapsed (#1360). When ($\frac{1}{2}$)$T_S$ has elapsed, the process sets the terminal CSLE to the "Low" level instantaneously, and waits until the exposure time $T_S$ has elapsed (#1365, #1370). The instantaneous level change of the terminal CSLE at the step #1365 starts the zooming lens drive. If card control is not detected at the step #1355 judgment, the process skips over steps #1360 and #1365, and proceeds to step #1370 where a wait state is entered until the exposure time $T_S$ elapses. When the exposure time $T_S$ has elapsed, second-curtain running of the shutter is allowed, and the process remains in the wait state until the completion of the running of the shutter (#1375, #1377). The process then instantaneously sets the terminal CSLE to the "Low" level again to show the completion of the shutter release (#1380), and returns. The zooming lens drive is stopped on the lens side due to this instantaneous state change of the terminal CSLE.

The process of the step #55 in FIG. 5 is executed as described above.

Reverting to the flow of FIG. 5, the process proceeds to step #80 unless the main switch $S_M$ has been turned on at the step #20. At the step #80, the process inhibits all interrupts except the interrupt SMINT applied when turning on the main switch $S_M$, and judgment is made of whether or not the flag RSTF showing the battery attachment has been set at the following step #85. When the flag RSTF has not been set, the process sets the flag SMOFF showing that this flow has been executed, and thereafter executes the AF lens move-in subroutine (#87, #90). In this case, the AF lens is moved-in up to the nearest position. Detailed description thereof is made above and therefore omitted here. Subsequently, the process judges at step #92 whether or not a conventional lens is attached, and if the conventional lens is not attached, setting move-in mode to mode I, the process executes the zooming lens move-in subroutine (#95, #100). When the zooming lens move-in subroutine has been executed in mode I, both the AF lens and the zooming lens are moved-in to the nearest position, and the total length including the lens along the optical axis is at its shortest. Thereafter, the process executes a subroutine of the lens communication V, and then judges on the basis of the data inputted from the lens whether or not the camera body control may enter a sleep mode (#105, #110). When the camera body control enters the sleep mode, the power supply to the zoom motor on the lens side is cut off. Accordingly, in order not to enter the sleep mode when the zooming lens move-in control is being performed on the lens side, the process remains in the wait state for 50 msec at step #115, and then returns to the step #105 to execute the lens communication V subroutine and further repeat the step #110 judgment. When the zooming lens move-in control is completed on the lens side, the step #110 judgment results in a determination that the process may enter the sleep mode. Thereby the process sets the terminals PW1 and PW2 to the "Low" level to turn off the transistors $T_{r1}$ and $T_{r2}$ for supplying power to the camera body circuits and the zoom motor of the lens at step #120. Further, the process sets the terminal PW0 to the "Low" level to turn off the DC/DC converter, and then inhibits all interrupts except the interrupt SMINT due to turning on the main switch $S_M$ (#125, #130). Thereafter the in-body microcomputer $\mu$ C1 enters the sleep mode to stop its operation.

When the flag RSTF has been set at the step #85 judgment or when the step #92 judgment results in a determination that the attached lens is conventional-type, the process proceeds to step #93, where the flag RSTF showing that the battery is attached is reset. Then the process proceeds to the step #120 and the subsequent steps to enter the sleep mode.

Control operation of in-lens microcomputer $\mu$ C2

Figure 31:
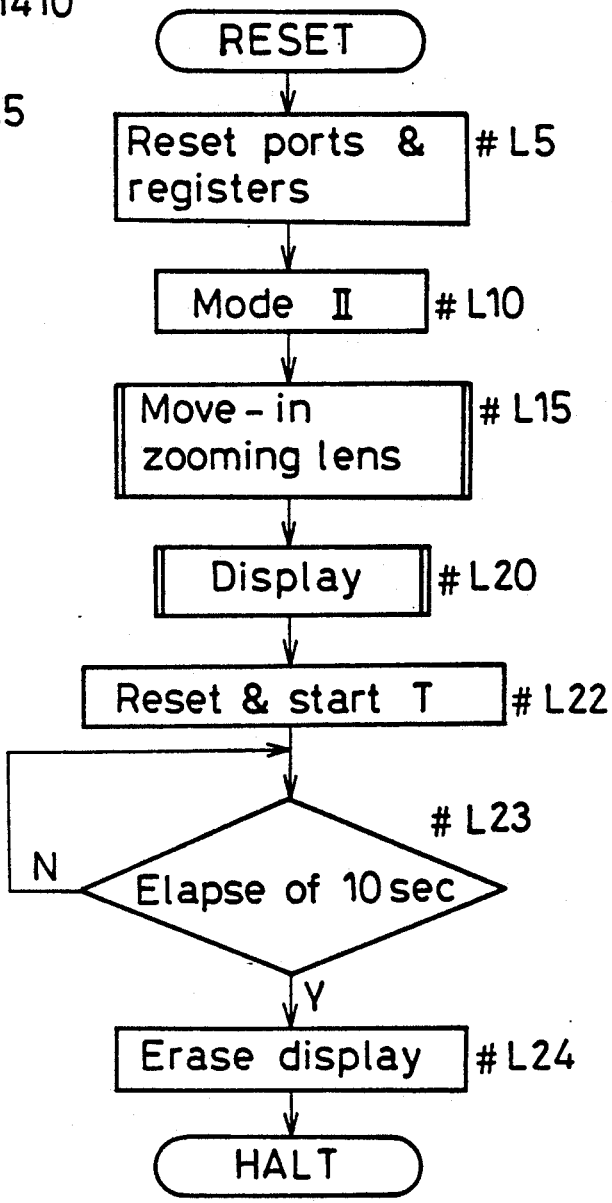
FIGS. 31 to 49 are flowcharts of routines and subroutines executed by a microcomputer in the interchangeable lens according to an embodiment of the present invention.

The following is a description of the control operation performed by the in-body microcomputer $\mu$ C2. If the lens is not attached to the camera body, since the reset terminal RE2 is maintained at the "Low" level because of the ON state of the lens attachment detecting switch $S_{LE}$, the lens circuits are all in the inoperative state. When the lens is attached and the lens attachment detecting switch $S_{LE}$ is turned off, a signal is sent to the reset terminal RE2 for changing its state from "Low" to "High". Thereby the in-lens microcomputer $\mu$ C2 executes a reset routine as shown in FIG. 31. The in-lens microcomputer $\mu$ C2 first resets the ports and the registers so that the process may enter the AZP mode and the sleep mode (#L5). Then the process sets zooming lens move-in mode to mode II (where the zooming lens is moved-in to a predetermined position of f=80 mm), and executes the zooming lens move-in subroutine (#L10, #L15).

Figure 32:
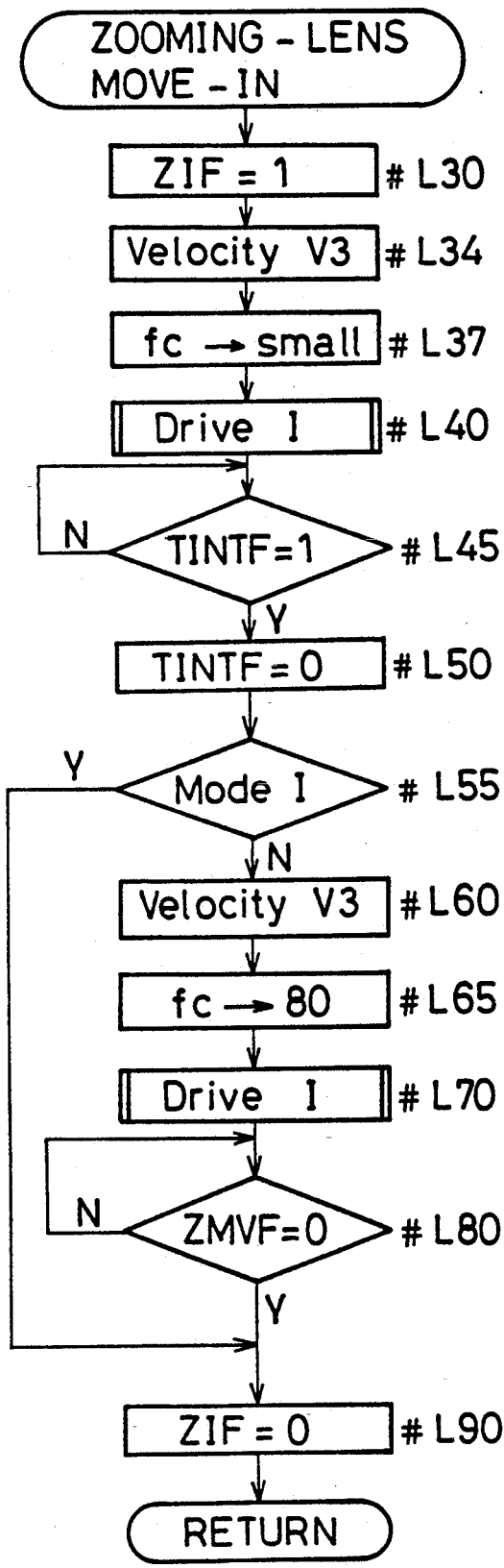

This zooming lens move-in subroutine is now described referring to FIG. 32. When the subroutine is called, the process first sets a flag showing zooming lens move-in mode, and transmits a signal for setting zooming lens move-in velocity to a maximum velocity V3 to the motor driving circuit MD3 (#L30, #L34). Then the process sets a control focal length $f_c$ to an extremely small value, which value is smaller than the smallest possible focal length, and executes a drive I subroutine to drive the zooming lens (#L37, #L40). Description of this drive I subroutine is made later. Subsequently, the process waits until a flag TINTF showing that a timer interrupt has been applied is set (#L45). This timer interrupt is applied after the zooming lens reaches the endmost position of the move-in operation.

The following description is made going through the stage for setting of the flag TINTF. When a pulse is sent from the encoder ENC3 for detecting the rotational amount of the zoom motor M3, the in-lens microcomputer $\mu$ C2 executes a counter interrupt routine according to the flow of FIG. 33. When this counter interrupt is applied, the in-lens microcomputer $\mu$ C2 permits a timer interrupt for detecting that the zooming lens has reached the endmost position of the move-in direction, and then resets and starts the timer therefor (#L100, #L105). The process judges at step #L110 whether or not the flag ZIF showing during move-in of the zooming lens has been set, and returns if the flag ZIF has been set. Operation of the in-lens microcomputer $\mu$ C2 when the flag ZIF has been reset is described later. When the zooming lens has reached the endmost position of the move-in direction, this counter interrupt is inhibited from executing, and the timer reset and started at the step #L105 continues its time counting. And after a certain time, the timer interrupt is applied.

Figure 35:
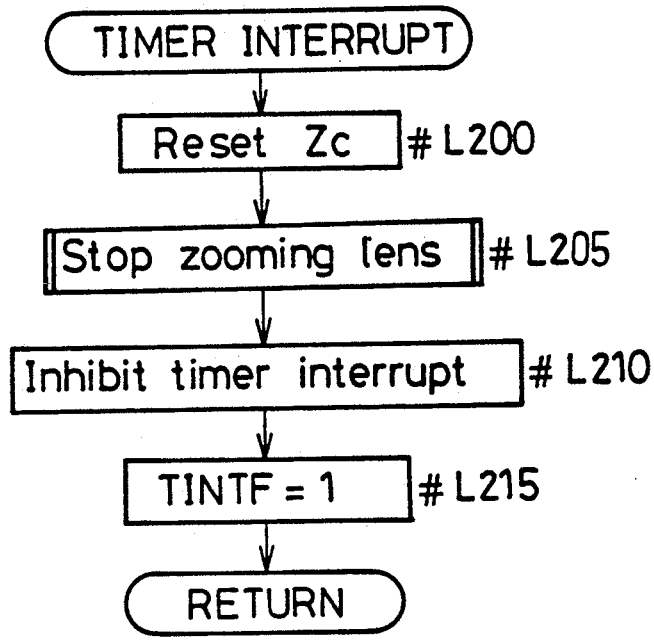

This timer interrupt routine is described referring to FIG. 35. When the timer interrupt is applied, the process first resets a count value $Z_C$ of a zoom counter ZC (#L200). This zoom counter ZC functions so as to count the number of pulses from the encoder ENC3, counting down when the zooming lens is moved-in, and counting up when the zooming lens is moved-out. After resetting the count value $Z_C$ of the zoom counter ZC, the process stops the zooming lens, inhibits the timer interrupt and thereafter sets the flag TINTF (#L205 to #L215). Then the process returns.

Figure 34:
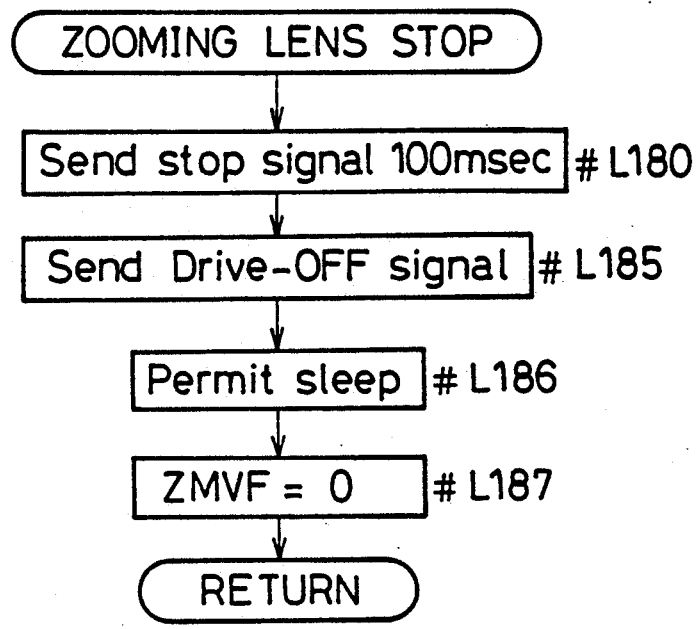

Here, a subroutine of zooming lens stop is described referring to FIG. 34. When this subroutine is called, the process sends a stop signal for the time of 10 msec to the motor driving circuit MD3, and then sends a drive OFF signal to enter the sleep mode (#L180 to #L186). Thereafter the process resets the flag ZMVF showing that the zooming operation is being performed (#L187), and returns.

On setting the flag TINTF showing that the timer interrupt has been applied as described above, the in-lens microcomputer $\mu$ C2 proceeds to step #L50 of the flow of FIG. 32, where the flag TINTF is reset. Then the process judges on the basis of the data inputted from the camera body or data set in reset mode, whether or not zooming lens move-in has been set (#L55). When the step #L55 judgment results in that the zooming lens move-in in mode I has been set (i.e., when the main switch $S_M$ of the camera body is turned on), the process proceeds to step #L90, where the flag ZIF, showing that the zooming lens is being moved-in, is reset, and returns. On the other hand, when the zooming lens move-in in mode I has not been set, the process sets the driving velocity of the zoom motor M3 to the maximum velocity V3, also sets the control focal length $f_C$ to 80 mm, and performs the control operation of drive I (#L60 to #L70). Thereafter the process remains in the wait state until the flag ZMVF, showing that the zooming operation is being performed, is reset (#L80). When the flag ZMVF is reset, assuming that the control focal length $f_C$ has reached 80 mm, the process resets the flag ZIF showing that the zooming lens is being moved-in, and returns.

Reverting to the flow of FIG. 31, after completion of the zooming lens move-in operation thus described, the in-lens microcomputer $\mu$ C2 executes a display routine for displaying information as to the lens, and then resets and starts the timer for holding power supply (#L20, #L22). Then the process remains in the wait state for 10 sec, and after the lapse of 10 sec erases the display (#L23, #L24). Thereafter the in-lens microcomputer $\mu$ C2 enters the halt state.

Figures 58A, 58B, 58C, 58D, 58E:
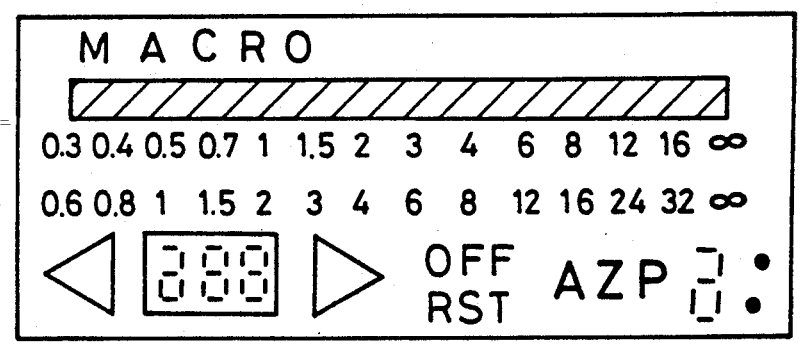
FIG. 58(a) is a view showing a display pattern of a display part of the interchangeable lens.
FIGS. 58(b) to 58(e) are views showing display examples thereof.

Before the display routine is described, the display patterns are now explained referring to FIGS. 58(a) to 58(e). FIG. 58(a) shows the display pattern including all display components. In FIG. 58(a), characters "MACRO" are displayed to inform the photographer that the photographing operation is to be performed in macro photographing range in the case of the magnification exceeding 1/10. The bar display therebelow shows a range from the minimum photographing distance for each focal length to the subject distance, in which the left end represents the minimum photographing distance, while the right end represents the distance up to the subject. Numbers arranged in two rows below the bar code display represent distances (m) for the bar code display. When either of the upper stage or the lower stage is selected, the whole numbers of the selected stage are lit and those of the other stage are erased. In addition, the bar code display is able to be partly lit. FIGS. 58(b) to 58(e) show examples of the bar code display. When the focal length is 28 mm and the distance up to the subject is 2 m, the minimum photographing distance is set to 0.3 m. In this case, the numerical row (0.3 m to ∞) of the upper stage is used, the bar display is lit from 0.3 mm to 2 m (refer to FIG. 58(b)). In the case of the minimum photographing distance of 0.5 m at the focal length of 50 mm and the distance 2 m, the upper stage (0.3 m to ∞) is also used to light the bar display from 0.5 mm to 2 m (refer to FIG. 58(c)). The upper stage is changed-over to the lower stage by whether the focal length is over 80 mm or not. In the case of the minimum photographing distance of 0.8 m at the focal length 100 mm and the distance 2 m, the lower stage (0.6 m to ∞) is used to light the bar display from 0.8 m to 2 m (refer to FIG. 58(d)). Additionally, in the case of the minimum photographing distance of 1 m at the focal length of 200 mm and the distance of 2 m, the lower stage (0.6 m to ∞) is used to force the bar display to light from 1 m to 2 m (refer to FIG. 58(e)).

A display part for 3-digit number on the display pattern in FIG. 58(a) shows the present focal length (mm), and the change direction (TELE direction or WIDE direction) of the focal length is displayed by triangle marks on both sides. The left triangle mark is lit in the zooming operation in the WIDE direction, while the zooming operation in the TELE direction is displayed by the right triangle mark.

Further, displays "OFF", "RST" and "AZP " on the lower right side of the display pattern in FIG. 58(a) are lit when the respective modes are selected. Concerning two dots on the right side of the display "AZP ", an upper dot is first lit when data storage on the first spot is completed in AZP2 mode based on the magnification between two spots, while both dots are lit when data storage on the second spot is also completed.

Figure 36:
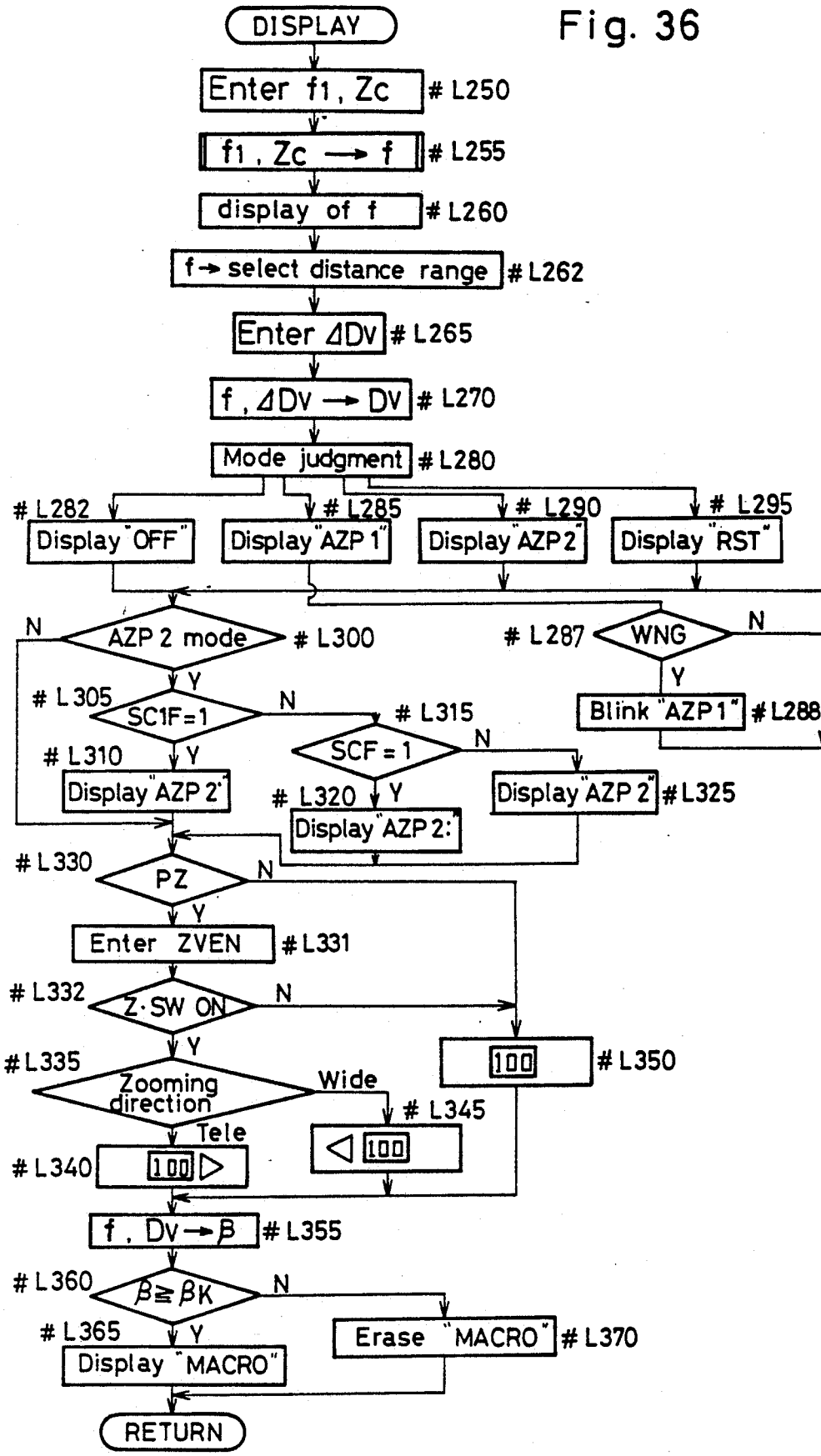

The display subroutine for controlling the above-described display patterns is described referring to FIG. 36. When this subroutine is called, the process reads data $f_1$ on the present focal length range from the zoom encoder ZMEN, and further reads the count value $Z_C$ of the zoom counter ZC for counting the number of pulses from the encoder ENC3 at step #L250. Then the process calculates the accurate focal length f, and performs display thereof (#L255, #L260).

Figure 37:
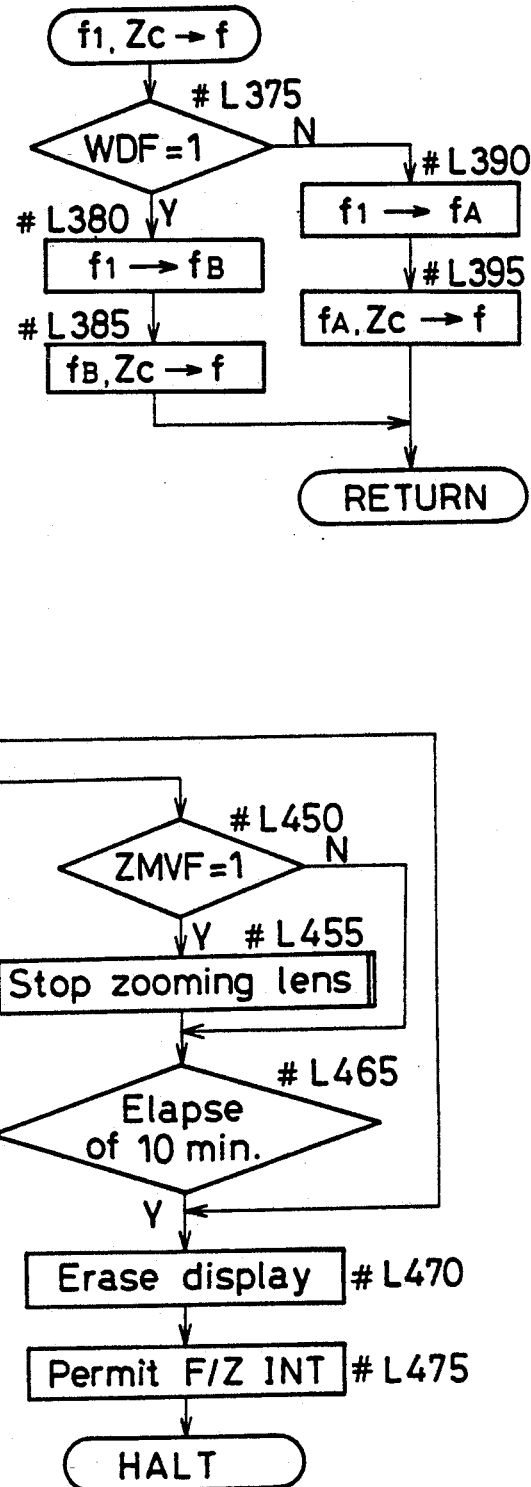

A subroutine for calculating the focal length f based on the data $f_1$ and $Z_C$ is now described referring to FIG. 37. When this subroutine is called, the process judges at step #L375 whether or not a flag WDF, showing the zooming operation in the WIDE direction, has been set. When the flag WDF has been set, assuming that the zooming operation in the WIDE direction has been performed, the process reads the longest focal length $f_B$ in the focal length range $f_1$ from a ROM table, and further reads-out the accurate focal length f from this maximum focal length $f_B$ and the count value $Z_C$ showing the zooming amount in the focal length range $f_1$ on the basis of the ROM table (#L380, #L385). Then the process returns. When the flag WDF has not been set, judging that the zooming operation has been performed toward the TELE side, the process reads the shortest focal length $f_A$ in the focal length range $f_1$ from the ROM table, and further reads-out the accurate focal length f from the shortest focal length $f_A$ and the count value $Z_C$ showing the zooming amount within the focal length range $f_1$ on the basis of the ROM table (#L390, #L395). Thereafter the process returns. The relationship of the focal length range $f_1$ with the shortest focal length $f_A$ and the longest focal length $f_B$ is shown in the following Table 1.

TABLE 1

| $f_1$ | $f_A$ | $f_B$ |
|---|---|---|
| 28 to 34 | 28 | 34 |
| 35 to 49 | 35 | 49 |
| 50 to 64 | 50 | 64 |
| 80 to 94 | 80 | 94 |
| 95 to 109 | 95 | 109 |
| 110 to 124 | 110 | 124 |
| 125 to 139 | 125 | 139 |
| 140 to 154 | 140 | 154 |
| 155 to 169 | 155 | 169 |
| 170 to 184 | 170 | 184 |
| 185 to 200 | 185 | 200 |

Reverting to the flow of FIG. 36, the process judges at step #L262 whether or not the calculated focal length f is more than 80 mm. If f≦80 mm, the process selects the upper numeral line (0.3 m to ∞), otherwise (if f>80 mm) the lower numeral line (0.6 m to ∞) is selected. Subsequently, the process reads data of a move-out amount $\Delta D_V$ from the encoder DVEN, and calculates a distance $D_V$ from the focal length f and the move-out amount $\Delta D_V$ and performs display of the distance $D_V$ (#L265, #L270). The calculating method of the distance $D_V$ has been described in, for example, the Japanese Patent Laid-open Publication 63-28512. Thereafter the process judges the zoom mode: if OFF mode, display "OFF" is put on. Similarly, display "AZP1", display "AZP2" or display "RST" is put on in the case of AZP mode, AZP2 mode or reset mode respectively (#L280 to #L295). In the case of AZP1 mode, judgment is made of whether warning data WNG has been set. When the warning data WNG has been set, the process brings the display "AZP1" into the blinking state (#L287, #L288).

Next, the process judges at step #L300 whether or not AZP2 mode has been set. If AZP2 mode, the process proceeds to step #L305, where judgment is made of whether or not a flag SC1F, showing completion of the first setting, has been set. When the flag SC1F has been set, the process performs display "AZP2°" at step #L310. Otherwise the process proceeds to step #L315, where judgment is made of whether or not a flag SCF, showing completion of the second setting, has been set. When the #L315 judgment results in a determination that the flag SCF has been set, display "AZP " is lit at step #L320. In the case where neither the flag SC1F nor the flag SCF has been set, display "AZP2" is lit at step #L325. Thus, the process proceeds to step #L330 through the step #L310, #L320 or #L325. Also when the #L300 judgment results in a determination that the set mode is not AZP2 mode, the process proceeds to the step #L330, where judgment is made of whether or not power zooming (PZ) is selected. When power zooming is not selected, i.e., power focusing is to be performed, the process proceeds to step #L350 where only the focal length is displayed, and further proceeds to step #L355. On the other hand, when power zooming is selected, the process reads in the output data of the encoder ZVEN showing the zooming velocity and direction, and further judges whether or not the zoom switch (briefly mentioned as "Z-SW" in FIG. 36) for starting the zooming operation has been turned on (#L331, #L332). When the zoom switch is off, the process proceeds to the step #L350 similarly to the case where power zooming is not selected. When the zoom switch is on, the process makes a judgment of the zooming direction at step #L335. If the TELE direction, an arrow toward the right (as illustrated at step #L340 of the flow shown in FIG. 36) is displayed, while an arrow toward the left (as illustrated at step #L345 of the flow shown in FIG. 36) is displayed if the WIDE direction. Then the process proceeds to step #L355 in either case, where the magnification $\beta$ is calculated from the focal length f and the distance $D_V$. Thereafter judgment is made at step #L360 of whether or not the magnification is a predetermined value $\beta_K$ (1/10) or more. If $\beta \geq \beta_K$, the display "MACRO" is lit, and otherwise the process erases the display "MACRO" (#L365, #L370). Then the process returns.

Figure 38:
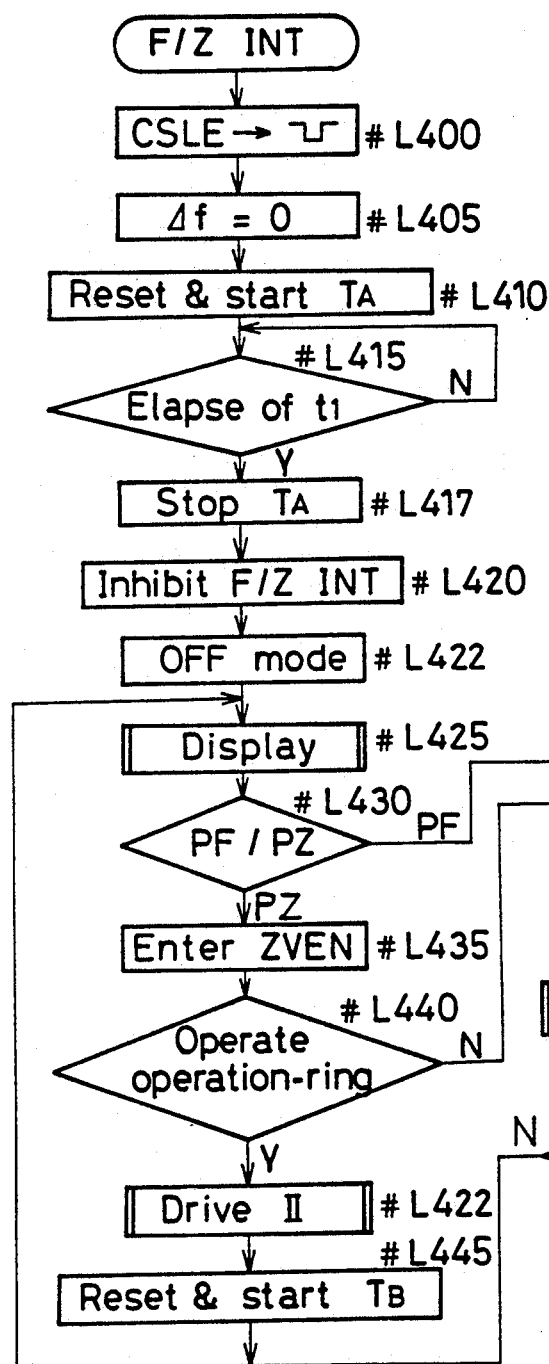

Next, description is made for the case where the in-body microcomputer $\mu$ C1 and the in-lens microcomputer $\mu$ C2 are both inoperative, and the case where a conventional camera body is used and the auxiliary battery E2 is attached to the lens whose microcomputer $\mu$ C2 is not actuated. In both cases, if the operation ring 80 is manually operated, a F/ZINT interrupt routine as shown in FIG. 38 for performing the power focusing (PF) operation or the power zooming (PZ) operation is executed. When the F/ZINT interrupt is applied, the in-lens microcomputer $\mu$ C2 first instantaneously sets the terminal CSLE to the "Low" level to apply the interrupt to the flow of the in-body microcomputer $\mu$ C1 (#L400). Then the process sets a shift amount $\Delta f$ (described later) to zero, resets and starts a timer $T_A$, and remains in the wait state until the timer $T_A$ counts time $t_1$ (#L405 to #L415). The reason why the process remains in the wait state until the time $t_1$ has elapsed by the timer $T_A$ is that judgment is made on the camera body side of whether or not the attached lens is a conventional-type lens. If the lens is not a conventional-type, after the interrupt has been applied as described above the in-body microcomputer $\mu$ C1 sets the terminal CSLE to the "Low" level to renew the data. In response thereto, a CS interrupt is applied to the lens-side flow, and another flow is executed before the timer $T_A$ completes the time counting of $t_1$. However, when the main switch $S_M$ on the camera body side is off, the above data communication is not performed, and neither is data communication performed in the case of the conventional camera body. Therefore, even when the terminal CSLE is set to the "Low" level at the step #L400, the time $t_1$ counting of the timer $T_A$ is completed without executing the CS interrupt. When the step #L415 judgment results in a determination that the timer $T_A$ has completed its time counting of $t_1$, the process stops the timer $T_A$, inhibits the interrupt F/ZINT due to operation of the operation ring 80, and sets OFF mode (#L417 to #L422). Then after executing a display routine at step #L425, the process judges at step #L430 whether power focusing (PF) or power zooming (PZ) has been selected. If power zooming (PZ), the process enters the output data of the encoder ZVEN showing the zooming velocity and direction, and further judges whether or not the operation ring 80 has been operated (#L435, #L440). If the operation ring 80 has been operated, the process executes a subroutine of drive II, resets and starts the timer $T_B$ for holding power, and then returns to the step #L425.

Figure 39:
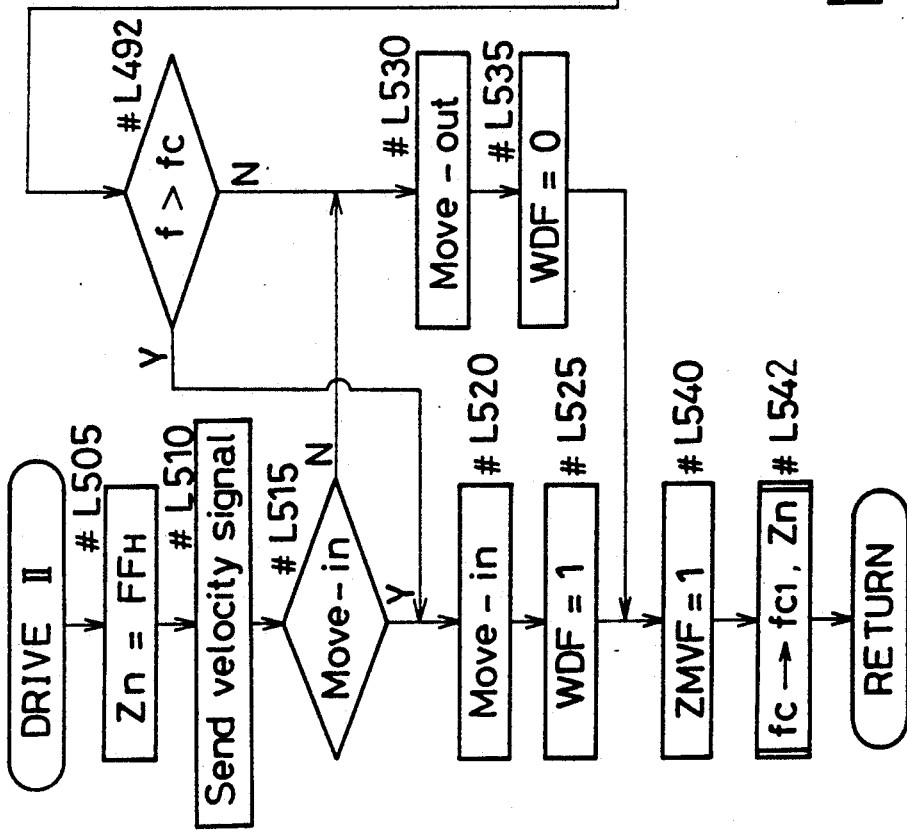

The drive II subroutine is described referring to FIG. 39. When this subroutine is called, in order that the operation of the motor is not inhibited by the counter interrupt, the process first sets the moving amount $Z_n$, corresponding to the count value $Z_C$ of the zoom counter ZC, to $FF_H$ which is a larger than would be possible for $Z_n$, and sends a zooming velocity signal from the output data of the encoder ZVEN to the motor driving circuit MD3 (#L505, #L510). Subsequently the process judges at step #L515 based on the drive direction data from the output data of the encoder ZVEN whether or not the drive direction is set as move-in. If the move-in direction has been chosen, the process sends a move-in signal to the motor driving circuit MD3, and thereafter sets the flag WDF showing the zooming operation in the WIDE direction (#L520, #L525). Next, the process sets the flag ZMVF showing that the zooming lens is being moved, and then calculates a focal length range $f_{C1}$ and the moving amount $Z_n$ corresponding to the control focal length $f_C$ (#L540, #L542). The process thereafter returns. If the move-in direction is not found at the step #L515 judgment, the process sends a move-out signal to the motor driving circuit MD3, and resets the flag WDF showing the zooming operation in the WIDE direction (#L530, #L535), followed by step #L540.

Figure 40:
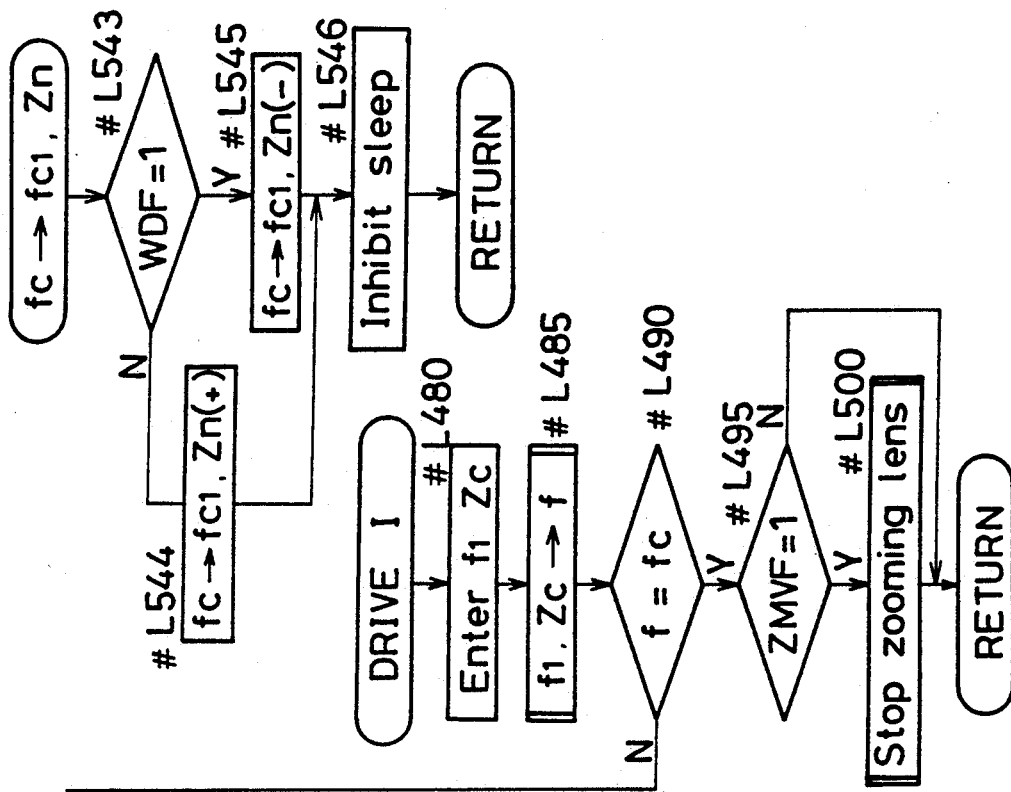

Here, the description is made of a subroutine for calculating the focal length range $f_{C1}$ and the moving among $Z_n$ referring to FIG. 40. In this subroutine, the process first judges at step #L543 whether or not the flag WDF, showing the zooming operation in the WIDE direction, has been set. This is because the zooming operation in the WIDE direction differs in the focal length range $f_1$ of the output data from the zoom encoder ZMEN and the count value $Z_C$ of the zoom counter ZC from the zooming operation in the TELE direction even if the same control focal length $f_C$ is set. For example, when the zooming operation is performed in the WIDE direction, a focal length range $f_{C1}$ larger than the control focal length $f_C$ must be calculated and the negative moving amount $Z_n$ set. On the other hand, in the case of the zooming operation in the TELE direction, a focal length range $f_{C1}$ smaller than the control focal length $f_C$ and a positive moving amount $Z_n$ must be calculated. When the zooming lens is moved-in in the WIDE direction (WDF=1), the process therefore reads out the focal length range $f_{C1}$ and the moving amount $Z_n$ corresponding to the control focal length $f_C$ from a first ROM table with the control focal length $f_C$ taken as address information of the first ROM table (#L545). When the zooming lens is moved-out in the TELE direction (WDF=0), the process reads out the focal length range $f_{C1}$ and the moving amount $Z_n$ corresponding to the control focal length $f_C$ from a second ROM table with the control focal length $f_C$ taken as address information of the second ROM table (#L544). After the step #L544 or #L545, the process proceeds to step #L546 where data for inhibiting the sleep mode is set, and returns. The step #L542 is effective in the cases of reset mode, AZP1 mode, or AZP2 mode, but unnecessary in OFF mode (manual zoom mode).

Figure 33:
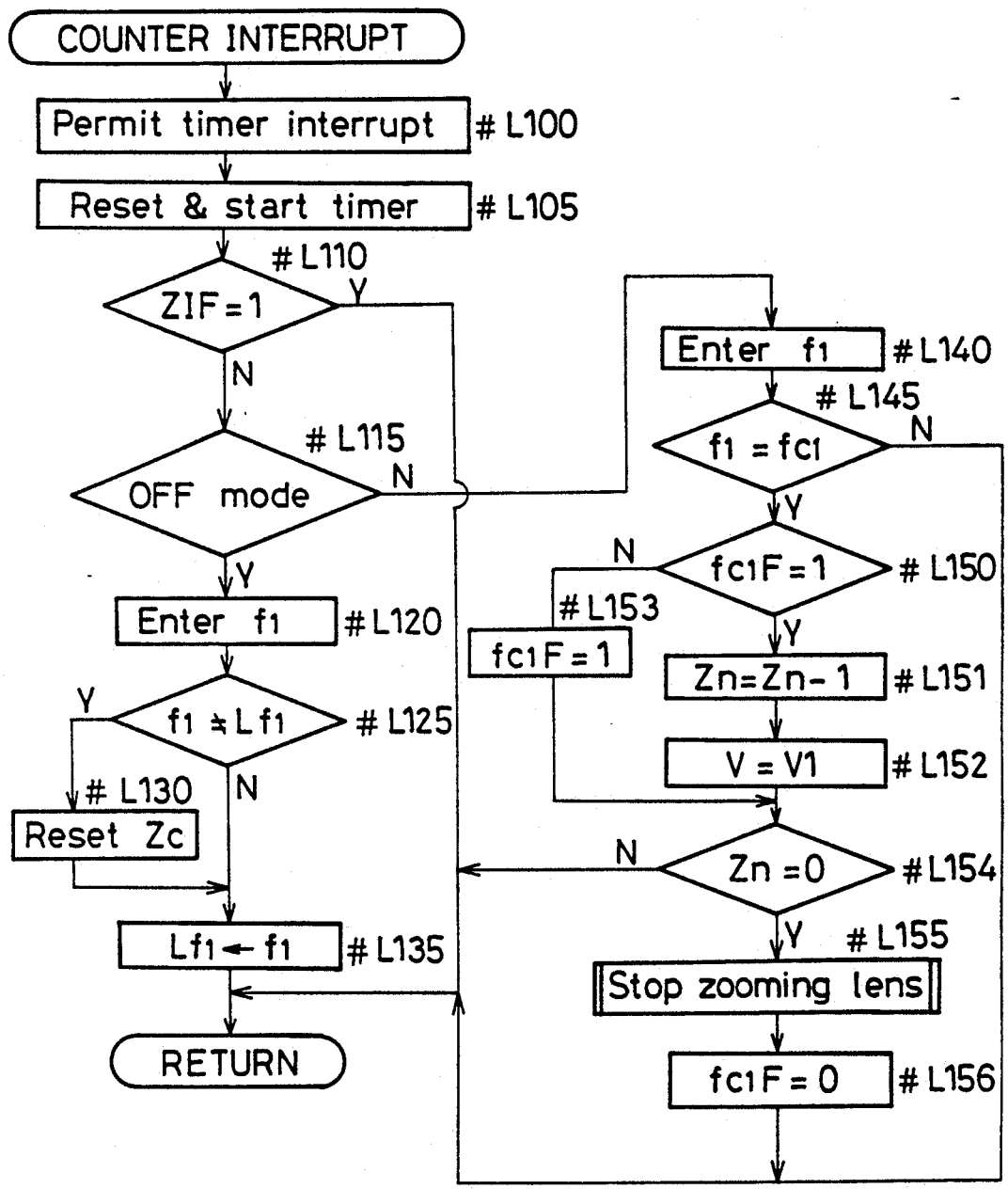

Reverting back to the flow of FIG. 33, in the case of the counter interrupt in this OFF mode (manual zoom mode), judgment at step #L115 results in that the set mode is OFF mode, and the process proceeds to step #L120 where the focal length range $f_1$ is entered from the output data of the zoom encoder ZMEN. Then the process judges at step #L125 whether or not the inputted focal length range $f_1$ is the same as a last-time focal length range $Lf_1$, that is, whether or not the focal length range has changed. If the focal length range has changed, the process resets the count value $Z_C$ of the zoom counter ZC showing the move-out amount, and stores the current focal length range $f_1$ as the last-time focal length range $Lf_1$ (#L130, #L135). Then the process returns. Thereby, the move-out amount after the focal length range is changed can be accurately detected. If the focal length range has not changed as a result of the step #L125 judgment, the process skips the step #L130 and proceeds to the step #L135.

Thus, the zooming lens is moved at the zooming velocity in the zooming direction in correspondence with the operating amount and direction of the operation ring 80.

Reverting to FIG. 38, when the step #L440 judgment results in a determination that the operation ring 80 has not been operated, the process proceeds to step #L450, where judgment is made of whether or not the flag ZMVF, showing that the zooming lens is being moved, has been set. When the flag ZMVF has been set, judging that the photographer stopped operating the operation ring 80, the process executes the zooming lens stop subroutine at step #L455 and then proceeds to step #L465. When the flag ZMVF has not been set, judging that the zooming operation has not been performed from the beginning, the process skips the step #L455 to reach the step #L465. At the step #L465, the process judges whether or not 10 minutes have elapsed from the reset and start of the timer $T_B$ for holding power supply at the step #L445. When 10 minutes have elapsed, the process erases the display, permits the F/ZINT interrupt (#L470, #L475), and thereafter enters the halt state. When 10 minutes have not elapsed at the step #L465 judgment, the process repeats the flow of the step #L425 and the subsequent steps.

Figure 41:
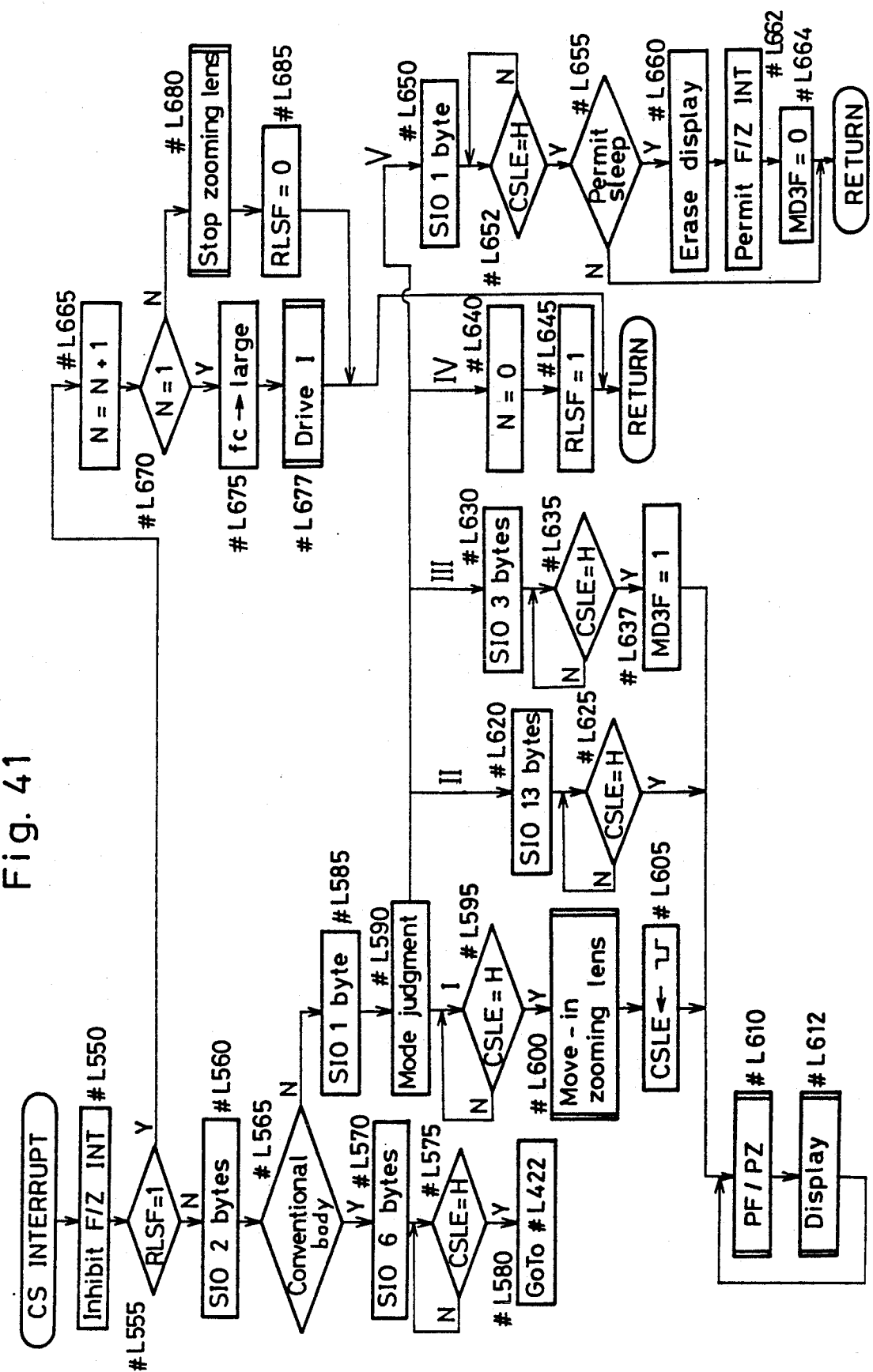

Next, a routine of CS interrupt, which is executed by the in-lens microcomputer $\mu$ C2 when a signal changing the terminal CSLE of the lens from the "High" to the "Low" level is transmitted from the camera body, is described referring to FIG. 41. In this routine, the process first inhibits the F/ZINT interrupt due to manual operation of the operation ring 80, and judges whether or not a flag RLSF, showing during the release operation, has been set (#L550, #L555). When the flag RLSF has not been set, i.e., the release operation is not being performed, the process performs 2-byte serial communication in response to a clock signal from the camera body (#L560). On the basis of the data inputted by this serial communication, the process judges at step #L565 whether or not the camera body is a conventional type. When the lens is attached to a conventional camera body, the process performs 6-byte serial communication to send lens data to the camera body side, and remains in the wait state until the terminal CSLE is set to the "High" level (#L570, #L575). When the terminal CSLE is set to the "High" level, the process proceeds to the step #L422 of the flow shown in FIG. 38 (#L580) to make only the zoom operation possible. When the camera body is not a conventional type, the process receives data showing the communication mode and move-in mode by performing one-byte serial communication, and judges the communication mode (#L585, #L590).

If communication mode I, the process waits until the signal sent to the terminal CSLE is changed from the "Low" to the "High" level, and thereafter executes the zooming lens move-in subroutine (#L595, #L600). After the zooming lens is moved to a predetermined position so that a predetermined magnification can be obtained in move-in mode II set based on the input data, the process instantaneously sets the terminal CSLE to the "Low" level at step #L605, and then proceeds to step #L610 where a PF/PZ subroutine is executed. The process thereafter executes the display subroutine at step #L612, and returns.

Figure 42:
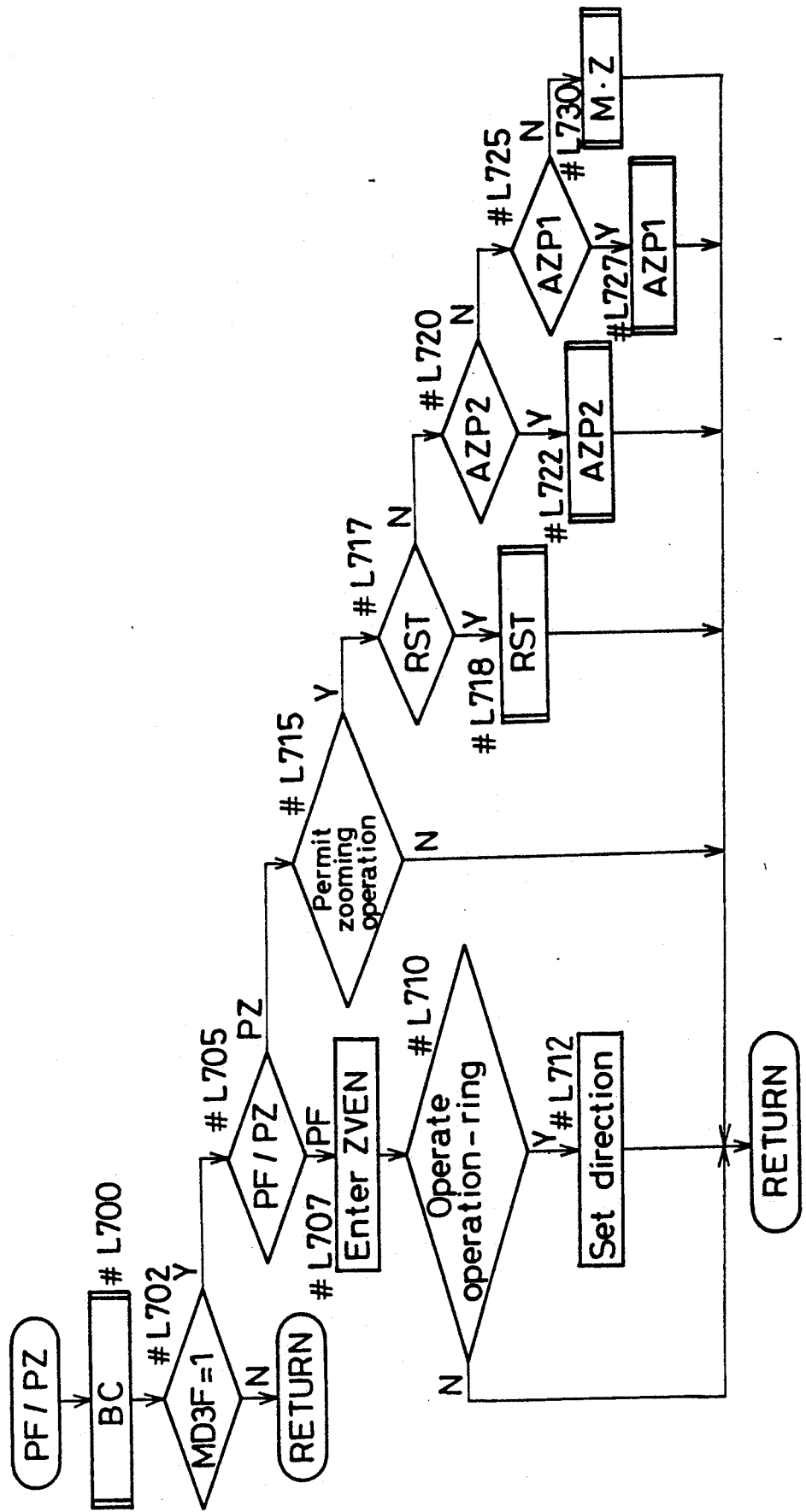

The PF/PZ subroutine is here described referring to FIG. 42. When this subroutine is called, the in-lens microcomputer $\mu$ C2 performs a level check of the voltage supplied to the zoom motor M3 (#L700).

Figure 43:
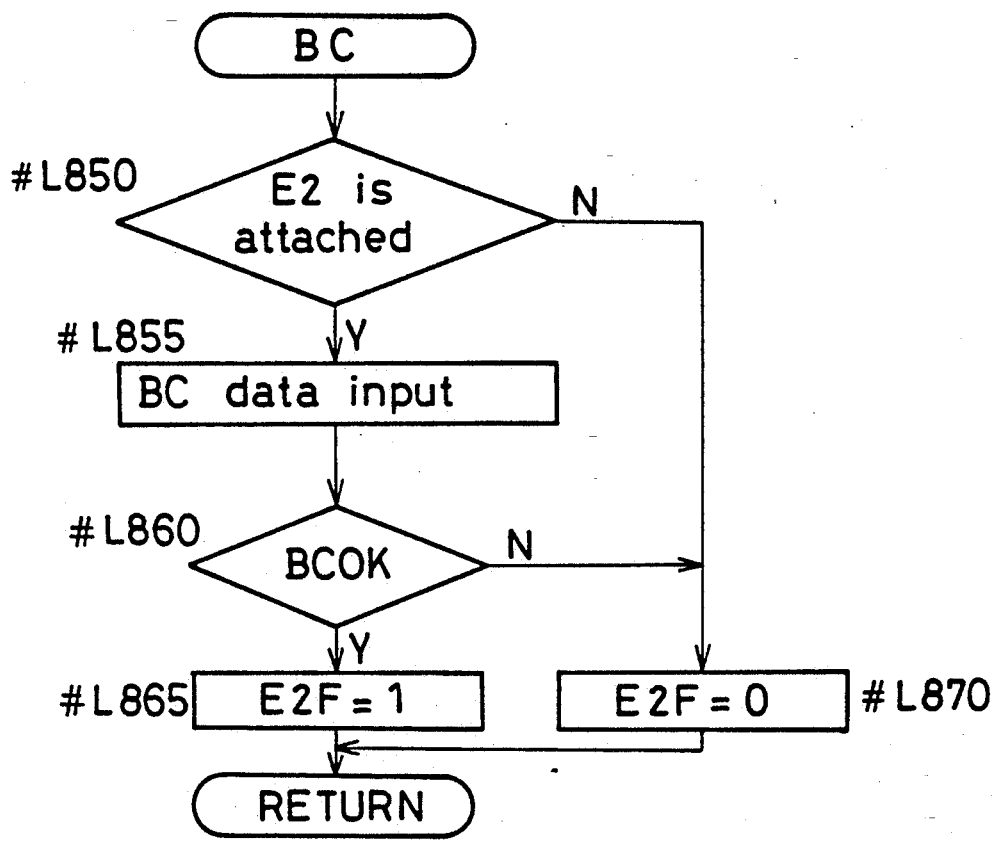

This level check subroutine is described referring to FIG. 43. When this subroutine is called, on the basis of whether or not the switch $S_P$ is on, judgment is first made of whether or not the auxiliary battery E2 is attached (#L850). When the auxiliary battery E2 is not attached, judging that power supply to the zoom motor M3 is insufficient, the process resets a flat E2F showing that the voltage level of the auxiliary battery E2 is sufficiently high (#L870), and then returns. When the step #L850 judgment results in that the auxiliary battery E2 is attached, the process inputs data from the battery checking circuit BC2 for checking the voltage level of the auxiliary battery E2, and judges based on this input data whether or not the voltage level of the auxiliary battery E2 is sufficiently high (#L855, #L860). If the voltage level is not judged to be sufficiently high, the process proceeds to the step #L870 where the flag E2F is reset. On the other hand, in the case of a sufficiently high voltage level, the process sets the flag E2F at step #L865 and returns. Such data as whether the flag E2F has been set or reset is sent also to the in-body microcomputer $\mu$ C1, whereby the microcomputer $\mu$ C1 performs the above-described operations on the basis of this data.

Reverting to the flow of FIG. 42, completing the voltage level check of the auxiliary battery E2, judgment is made at step #L702 of whether or not a flag MD3F showing the completion of the data communication in mode III has been set. When the flag MD3F has not been set, the process returns to inhibit operations such as mode setting. When the flag MD3F has been set, the process proceeds to step #L705 and the subsequent steps as to be described later.

Reverting to the flow of FIG. 41, in the case of the data communication in mode II, the process performs serial communication to output 13-byte data to the camera body, and remains in the wait state until the terminal CSLE is changed from the "Low" to the "High" level (#L620, #L625). Thereafter the process is advanced to the PF/PZ subroutine at the step #L610.

In the case of the data communication in mode III, the process performs serial communication to receive 3-byte data from the camera body, and enters in the wait state (#L630, #L635). When the terminal CSLE is changed from the "Low" to the "High" level, the process sets the flag MD3F showing the completion of the data communication in mode III (#L637), and then proceeds to the PF/PZ subroutine.

Reverting to the flow of FIG. 42, description is here made of the process of the step #L705 and the subsequent steps of the PF/PZ subroutine. As described above, even if the data communication in mode III has been completed only one time, the process sets the flag MD3F at step #L702, and then proceeds to step #L705. The process judges at the step #L705 whether power focusing (PF) has been elected or power zooming (PZ) has been elected. If power focusing (PF), the process enters the input data showing the zooming velocity and direction from the output data of the encoder ZVEN, and then judges based on the input data whether or not the operation ring 80 has been manually operated (#L707, #L710). When the operation ring 80 is judged to have been operated, the process sets, at step #L712, data showing the moving direction corresponding to the operational direction of the operation ring 80 (i.e., if operational direction to the TELE side, the focusing operation is performed in the far-side direction, while the focusing operation in the near-side direction is performed if the operational direction to the WIDE side). Then the process returns. When the step #L710 judgment results in a determination that the operation ring 80 has not been operated, the process directly returns. Returning to the step #L705 judgment, when power zooming (PZ) has been elected, the process proceeds to step #L715, where judgment is made based on the input data from the camera body whether or not the zooming operation is enabled. If the judgment results in a determination that the zooming operation can not be performed, the process directly returns. On the other hand, if the zooming operation is enabled at the step #L715 judgment, the process proceeds to step #L717, where judgment is made of whether or not the set mode is reset mode (briefly described as a symbol RST in the flow of FIG. 42). In the case of reset mode, the process executes a reset mode subroutine at step #L718, and then returns. If the set mode is not the reset mode, the process judges at step #L720 whether or not AZP2 mode has been set. If AZP2 mode has been set, the process executes an AZP2 subroutine at step #L722, and then returns. If the set mode is not AZP2 mode at the step #L720 judgment, the process proceeds to step #L725, where judgment is further made of whether or not the set mode is AZP1 mode. If AZP1 mode is set, the process executes an AZP1 subroutine, and then returns. If the set mode is not AZP1 mode at the step #L725 judgment, i.e., if OFF mode has been set, the process executes a subroutine of manual zooming (briefly described as M·Z in the flow of FIG. 42) at step #L730, and then returns.

Figure 44:
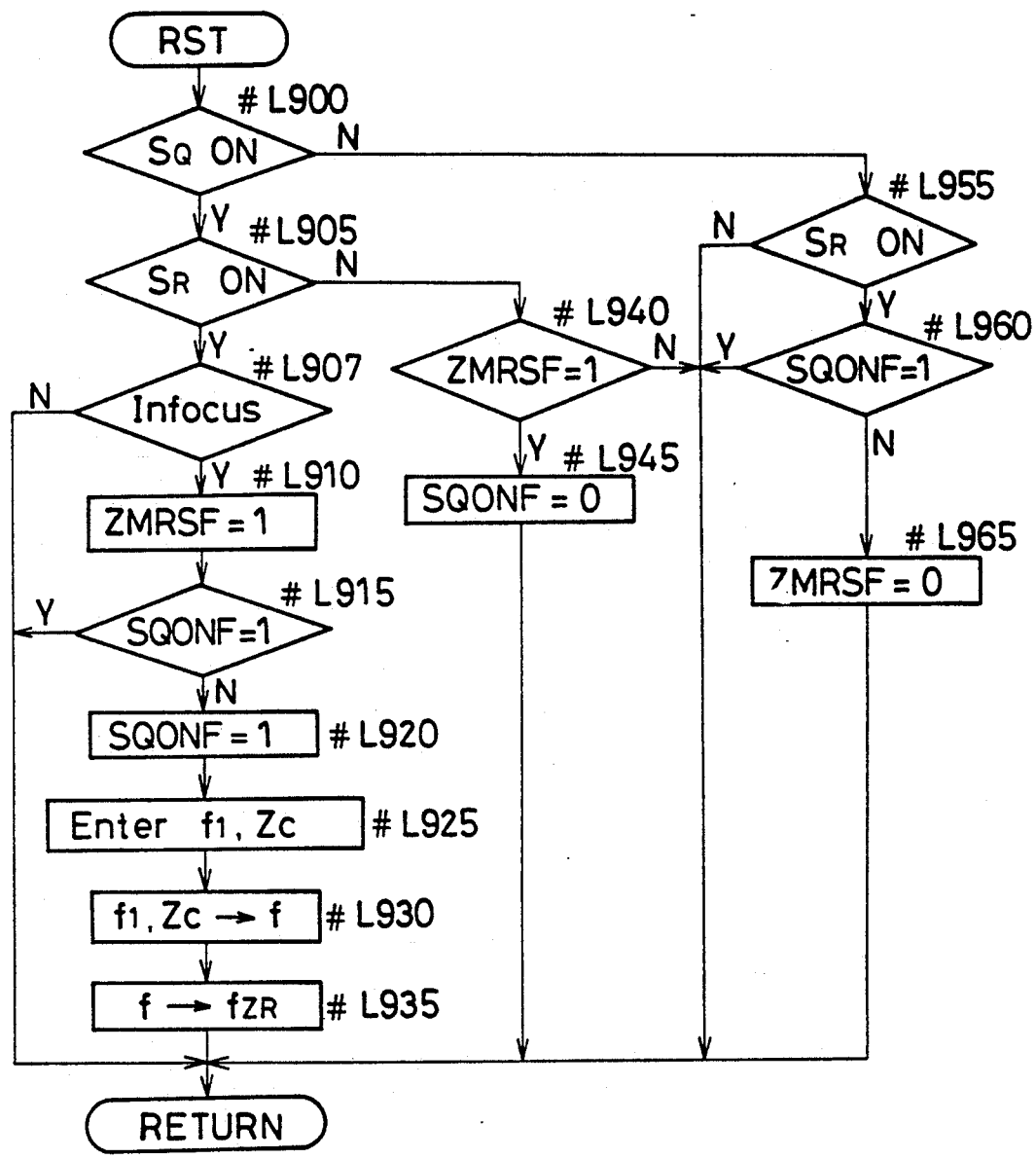

Here, the description is made on the respective subroutines of reset (RST), AZP2, AZP1 and manual zooming (M·Z) modes. When the step #L717 judgment results in reset mode, the reset mode subroutine as shown in FIG. 44 is executed. When the reset mode subroutine is called, the process first judges at step #L900 whether or not the lens switch $S_Q$ is in the ON state. When the lens switch $S_Q$ is on, the process further judges at step #L905 whether or not the memory switch $S_R$ for storing the present focus state has been turned on. When the memory switch $S_R$ is on, the process proceeds to step #L907, where judgment is furthermore made based on the input data from the camera body whether or not the subject is focused. If out-of-focus state is found as a result of the step #L907 judgment, the process returns. If infocus state is found, the process sets a flag ZMRSF showing that the setting of the focal length in reset mode has been completed (#L910). Thereafter the process judges at step #L915 whether or not the flag SQONF, showing that the lens switch $S_Q$ has been turned on one time, has been set.

When the flag SQONF has been set, judging that the setting of the flag SQONF has been completed, the process returns. When the flag SQONF has not been set, the process sets this flag SQONF at step #L920. The process subsequently enters both the focal length range $f_1$ from the output data of the zoom encoder and the count value $Z_C$ of the zoom counter ZC to calculate the accurate focal length (#L925, #L930), and stores the calculated focal length f as a zoom reset value $f_{ZR}$ (#L935), and then returns.

Returning to the step #L905 judgment, when the memory switch $S_R$ is off, the process proceeds to step #L940, where judgment is made of whether or not the flag ZMRSF showing the completion of the setting in reset mode has been set. When the flag ZMRSF has been set, the process resets the flag SQONF at step #L945 and returns. Further returning to the step #L900 judgment, when the lens switch $S_Q$ has not been turned on, the process proceeds to step #L955, where judgment is made of whether or not the memory switch $S_R$ has been turned on. When the memory switch $S_R$ is in the OFF state (this switch $S_R$ has never been operated), the process returns. When the memory switch $S_R$ is on, the process proceeds to step #L960, where judgment is made of whether or not the flag SQONF showing that the lens switch $S_Q$ has been turned on has been set. When the flag SQONF has been set, judging that the lens switch $S_Q$ has been turned off after completion of the setting in reset mode, the process returns. When the step #L960 judgment results in that the flag SQONF has not been set, judging that the memory switch $S_R$ has been turned on to reset the set value in reset mode, the process resets the flag ZMRSF showing the completion of the setting is reset mode (#L965), and then returns.

Reverting to the flow of FIG. 42, when the set mode is not the reset mode at the step #L717 judgment, the process judges at the step #L720 whether or not AZP2 mode has been set. If AZP2 mode is set, the process executes the AZP2 subroutine at the step #L722.

Figure 45:
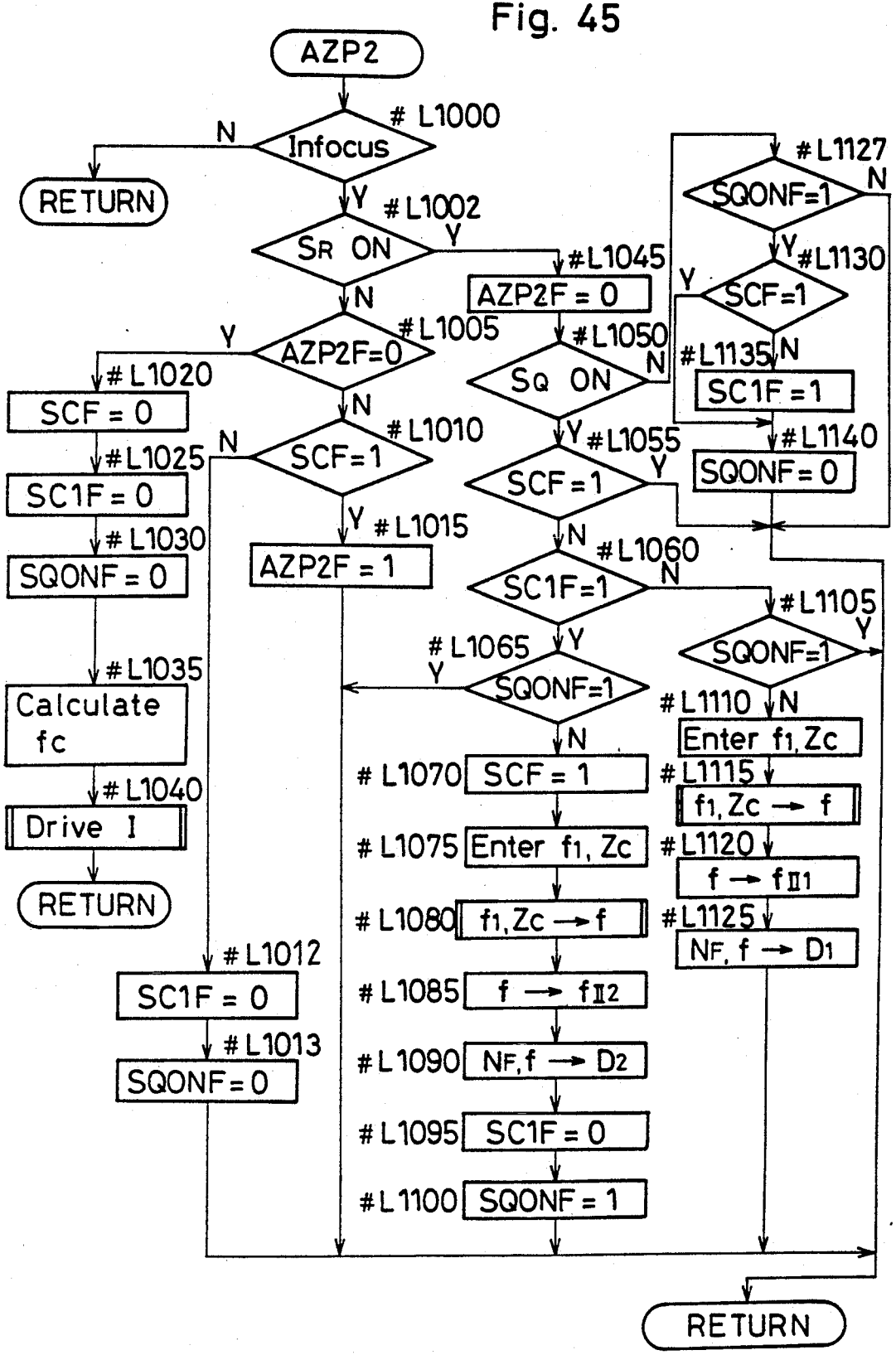

Next, this AZP2 subroutine is described referring to FIG. 45. When this subroutine is called, the process first judges at step #L1000 whether or not the subject is in infocus state. If out-of-focus state, the process returns. If the subject is focused, the process further judges at step #L1002 whether or not the memory switch $S_R$ has been turned on. In the case where the memory switch $S_R$ is off, the process proceeds to step #L1005, where judgment is made of whether or not a flag AZP2F has been set. The flag AZP2F shows that control operation in AZP2 mode is enabled as a result of the completion of the setting in AZP2 mode. When the flag AZP2F has been set at the step #L1005, the process resets the flags of SCF, SC1F and SQONF (#L1020 to #L1030). Thereafter the process proceeds to step #L1035, where the control focal length $f_c$ is calculated from the move-out amount N by the following equation:

$$f_c = \frac{(fII_1 - fII_2)N + D_1 \cdot fII_2 - D_2 \cdot fII_1}{(D_1 - D_2)}$$

where, $fII_1$ and $fII_2$ respectively represent focal lengths at a first and second points set in AZP2 mode, and $D_1$ and $D_2$ respectively represent distances at the first and second points set in AZP2 mode.

Next, the process executes a subroutine of drive I at step #L1040 to move the zooming lens, and returns.

The drive I subroutine is here described referring to FIG. 39. When this drive I subroutine is called, the process first enters both the focal length range $f_1$ from the output data of the zoom encoder ZMEN and the count value $Z_C$ of the zoom counter ZC to calculate the accurate focal length f (#L480, #L485). Subsequently, the present focal length f is compared with the control focal length $f_C$ set in the reset routine at step #L490. If $f_C=f$, judgment is made of whether or not the flag ZMVF, showing that the zooming lens is being moved, has been set (#L495). When the flag ZMVF has not been set, the process immediately returns. When the flag SMVF has been set, the process executes the zooming lens stop routine at step #L500, and returns. If $f \neq f_C$, the process proceeds to step #L492, where judgment is further made of whether or not $f > f_C$ is satisfied. If $f > f_C$, the process proceeds to step #L520 to move the zooming lens toward the WIDE side, while the process proceeds to step #L530 to perform the zooming operation to the TELE direction when $f < f_C$ is satisfied.

In the counter interrupt routine shown in FIG. 33, when the step #L115 judgment results in that the set mode is not OFF mode, the process enters the focal length range $f_1$ among the output data from the zoom encoder ZMEN, and then judges whether or not the focal length range $f_1$ is equal to the value $f_{C1}$ of the zoom encoder ZMEN corresponding to the control focal length $f_C$ obtained by calculation (#L140, #L145). If $f_1 \neq f_{C1}$ at the #L145 judgment, the process returns. If $f_1 = f_{C1}$, the process further judges at step #L150 whether or not a flag $f_{C1}F$, showing that the process has passed through this flow one time, has been set. When the flag $f_{C1}F$ has been set, the process decreases the count value $Z_n$ representing the moving amount by 1, and reduces the moving velocity to V1, followed by step #L154. When the flag $f_{C1}F$ has not been set at the step #L150, the process sets the flag $f_{C1}F$ and then proceeds to the step #L154. At the step #L154, judgment is made of whether or not the count value $Z_n$ representing the moving amount equals 0. If $Z_n=0$, the process executes the zooming lens stop subroutine, resets the flag $f_{C1}f$ showing that this flow has been passed through (#L155, #L156), and then returns. If $Z_n \neq 0$ at the step #L154 judgment, the process immediately returns.

Reverting to the flow of FIG. 45, when the flag AZP2F, which shows that the control operation in AZP2 mode, is enabled, has not been set at the step #L1005, the process judges by the flag SCF whether or not the storage for the two spots has been completed (#L1010). When the storage for the two spots has been completed (SCF=1), judging that the memory switch $S_R$ has been turned off because of the completion of the storage, the process sets the flag AZP2F (#L1015), and then returns. The data concerning this flag AZP2F is sent to the camera body side as data showing presence/absence of AZP2 mode setting. When the flag SCF has not been set at the step #L1010 judgment, that is, when the storage for the two spots has not been completed, judging that the memory switch $S_R$ has been operated to release or reset the storage, the process resets the flags SC1F and SQONF (#L1012, #L1013).

Meanwhile, when the step #L1002 judgment results in a determination that the memory switch $S_R$ is on, the process resets the flag AZP2F showing that the control operation in AZP2 mode is permissible, and then judges whether or not the lens switch $S_Q$ has been turned on (#L1045, #L1050). When the lens switch $S_Q$ is on, the process further judges at step #L1055 whether or not the flag SCF showing the completion of the setting for the two spots has been set. When the flag SCF has been set, the process returns. When the flag SCF has not been set at the step #L1055, the process judges at step #L1060 whether or not the flag SC1F, showing the completion of the setting of the storage for the first spot, has been set. When the flag SC1F has been set, the process further judges at step #L1065 whether or not the flag SQONF, showing the turn-on of the lens switch $S_Q$, has been set. When the flag SQONF has been set, judging that the lens switch $S_Q$ still remains in the ON state after the completion of the setting for the two spots, the process returns without performing anything further. When the step #L1065 judgment results in a determination that the flag SQONF has not been set, judging that the lens switch $S_Q$ has been turned on to perform the setting for the second spot, the process proceeds to step #L1070 and the subsequent steps to store the data for the second spot. The process first sets the flag SCF, and enters both the focal length range $f_1$ from the output data of the zoom encoder ZMEN and the count value $Z_C$ of the zoom counter ZC (#L1070, #L1075). On the basis of these data, the process calculates the accurate focal length f, and sets this focal length f to a set value $fII_2$ (#L1080, #L1085). Subsequently, the process obtains the distance D based on the move-out amount $N_F$ of the AF lens among the input data from the camera body and the focal length f, and sets the distance D to a second set value $D_2$ (#L1090). Thereafter the process resets the flag SC1F showing the completion of the storage for the first spot, sets the flag SQONF showing that the lens switch $S_Q$ has been turned on (#L1095, #L1100), and then returns. The distance D may be calculated based on the focal length f and the move-out amount $N_F$ each time, or the distance D may be readout from the ROM table by taking the combination of the focal length f and the move-out amount $N_F$ as the address information. When the step #L1060 judgment results in a determination that the flag SC1F, showing the completion of the storage for the first spot, has not been set, in order to store the data for the first spot, the process shows that the lens switch $S_Q$ has been turned on. At this time, the process proceeds to step #L1105, where judgment is made of whether or not the flag SQONF, showing that the lens switch $S_Q$ is on, has been set. When the flag SQONF has not been set, judging that this flow is not executed until the lens switch $S_Q$ is turned on, the process proceeds to step #L1110. At this step #L1110, the process enters both the focal length range $f_1$ from the input data of the zoom encoder ZMEN and the count value $Z_C$ of the zoom counter ZC. The process then reads-out the accurate focal length f based on these data, and sets this focal length f to a first set value $fII_1$ (#L1115). Subsequently the distance D is obtained based on the move-amount of the AF lens among the input data from the camera body and the focal length f, and the distance D is set to a first set value $D_1$ (#L1120, #L1125), and then the process returns. When the step #L1105 judgment results in a determination that the flag SQONF has been set, judging that the lens switch $S_Q$ is still kept in the ON state after the completion of the setting for the first spot, the process immediately returns. Returning to the step #L1050, when the lens switch $S_Q$ is in the OFF state, the process proceeds to step #L1127, where judgment is made of whether or not the flag SQONF has been set. When the flag SQONF has been set, judging that the lens switch $S_Q$ has been turned on after setting the flag SQONF, the process proceeds to step #L1130, where judgment is further made of whether or not the flag SCF, showing the completion of the setting for the two spots, has been set. When the flag SCF has not been set, the process sets the flag SC1F at step #L1135 because the setting for the first spot has been completed, followed by step #L1140. When the flag SCF has been set at the step #L1130 judgment, the process skips the step #L1135 and proceeds to the step #L1140. At the step #L1140, the process resets the flag SQONF and then returns. When the step #L1127 judgment results in a determination that the flag SQONF has not been set, judging that the lens switch $S_Q$ is kept in the OFF state, the process returns without performing anything further.

Reverting to the flow of FIG. 42, when the set mode is not AZP2 mode as a result of the step #L720 judgment, the process further judges at step #L725 whether or not AZP1 mode has been set. If AZP1 mode, the process executes a subroutine of AZP1 mode at the step #L727.

Figure 47:
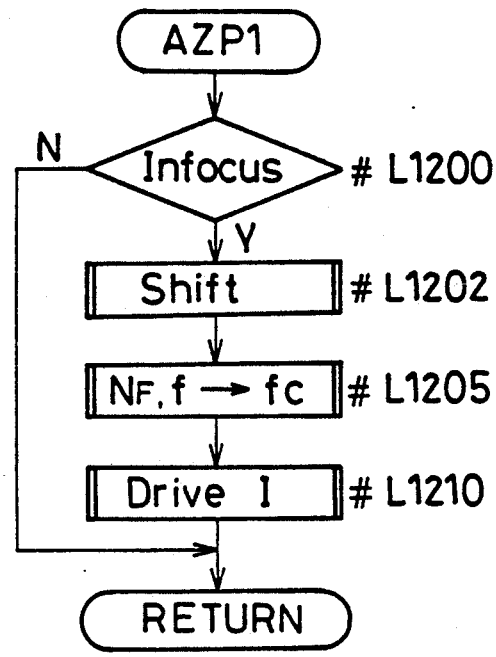

This AZP1 subroutine is described referring to FIG. 47. When this subroutine is called, the process first judges at step #L1200 whether or not the subject is focused. In the case of an out-of-focus state, the process immediately returns. On the other hand, if the subject is focused, the process executes a subroutine of magnification shift at the zooming operation, and calculates the control focal length $f_C$ based on the move-out amount of the AF lens and the focal length f (#L1202, #L1205). The process thereafter executes the drive I subroutine at step #L1210 and returns.

Figure 48:
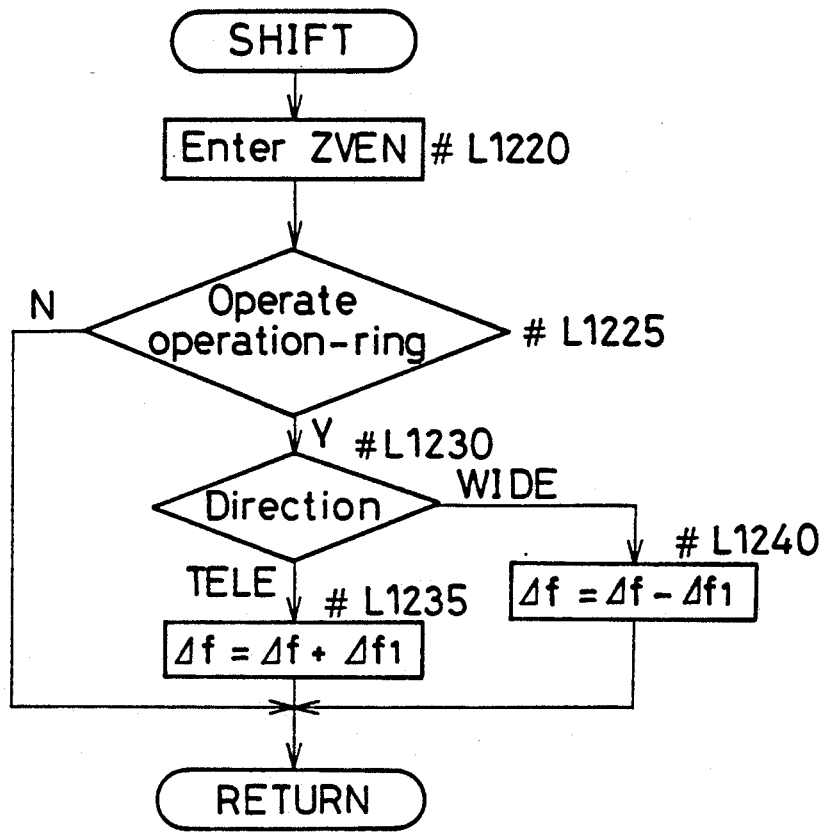

The shift subroutine is described here referring to FIG. 48. When this subroutine is called, the process enters the data showing whether or not a manual zooming operation is being performed from the output data of the zoom encoder ZMEN (#L1220). Then the process judges at step #L1225 whether or not the manual zooming operation has been performed. When the manual zooming operation has not been performed, the process returns. On the other hand, when the manual operation has been carried out, the process judges the operational direction (#L1230). In the case of the TELE direction, a predetermined amount $\Delta f_1$ is added to a shift amount $\Delta f$, while the amount $\Delta f_1$ is subtracted from the shift amount $\Delta f$ in the case of the WIDE direction (#L1235, #L1240), and then the process returns. In this subroutine, the operational angle is not taken into consideration, but only the operational direction is under consideration.

Figure 46:
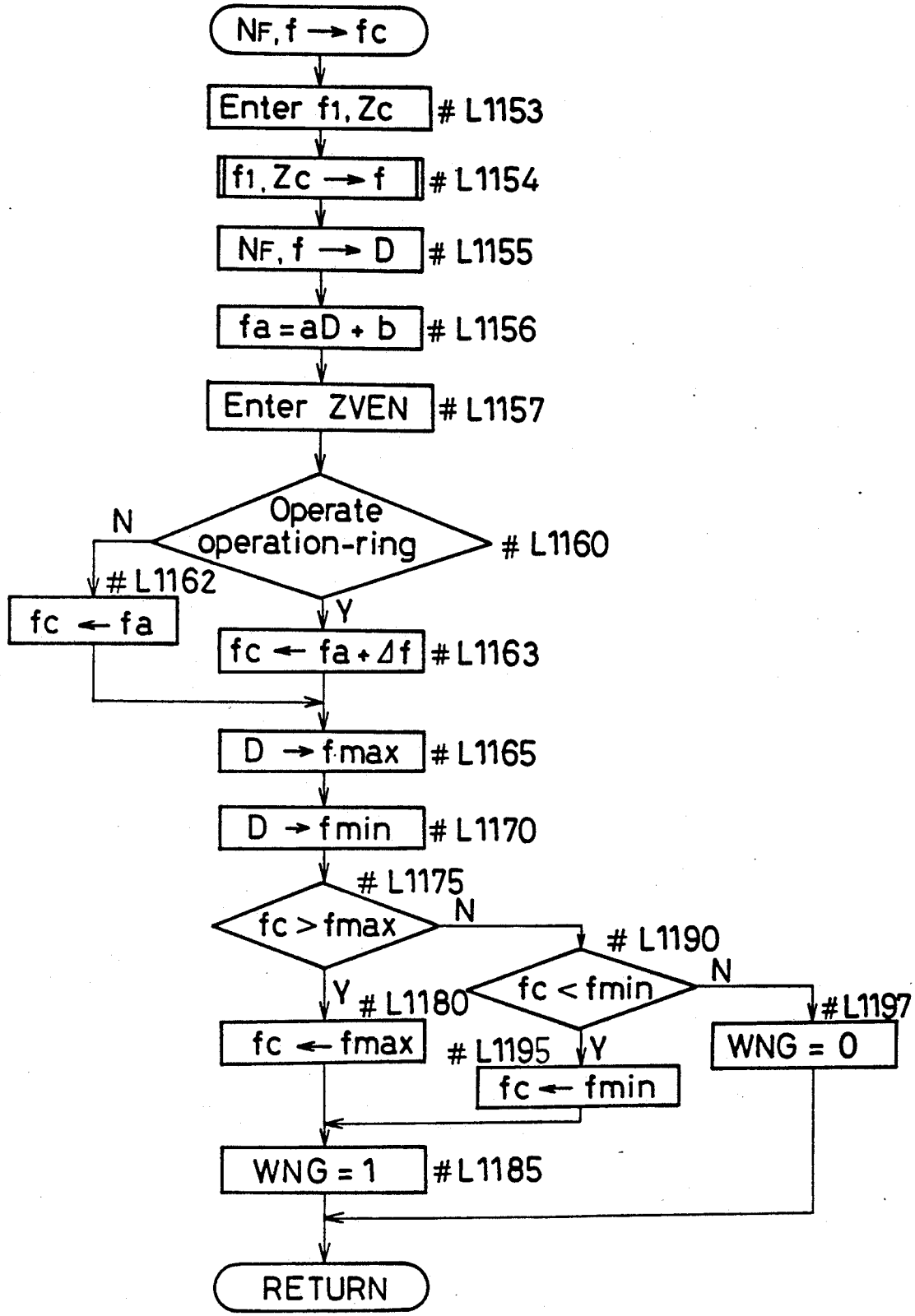

Next, description is made of the subroutine for calculating the control focal length $f_C$ from the move-out amount $N_F$ of the AF lens and the focal length f, referring to FIG. 46. When this subroutine is called, the process first enters the focal length range $f_1$ from the output data of the zoom encoder ZMEN and the count value $Z_C$ of the zoom counter ZC to calculate the accurate focal length f (#L1153, #L1154). Then the process calculates the distance based on the calculated focal length f and the move-out amount $N_F$ of the AF lens, and further calculates a focal length $f_a$ corresponding to the distance D by the following equation:

$$f_a = a \times D + b$$

where a and b represent constants (#L1155, #L1156). This means that the magnification proportional to the distance D is determined at this step #L1156. Subsequently the process enters the output data showing whether or not a manual zooming operation is being performed from the encoder ZVEN (#L1157). Next, judgment is made at step #L1160 whether or not the manual zooming operation has been performed. When the manual operation has been carried out, the control focal length $f_C$ is set to $(f_a + \Delta f)$ at step #L1163, followed by step #L1165. On the other hand, when it is determined that the manual zooming operation has not been performed as a result of the step #L1160 judgment, the process sets the control focal length $f_C$ to $f_a$ at step #L1162, then proceeds to the step #L1165 similarly to the case where the manual zooming operation has been performed. Subsequently the process calculates the longest possible focal length $f_{max}$ and the shortest possible focal length $f_{min}$ based on the distance D, and then judges whether or not the control focal length $f_C$ is larger than the maximum focal length $f_{max}$, and also whether or not the control focal length $f_C$ is smaller than the minimum focal length $f_{min}$ (#L1165 to #L1175, #L1190). If $f_C > f_{max}$, the control focal length $f_C$ is set to the maximum focal length $f_{max}$ (#L1180). If $f_C < f_{min}$, the control focal length $f_C$ is set to the minimum focal length $f_{min}$. Then, in either case, the warning flag WNG is set at step #L1185, and the process returns. On the other hand, if the control focal length $f_C$ is within the range of $f_{min} \leq f_C \leq f_{max}$, the process resets the warning flag WNG at step #L1197 and returns.

In the flow shown in FIG. 42, when the step #L725 judgment results in a determination that the set mode is not AZP1 mode, judging that OFF mode (manual zoom mode) has been set, the process executes the manual zooming subroutine.

Figure 49:
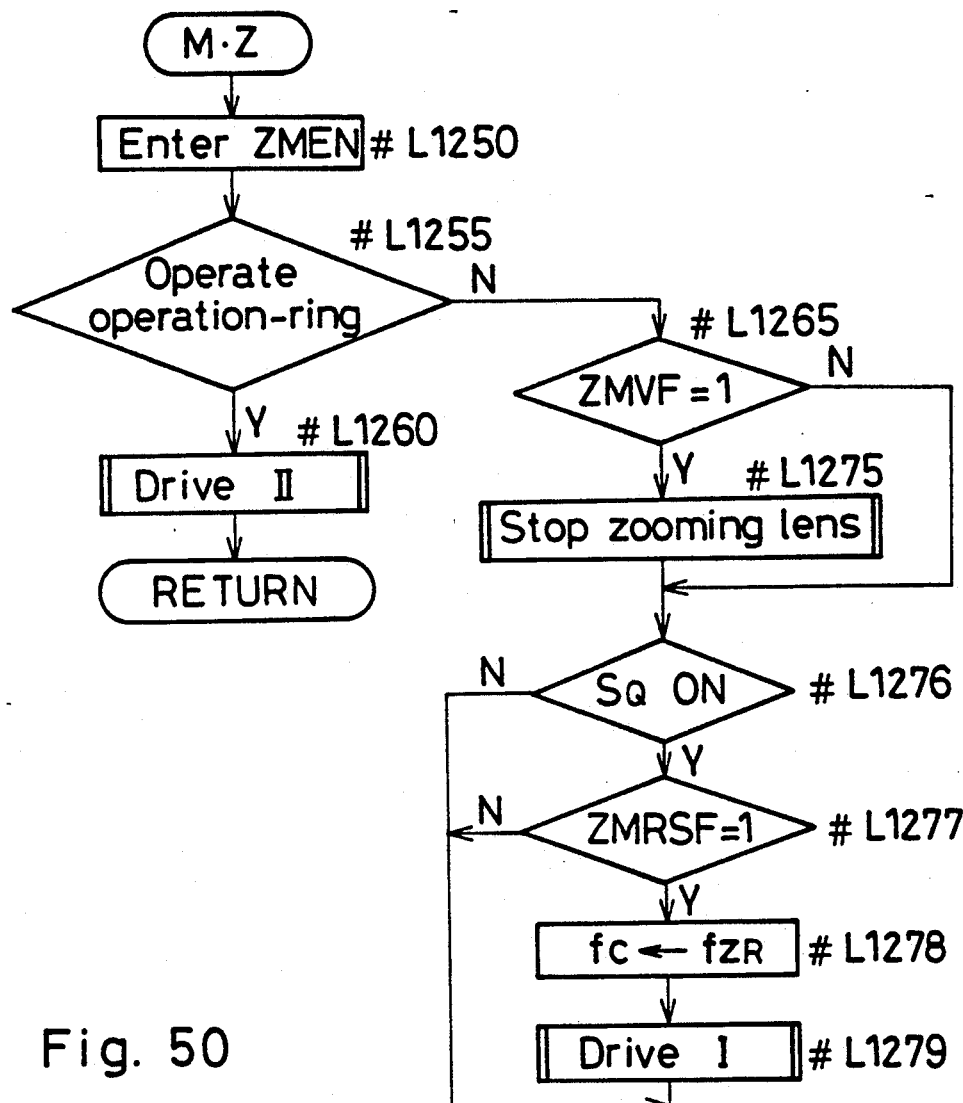

This manual zooming subroutine is described referring to FIG. 49. When this subroutine is called, the process first enters the output data showing whether or not a manual zooming operation is being performed from the zoom encoder ZMEN (#L1250), and judges at step #L1255 whether or not the manual zooming operation has been performed. When the manual operation has been performed, the process executes the drive II subroutine to move the zooming lens (#L1260), and returns. When it is determined that the manual zooming operation has not been performed at the step #L1255 judgment, the process proceeds to step #L1265, where judgment is further made whether or not the flag ZMVF, showing that the zooming lens is being moved, has been set. When the flag ZMVF has been set, the process executes the zooming lens stop subroutine (#L1275), and thereafter proceeds to step #L1276. Also when the flag ZMVF has not been set, skipping the step #L1275, the process proceeds to the step #L1276. At the step #L1276, the process judges whether or not the lens switch $S_Q$ is in the ON state. When the lens switch $S_Q$ is off, the process returns. In the case of the ON state of the lens switch $S_Q$, the process proceeds to step #L1277, where judgment is made of whether or not the flag ZMRSF, showing the completion of the setting of the focal length in reset mode, has been set. When the flag ZMRSF has not been set, the process returns. When it is determined that the flag ZMRSF has been set as a result of the step #L1277 judgment, a focal length $f_{ZR}$ set in reset mode is set as the control focal length $f_C$ (#L1278). Then the process executes the drive I subroutine at step #L1279 and returns.

Reverting to the flow shown in FIG. 41, when the result of the communication mode judgment at the step #L590 is of mode IV during the shutter release, the process sets a variable N to zero, sets the flag RLSF showing that the shutter release operation is being performed (#L640, #L645), and returns.

Returning to the step #L555 judgment, when clock pulses have been sent from the camera body, the process proceeds to step #L665 where the variable N is set to (N+1), and judges at step #L670 whether or not the variable N is equal to 1. If N=1, the control focal length $f_C$ is set to a value larger than normally possible, and then the drive I subroutine is executed to move the zooming lens (#L675, #L677). The process thereafter returns. If N≠1 at the step #L670, the process executes the zooming lens stop subroutine, resets the flag RLSF showing that the shutter release operation is being performed (#L680, #L685), and then returns.

Meanwhile, when the step #L590 judgment results in the data communication in mode V (as described above, the in-body microcomputer μ C1 is about to enter the sleep mode at this time), the process performs one-byte serial communication to send data showing whether sleep is permissible or not, waits until the terminal CSLE is set to the "High" level (#L650, #L652), and thereafter proceeds to step #L655. At the step #L655, judgment is made of whether or not a sleep-permissible signal has been set. If the signal has not been set, the process immediately returns. On the other hand, when the signal has been set, the process erases the display, permits the F/ZINT interrupt, resets the flag MD3F showing the completion of the data communication in mode III (#L660 to #L664), and then returns.

Control operation of in-card microcomputer μ C3

Figure 50:
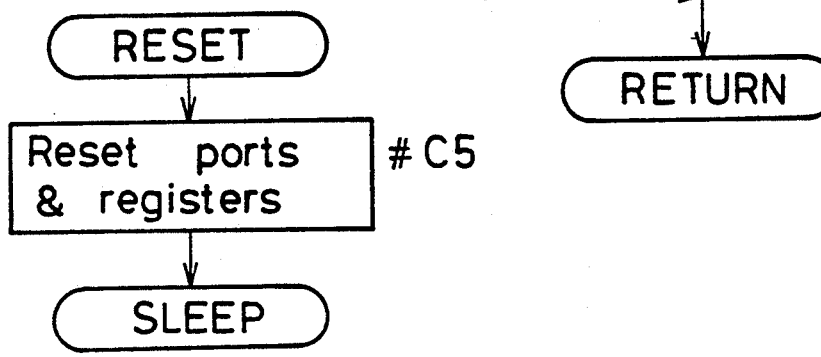
FIGS. 50 to 53 are flowcharts of routines and a subroutine executed by a microcomputer in a card attached to the camera body according to an embodiment of the present invention.

The following description is made of the control operation of the in-card microcomputer μ C3. When the card is inserted into the camera body, the card attachment detecting switch $S_{RE3}$ is turned off, and a signal for changing the reset terminal RE3 from the "Low" to the "High" level is transmitted to the in-card microcomputer μ C3. Thereby the in-card microcomputer μ C3 executes a reset routine as shown in FIG. 50. In this reset routine, the process resets ports and registers (#C5), and enters into the sleep state. Thereafter when a "Low" level signal showing a data communication request from the in-body microcomputer μ C1 is sent to the terminal CSCD, the in-card microcomputer μ C3 executes an interrupt routine.

Figure 51:
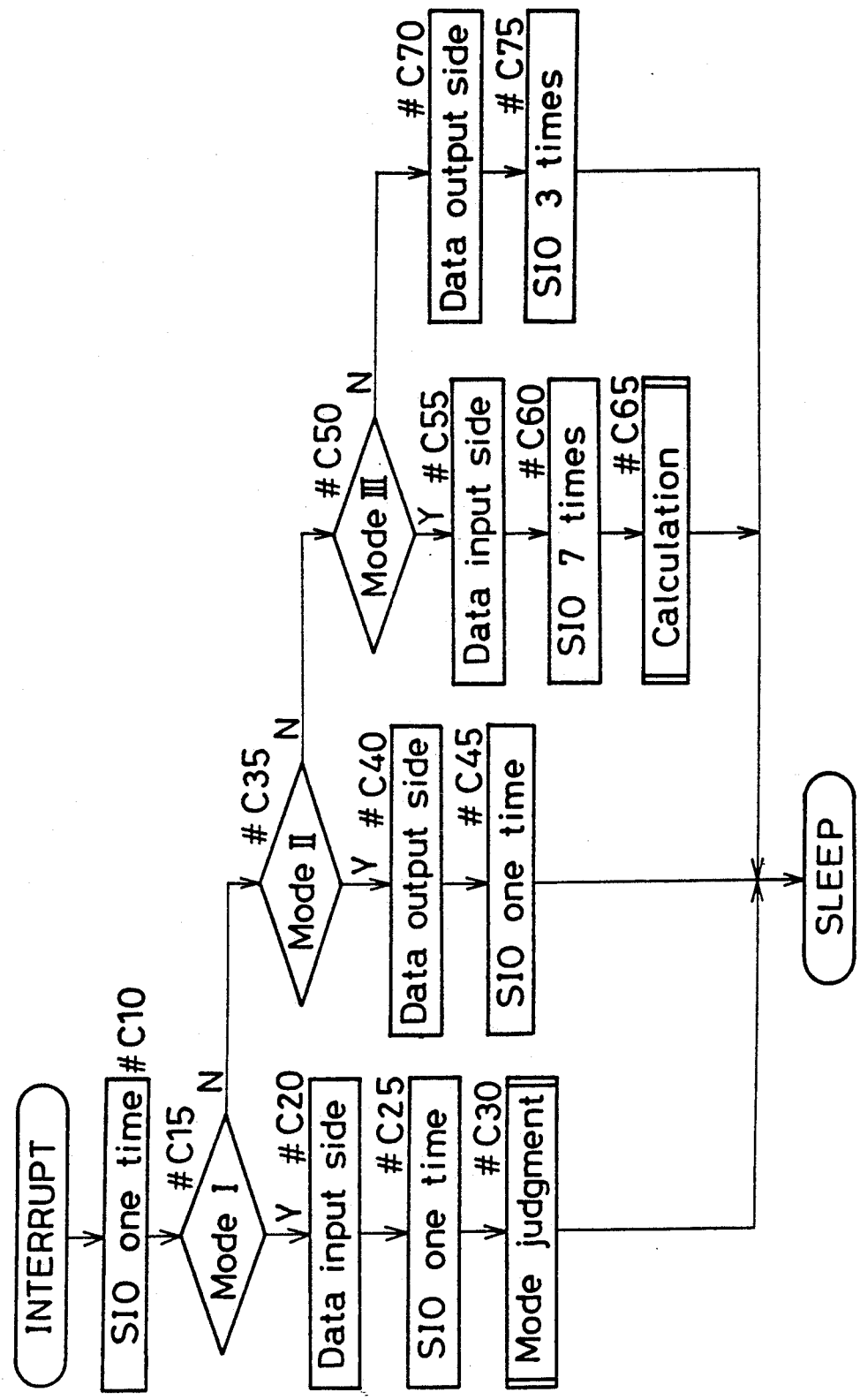

This interrupt routine is here described referring to FIG. 51. First, one-byte serial communication is performed at step #C10, and then the communication mode is determined at step #C15.

Here, description is made of the process of the in-card microcomputer μ C3 in each communication mode. In the case of data communication in mode I as a result of the step #C15 judgment, one-byte data is received from the in-body microcomputer μ C1 through one-byte serial communication with the card set to data input mode, and then a subroutine of mode judgment is executed (#C20 to #C30). The process thereafter enters in the sleep state.

Figure 52:
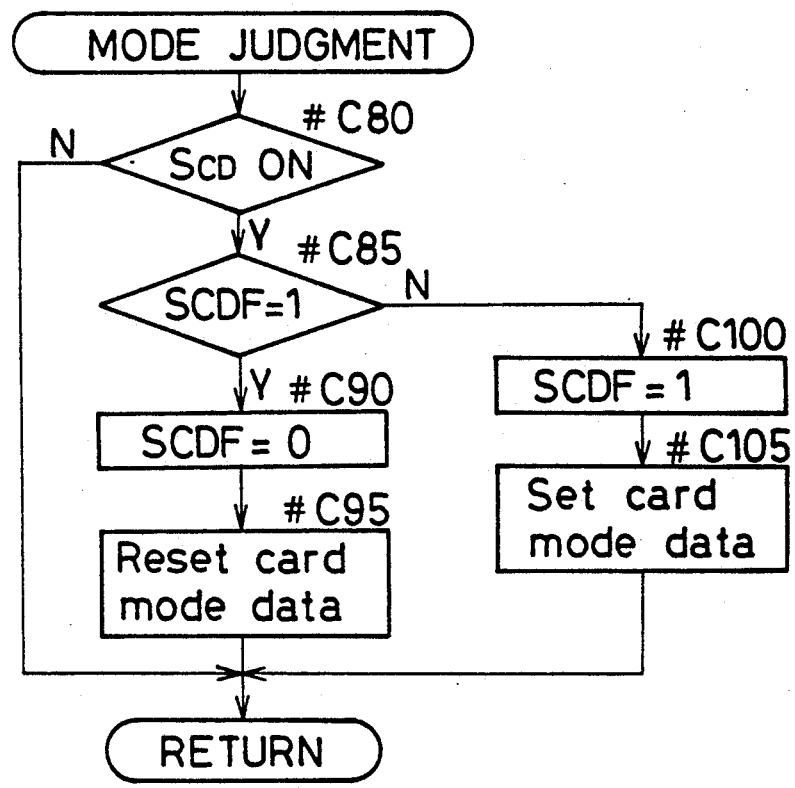

This mode judgment subroutine is described referring to FIG. 52. When this subroutine is called, the process judges based on the input data from the camera body whether or not the card switch $S_{CD}$ is on (#C80). When the card switch $S_{CD}$ is not ON, the process returns. When the card switch $S_{CD}$ is on, the process further judges at step #C85 whether or not a flag SCDF, showing that a control operation is being performed by the card, has been set. When the flag SCDF has been set, judging that the camera has been under card control up to the present, the process resets the flag SCDF to release the card control state, resets the card mode data to be sent to the camera body side (#C90, #C95), and then returns. When it is determined that the flag SCDF has not been set at the step #C85 judgment, judging that the card switch $S_{CD}$ has been turned on to perform the control operation by the card, the process sets the flag SCDF, sets the card mode data to be sent to the camera body (#C100, #C105), and then returns.

Reverting to the flow of FIG. 51, in the case of data communication in mode II as a result of step #C35 judgment, the process sets the card to the data output mode, sends one-byte data including the card mode data to the in-body microcomputer μ C1 by one-byte serial communication (#C40, #C45), and then enters in the sleep state.

When judgment at step #C50 results in data communication in mode III, the process sets the card to data input mode, and thereby receives 7-byte data from the in-body microcomputer μ C1 through 7-byte serial communication (#C55, #C60). The process executes a calculation routine based on this input data (#C65), and then enters in the sleep state.

Figure 53:
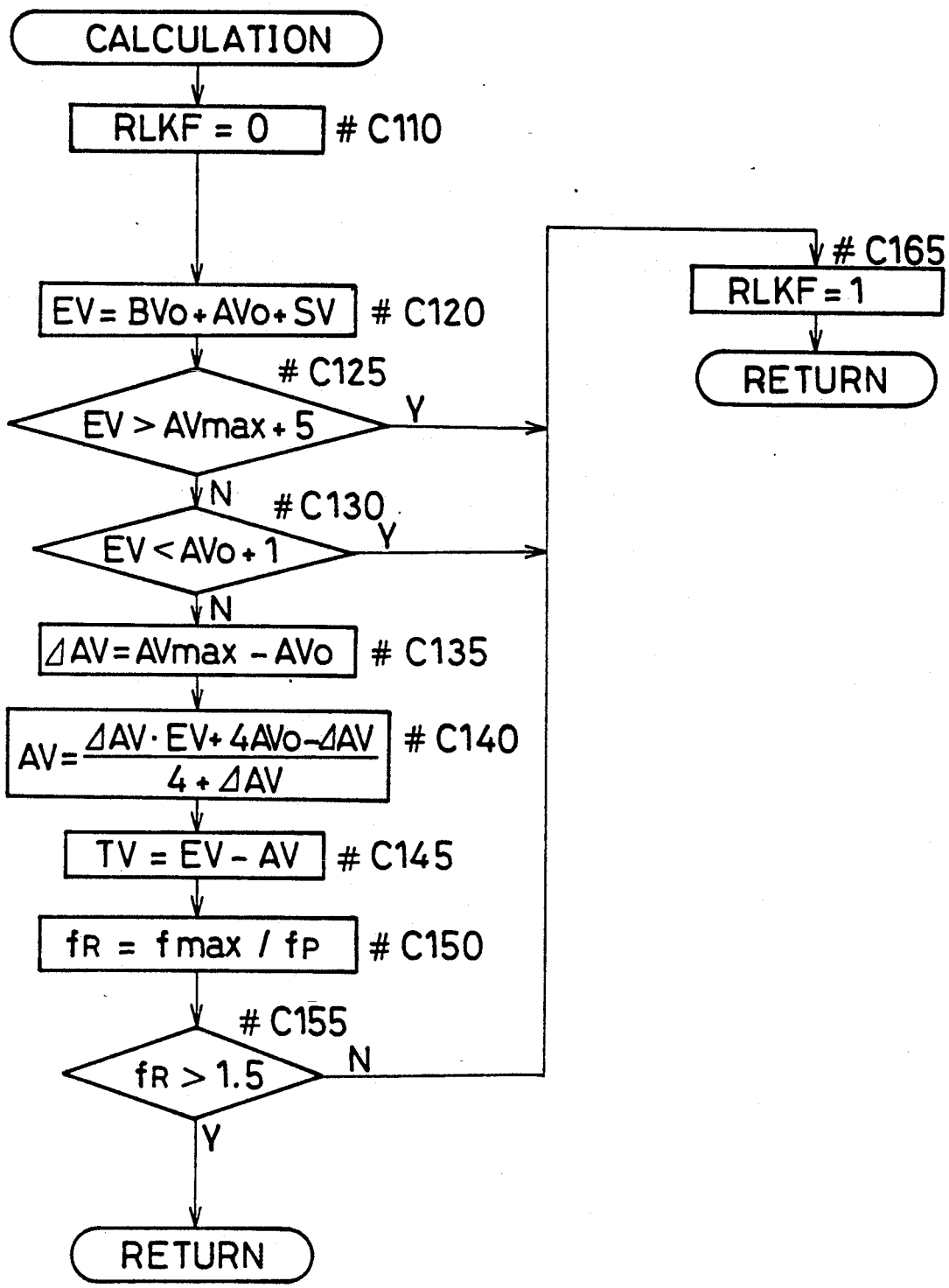

This calculation routine is described referring to FIG. 53. In this routine, the process first resets a release lock flag RLKF at step #C110, and at the following step #C120, the process calculates an exposure value EV on the basis of the input data from the camera body by:

$$EV = BV_0 + AV_0 + SV.$$

Then, judgment is made of whether or not the exposure value EV is greater than an exposure value $(AV_{max}+5)$ in the case where the diaphragm value is set to a maximum diaphragm value $AV_{max}$ and the shutter speed to (1/30) sec. (#C125). This is because (1/30) sec is determined as the highest shutter speed within the range of the possible shutter speeds at which the zooming operation during exposure produces an effect. If $EV > (AV_{max}+5)$, judging that no effect can be obtained even if the zooming operation is performed during exposure, the process proceeds to step #C165 where the release lock flag RLKF is set, and then returns. On the other hand, if $EV \leq (AV_{max}+5)$, the process further judges whether or not the exposure value is smaller than an exposure value $(AV_0+1)$ in the case where the diaphragm value is set to an open diaphragm value $AV_0$ and the shutter speed to 1 sec (#C130). The reason why this judgment is made is that the shutter speed longer than 1 sec causes larger blurring. Also when $EV < (AV_0+1)$, the process sets the release lock flag RLKF (#C165) and returns. If $EV \geq (AV_0+1)$, the process calculates a diaphragm step difference ΔAV between the maximum diaphragm value $AV_{max}$ and the open diaphragm value $AV_0$ (#C135), and thereafter calculates the diaphragm value AV at step #C140 according to the following equation:

$$AV = \frac{\Delta AV \cdot EV + 4AV_0 - \Delta AV}{4 + \Delta AV}$$

Figure 54:
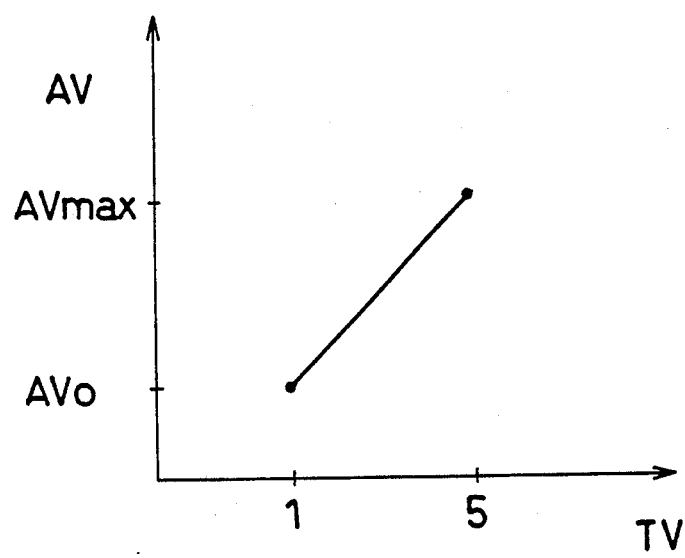
FIG. 54 is a graph showing exposure control characteristics.

As shown in FIG. 54, this program diagram is represented as a line which connects an intersection point of the open diaphragm value $AV_o$ and a value 1 of the shutter speed TV, and another intersection point of the maximum diaphragm value $AV_{max}$ and a value 5 of the shutter speed TV. Thereafter the process calculates the shutter speed TV at step #C145 by $TV = EV - AV$. Subsequently a ratio $f_R$ of the maximum focal length $f_{max}$ to the present focal length $f_p$, i.e., $f_{max}/f_p$, is calculated at step #C150. If $f_R > 1.5$ as a result of step #C155 judgment, assuming that the zooming operation during exposure is effective, the process returns. On the other hand, if $f_R \leq 1.5$, assuming that no effect can be produced even if the zooming operation is performed during exposure, the process resets the release lock flag RLKF (#C165) and returns.

Reverting to the flow of FIG. 51, if the step #C50 judgment results in that the set mode is not mode III, judging that mode IV has been set, the process sets the card to data output mode, sends 3-byte data to the in-body microcomputer $\mu$ C1 through 3-byte serial communication (#C70, #C75), and then enters in the sleep state.

The above-described flags and variables used in the present embodiment are explained concerning their kinds and their meanings in the following Tables 2 and 3.

TABLE 2

| symbol | meaning |
|---|---|
| AFEF | 1 — infocus state |
|  | 0 — out-of-focus state |
| AFOMF | 1 — focus condition detection is performed once more |
|  | 0 — focus condition detection is not performed once more |
| AZP2F | 1 — control in AZP2 mode is permissible |
|  | 0 — control in AZP2 mode is inhibited |
| CSLEF | 1 — interrupt from the lens side has been applied |
|  | 0 — interrupt from the lens side has not been applied |
| $f_{C1}F$ | 1 — $f_1 = f_{C1}$ |
|  | 0 — $f_1 \neq f_{C1}$ |
| LEEDF | 1 — AF lens has reached the endmost position (infinity or near end) as a detected result of timer interrupt |
|  | 0 — AF lens is not positioned at the endmost position |
| LMVF | 1 — AF lens is moving |
|  | 0 — AF lens is not moving |
| MD3F | 1 — lens communication III has been completed one time |
|  | 0 — lens communication III has not been completed |
| PFF | 1 — AF lens is moving at power focusing |
|  | 0 — AF lens is stopped at power focusing |
| RLKF | 1 — shutter release is locked |
|  | 0 — shutter release is not locked |
| RLSF | 1 — lens communication has been performed during shutter release |
|  | 0 — lens communication has not been performed during shutter release |
| RSTF | 1 — reset routine due to battery attachment has been executed |
|  | 0 — reset routine due to battery attachment has not been executed |
| SCDF | 1 — control based on the card is performed |
|  | 0 — control based on the card is not performed |
| SCF | 1 — setting of a second spot in AZP2 mode has been completed |
|  | 0 — setting of the second spot in AZP2 mode has not yet been completed |
| SC1F | 1 — setting of a first spot in AZP2 mode has been completed |
|  | 0 — setting of the first spot in AZP2 mode has not yet been completed |
| SMOFF | 1 — main switch $S_M$ OFF flow is executed |
|  | 0 — main switch $S_M$ OFF flow is not executed |

TABLE 2-continued

| symbol | meaning |
|---|---|
| SQONF | 1 — lens switch $S_Q$ has been turned on one time |
|  | 0 — lens switch $S_Q$ has not been turned on |
| S1ONF | 1 — preparation switch S1 ON flow is executed |
|  | 0 — preparation switch S1 ON flow is not executed |
| TINTF | 1 — zooming lens has reached the endmost position as a detected result of timer interrupt |
|  | 0 — zooming lens is not positioned at the endmost position |
| WDF | 1 — zooming operation in the WIDE direction |
|  | 0 — zooming operation in the TELE direction |
| ZIF | 1 — zooming lens is moved-in |
|  | 0 — zooming lens is not moved-in |
| ZMF | 1 — zoom mode is set |
|  | 0 — zoom mode is not set |
| ZMRSF | 1 — setting in reset mode has been completed |
|  | 0 — setting in reset mode has not been completed |
| ZMVF | 1 — zooming lens is moving |
|  | 0 — zooming lens is not moving |

Table 3

| variable | meaning |
|---|---|
| BCLV | level of battery voltage |
| $D_V$ | photographing distance |
| $\Delta D_V$ | data on move-out amount entered from encoder DVEN |
| $D_1$ | distance of a first spot set in AZP2 mode |
| $D_2$ | distance of a second spot set in AZP2 mode |
| $fII_1$ | focal length at the first spot set in AZP2 mode |
| $fII_2$ | focal length at the second spot set in AZP2 mode |
| $f_a$ | focal length corresponding to a distance D |
| $f_A$ | minimum focal length in focal length range $f_1$ |
| $f_B$ | maximum focal length in focal length range $f_1$ |
| $\Delta f$ | shift amount of focal length due to zooming operation |
| $\Delta f_1$ | predetermined amount to be added or subtracted to/from the shift amount $\Delta f_1$ |
| $f_C$ | target focal length (=control focal length) in AZP mode |
| $f_{C1}$ | focal length range corresponding to the control focal length $f_C$ |
| $f_{ZR}$ | zoom reset value |
| $f_1$ | present focal length range entered from encoder ZMEN |
| $Lf_1$ | last-time focal length range |
| N | moving amount of AF lens |
| N1 | moving amount of AF lens calculated from a defocus amount DF |
| N2 | corrected amount of a move-out amount due to zooming operation |
| N3 | move-out amount at a specified distance corresponding to a last-time focal length $f_3$ |
| N4 | move-out amount at a specified distance corresponding to a current focal length $f_4$ |
| $N_A$ | predetermined move-out amount |
| $N_F$ | move-out amount of AF lens from infinity |
| $N_K$ | amount for moving-out the AF lens to a predetermined position |
| $N_{LG}$ | large value |
| $N_R$ | reset value of move-out amount |
| $N_Z$ | move-out amount corresponding to the distance D at the current focal length $f_4$ |
| T1 | timer for timer interrupt |
| T2 | timer for power holding |
| T3 | timer for counting exposure time |
| $T_A$ | timer for judging a conventional-type camera body |
| $T_B$ | timer for power holding |
| V1 to V3 | velocity of zooming operation |
| $Z_C$ | count value of zoom counter ZC based on output from encoder DNC3 |
| $Z_n$ | drive amount corresponding to the control focal length $f_C$ (converted into $Z_C$) |

It would be appreciated that the above-described various functions excluding ones particular to the interchangeable lens are applicable to the case where the zoom lens system is incorporated in place of the varifocal lens system.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as being included therein.

What is claimed is:

1. A camera having a varifocal lens where a focus condition is changed according to zooming, comprising:
    focus detecting means for detecting a focus condition of said varifocal lens during a zooming operation;
    defocus amount calculating means for calculating a defocus amount based on said focus condition;
    driving means for driving a focusing lens in said varifocal lens;
    first driving data calculating means for calculating first driving data based on said defocus amount;
    zooming amount detecting means for detecting a zooming amount of said varifocal lens;
    second driving data calculating means for calculating, based on said zooming amount, second driving data corresponding to a change amount of a focus condition caused by the zooming operation; and
    drive controlling means for driving said driving means based on said first and second driving data.

2. A camera as claimed in claim 1, wherein said varifocal lens is interchangeably attached to a camera body, and said zooming amount detecting means is provided in said camera body and comprises means for inputting focal length data outputted by said varifocal lens.

3. A camera as claimed in claim 1, further comprising:
    manually operated means for specifying a direction for zooming; and
    zoom driving means for moving said varifocal lens in a direction specified by said manually operated means.

4. A camera to which a varifocal lens where a focus condition is changed according to zooming is attached, comprising:
    focus detecting means for detecting a focus condition of said varifocal lens during a zooming operation;
    defocus amount calculating means for calculating a defocus amount based on said focus condition;
    driving means for driving a focusing lens provided in said varifocal lens;
    data inputting means for inputting predetermined data varied by said zooming from said varifocal lens during a zooming operation;
    calculating means for calculating a driving amount by said driving means based on said defocus amount and said predetermined data, said driving amount being an amount for removing both the detected defocus amount and a change amount of a focus condition caused by the zooming operation; and
    drive controlling means for driving said driving means based on the driving amount calculated by said calculating means.

5. A camera as claimed in claim 4 wherein said predetermined data are focal length data.

6. A camera as claimed in claim 5 wherein said calculating means comprises means for calculating a first driving amount based on said defocus amount and means for calculating a second driving amount based on said focal length data, and the driving amount required for the taking lens to reach the in-focus position is calculated based on said first and second driving amount.

7. A camera as claimed in claim 4 further comprising:
    manually operated means for specifying a direction for zooming; and
    zoom driving means for moving said varifocal lens in a direction specified by said manually operated means.

8. A camera having a varifocal lens where a focus condition is changed according to zooming, comprising:
    manually operated means for specifying a direction for zooming;
    zoom driving means for zooming said varifocal lens in a direction specified by said manually operated means;
    focus detecting means for detecting a focus condition of said varifocal lens;
    defocus amount calculating means for calculating a defocus amount based on said focus condition;
    driving means for driving a focusing lens provided in said varifocal lens;
    detecting means for detecting a data varied by said zooming of said varifocal lens;
    calculating means for calculating a driving amount by said driving means based on said defocus amount and said data, said driving amount being an amount for removing both the detected defocus amount and a change amount of a focus condition caused by the zooming operation; and
    drive controlling means for driving said driving means based on the driving amount.

9. A camera as claimed in claim 8 wherein said varifocal lens is interchangeably attached to a camera body, and said zooming amount detecting means is provided in said camera body and comprises means for inputting focal length data outputted by said varifocal lens.

10. A camera as claimed in claim 8 wherein said calculating means comprises:
    means for calculating a first driving amount based on said defocus amount; and
    means for calculating a second driving amount based on said focal length data, and the driving amount required for the taking lens to reach the in-focus position is calculated based on said first and second driving amount.

11. A camera to which a varifocal lens where a focus condition is changed according to zooming is attached, said varifocal lens being moved in response to a manual operation in a direction corresponding to an operation direction thereof, comprising:
    focus detecting means for detecting a focus condition of said varifocal lens;
    defocus amount calculating means for calculating a defocus amount based on said focus condition;
    driving means for driving a focusing lens provided in said varifocal lens;
    data inputting means for inputting predetermined data varied by said zooming from said varifocal lens;
    calculating means for calculating a driving amount by said driving means based on said defocus amount and said predetermined data, said driving amount being an amount for removing both the detected defocus amount and a change amount of a focus condition caused by the zooming operation; and drive controlling means for driving said driving means based on said driving amount calculated by said calculating means.

12. A camera as claimed in claim 11, wherein said predetermined data are focal length data.

13. A camera as claimed in claim 12, wherein said calculating means comprises means for calculating a first driving data based on said defocus amount and means for calculating a second driving data based on said focal length data, and the driving data required for the taking lens to reach the in-focus position is calculated by said first and second driving data.

14. A camera having a varifocal lens where a focus condition is changed according to zooming, comprising:

focus detecting means for detecting a focus condition of said varifocal lens during a zooming operation;

driving means for driving a focusing lens in said varifocal lens;

detecting means for detecting a change amount of a focus condition caused by said zooming operation; and drive controlling means for driving said driving means based on both said focus condition detected by said focus detecting means and said change amount detected by said detecting means.

15. A camera according to claim 14, wherein said focus detecting means detects a defocus amount of said varifocal lens.

16. A camera according to claim 15, wherein said drive controlling means includes driving amount calculating means for calculating a driving amount based on said defocus amount and said change amount, said driving amount being an amount for removing both said defocus amount and said change amount.

17. A camera to which a varifocal lens where a focus condition is changed according to zooming is attached, comprising:

focus detecting means for detecting a focus condition of said varifocal lens during a zooming operation;

defocus amount calculating means for calculating a defocus amount based on said focus condition;

data inputting means for inputting predetermined data varied by said zooming from said varifocal lens during a zooming operation; and calculating means for calculating a driving amount based on said defocus amount and said predetermined data, said driving amount being an amount for removing both the defocus amount and a change amount of a focus condition caused by the zooming operation, and said driving amount being used for driving a focusing lens disposed in said varifocal lens.

18. A camera to which a varifocal lens where a focus condition is changed according to zooming is attached, said varifocal lens being moved in response to a manual operation in a direction corresponding to an operation direction thereof, comprising:

focus detecting means for detecting a focus condition of said varifocal lens;

defocus amount calculating means for calculating a defocus amount based on said focus condition;

data inputting means for inputting predetermined data varied by said zooming from said varifocal lens; and calculating means for calculating a driving amount based on said defocus amount and said predetermined data, said driving amount being an amount for removing both the defocus amount and a change amount of a focus condition caused by the zooming operation, and said driving amount being used for driving a focusing lens disposed in said varifocal lens.

* * * * *